United States Patent
Makino et al.

(10) Patent No.: US 8,008,379 B2
(45) Date of Patent: Aug. 30, 2011

(54) FLUORESCENT POLYMER FINE PARTICLE, METHOD FOR FORMING THEREOF, FLUORESCENCE DETECTION KIT, AND METHOD FOR DETECTING FLUORESCENCE

(75) Inventors: Naonori Makino, Kanagawa (JP); Koki Nakamura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1337 days.

(21) Appl. No.: 11/590,798

(22) Filed: Nov. 1, 2006

(65) Prior Publication Data

US 2007/0105990 A1     May 10, 2007

(30) Foreign Application Priority Data

| Nov. 2, 2005 | (JP) | 2005-320176 |
| Nov. 2, 2005 | (JP) | 2005-320177 |
| Nov. 2, 2005 | (JP) | 2005-320178 |
| Oct. 30, 2006 | (JP) | 2006-293875 |

(51) Int. Cl.
- *C08K 5/34* (2006.01)
- *C08K 5/3492* (2006.01)
- *C08K 5/1545* (2006.01)
- *C08K 5/16* (2006.01)
- *C08K 5/3412* (2006.01)

(52) U.S. Cl. ......... 524/100; 525/326.1; 525/329.4; 525/242; 525/375; 525/217; 525/218; 524/99; 524/102; 524/718; 524/720; 523/201

(58) Field of Classification Search ......... 524/100, 524/99, 102, 718, 720; 525/535, 902, 326.1, 525/329.4, 242, 375, 217, 218; 523/201
See application file for complete search history.

(56) References Cited

U.S. PATENT DOCUMENTS

| 2001/0043546 A1 | 11/2001 | Kumacheva et al. |
| 2003/0207461 A1 * | 11/2003 | Bell et al. ............ 436/172 |
| 2004/0139565 A1 | 7/2004 | Banerjee et al. |
| 2004/0171771 A1 * | 9/2004 | Kataoka et al. ...... 525/535 |

FOREIGN PATENT DOCUMENTS

| EP | 1398635 A1 | 3/2004 |
| JP | 61-128168 A | 6/1986 |
| JP | 2000-345052 A | 12/2000 |
| JP | 2005-49207 A | 2/2005 |
| JP | 2005-134348 A | 5/2005 |
| WO | WO-02/097436 A1 | 12/2002 |

* cited by examiner

*Primary Examiner* — Rabon Sergent
*Assistant Examiner* — Deve Valdez
(74) *Attorney, Agent, or Firm* — Birch, Stewart, Kolasch & Birch, LLP

(57) ABSTRACT

The invention provides a fluorescent polymer fine particle having at least: a polymer particle having a core-shell configuration having a hydrophobic core and a hydrophilic shell; and a fluorescent lanthanoid dye that is integrated with the polymer particle and has a fluorescent lanthanoid cation, wherein a hydrophilic polymer which forms the hydrophilic shell has a polymerizable unit and at least one hydrophilic unit selected from the group consisting of a hydrophilic (meth)acrylamide unit and a hydrophilic vinyl amine unit. The invention further provides a method for forming the fluorescent polymer fine particle having at least dispersing and polymerizing a hydrophobic radical polymerizable monomer in an aqueous solvent in the presence of a radical generator and the presence of a components for forming a hydrophilic polymer which forms the hydrophilic shell; and introducing the fluorescent lanthanoid dye with the polymer particle.

20 Claims, No Drawings

FLUORESCENT POLYMER FINE PARTICLE, METHOD FOR FORMING THEREOF, FLUORESCENCE DETECTION KIT, AND METHOD FOR DETECTING FLUORESCENCE

BACKGROUND OF THE INVENTION

1. Field of Invention

The invention relates to a fluorescent polymer fine particle, a method for forming thereof, a fluorescence detection kit, and a method for detecting fluorescence. Specifically, the invention relates to a fluorescent polymer fine particle, a method for forming thereof, a fluorescence detection kit comprising a fluorescent polymer fine particle, and a method for detecting fluorescence comprising using a fluorescent polymer fine particle.

2. Description of the Related Art

In order to visualize or quantify a substance of a minute amount, various labeling substances have been developed. In fields requiring a particularly high sensitivity, radioisotopes are representative labeling substances, and tritium and radioactive iodine have been utilized as representative examples. However, as the radioactive substances involve various difficulties in disposal after use and in handling, methods alternative to the radioactive substances have been developed. Such methods include, for example, an enzyme labeling method (utilizing peroxidase, alkaline phosphatase, glucose oxidase or β-D-galactosidase), and a fluorescent labeling method (utilizing fluorescein or rhodamine).

However, these methods involve a drawback of being deficient in the absolute sensitivity as a label.

In order to improve the precision and sensitivity of measurement, a time-resolved fluorescence measurement has been developed (cf. JP-A-61-128168) as an extension of the fluorescent labeling method. This method is based on irradiating a fluorescent substance of a long fluorescence extinction time, as represented by an europium chelate, with a pulsed excitation light, and measuring the fluorescence after a certain time namely after the termination of the direct excitation light and the extinction of fluorescence of short duration resulting from ambient substances, thereby measuring a fluorescence specific to europium.

It is also attempted, in order to further improve the sensitivity, to enclose such europium chelate or a dye in polystyrene particles, then to coat the surface of the polystyrene particles with an antigen or an antibody to prepare a reagent, and to visually detect the polystyrene particles immobilized by the antigen-antibody reaction (for example cf. JP-A-2000-345052).

However, such known method of preparing a labeling substance by enclosing a dye or a fluorescent substance in polystyrene particles, though being capable of attaining a certain sensitivity by simple operations, is insufficient in sensitivity, and a further improvement in the sensitivity has been desired.

Also because of the fact that the particle surface is constituted of hydrophobic polystyrene, the method has been utilized with various modifications such as, (1) after bonding a functional molecule such as an antigen or an antibody desired for coating, coating the unbonded surface with a protein or various biosubstance-like materials thereby masking the hydrophobicity of polystyrene, or (2) adding a surfactant in the liquid phase at the reaction thereby preventing mutual interaction of the polystyrene particles. Nevertheless, errors in judgment may result from a non-specific reaction.

On the other hand, in order to suppress the non-specific reaction resulting from the polystyrene particles, there have been developed a technology of preparing fine particles of a core-shell configuration formed by a core of a water-insoluble polymer compound and a hydrophilic shell having a reactive group, and enclosing a fluorescent dye in the core portion, and a composition for fluorescence analysis, capable of stably maintaining thus obtained high fluorescence intensity (for example cf. WO 2002/097436 pamphlet and JP-A-2005-49207).

However, the method utilizing such fine particles of core-shell configuration may suppress noises induced by the non-specific reactions, it is unsatisfactory in the fluorescence intensity. Further, such fine particles are insufficient in the stability in time, and may lose the fluorescence intensity within the period of use.

Also lanthanoid dyes have an excitation wavelength within the ultraviolet region, and most of the hitherto known ones have excitation maxima at wavelengths shorter than 350 nm. For this reason, the light source for excitation is inevitably restricted, and an expensive light source has to be used.

SUMMARY OF THE INVENTION

The present invention provides a fluorescent polymer fine particle that has a high fluorescence intensity and is capable of being excited with a visible light, and a complex for detecting fluorescence, a kit for detecting fluorescence and a method for detecting fluorescence which allow to detect a target substance to be detected with a high sensitivity by utilizing the fluorescent polymer fine particle.

Namely, the present invention provides a fluorescent polymer fine particle comprising: a polymer particle having a core-shell configuration comprising a hydrophobic core and a hydrophilic shell; and a fluorescent lanthanoid dye that is integrated with the polymer particle and comprises a fluorescent lanthanoid cation, wherein a hydrophilic polymer which forms the hydrophilic shell comprises a polymerizable unit and at least one hydrophilic unit selected from the group consisting of a hydrophilic (meth)acrylamide unit and a hydrophilic vinyl amine unit.

The present invention further provides a fluorescent polymer fine particle comprising: a polymer particle having a core-shell configuration comprising a hydrophobic core and a hydrophilic shell; and a fluorescent lanthanoid dye that is integrated with the polymer particle and comprises a fluorescent lanthanoid cation, wherein a hydrophilic polymer which forms the hydrophilic shell comprises at least one hydrophilic macromonomer selected from the group consisting of a hydrophilic (meth)acryl macromonomer and a hydrophilic vinyl macromonomer, and a hydrophobic polymer which forms the hydrophobic core is bonded to one terminal of a main chain of the hydrophilic macromonomer.

The present invention further provides a fluorescent lanthanoid dye that is integrated with the polymer particle of the present invention and that comprises a nitrogen-containing heterocyclic ligand represented by the following Formula (L-I):

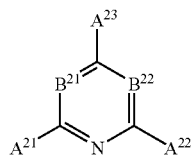

Formula (L-I)

wherein each of $A^{21}$, $A^{22}$, and $A^{23}$ may be the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or $=C(-R^{30})-$; and $R^{30}$ represents a hydrogen atom or a substituent:

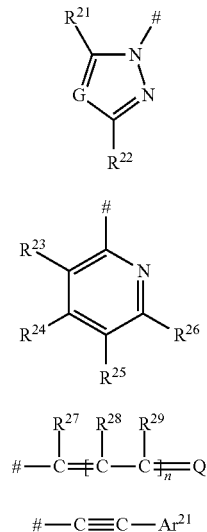

Formula (L-II)

Formula (L-III)

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ may be bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which may form a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

The present invention further provides a fluorescent lanthanoid dye that is integrated with the polymer particle of the present invention and that comprises a nitrogen-containing heterocyclic ligand represented by the following Formula(L-VI):

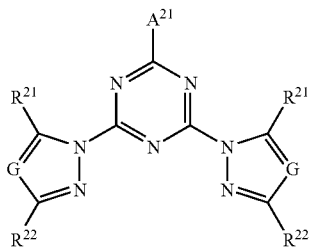

Formula (L-VI)

wherein $A^{21}$ represents an atomic group represented by any one of Formulae (L-II) to (L-V), a hydroxyl group, an alkoxy group, an aryloxy group, an alkylamino group, a dialkylamino group, an arylamino group, or a diarylamino group; and $R^{21}$, $R^{22}$ and G are respectively the same as $R^{11}$, $R^{12}$ and G in the following Formulae (L-II) to (L-V):

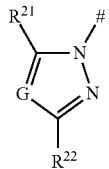

Formula (L-II)

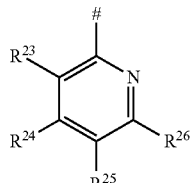

Formula (L-III)

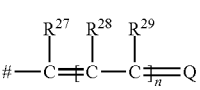

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ may be bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which may form a condensed ring; $Ar^{21}$ represents an aromatic hydrocarbon ring or an aromatic heterocyclic ring; and # represents a site to be bonded with the triazine ring in the ligand represented by Formula (L-VI).

The present invention further provides a method for forming a fluorescent polymer fine particle having a core-shell configuration comprising a hydrophobic core and a hydrophilic shell and a fluorescent lanthanoid dye that is integrated with the polymer particle and comprises a fluorescent lanthanoid cation, comprising:

dispersing and polymerizing a hydrophobic radical polymerizable monomer in an aqueous solvent in the presence of a radical generator and the presence of a hydrophilic polymer precursor comprising a polymerizable unit and at least one hydrophilic unit selected from the group consisting of a hydrophilic (meth)acrylamide unit and a hydrophilic vinyl amine unit so that the polymer fine particle have the core-shell configuration in which a hydrophobic polymer which forms the hydrophobic core is bonded to a hydrophilic polymer which forms the hydrophilic shell; and introducing the fluorescent lanthanoid dye with the polymer particle.

The present invention further provides a method for forming a fluorescent polymer fine particle having a core-shell configuration comprising a hydrophobic core and a hydrophilic shell and a fluorescent lanthanoid dye that is integrated with the polymer particle and comprises a fluorescent lanthanoid cation, comprising:

dispersing and polymerizing a hydrophobic radical polymerizable monomer in an aqueous solvent in the presence of a radical generator and the presence of at least one hydrophilic macromonomer selected from the group consisting of a hydrophilic (meth)acryl macromonomer having a polymerizable double bond at one terminal end of the main chain thereof and a hydrophilic vinyl macromonomer having a polymerizable double bond at one terminal end of the main chain thereof so that the polymer fine particle have the core-shell configuration in which a hydrophobic polymer which forms the hydrophobic core is bonded to a hydrophilic polymer which forms the hydrophilic shell; and introducing the fluorescent lanthanoid dye with the polymer particle.

The present invention further provides a complex for detecting fluorescence comprising the fluorescent polymer fine particle of the present invention and a combination substance which can be combined with a target substance to be detected.

The present invention further provides a method for detecting fluorescence comprising detecting a detection target substance by using the fluorescent polymer fine particle of the present invention and a combination substance which can be combined with the target.

Furthermore, the present invention provides a kit for detecting fluorescence comprising the fluorescent polymer fine particle of the present invention.

DETAILED DESCRIPTION OF THE INVENTION

The fluorescent polymer fine particle of the invention comprises a polymer particle having a core-shell configuration comprising a hydrophobic core and a hydrophilic shell and a fluorescent lanthanoid dye that is integrated with the polymer particle and comprises a fluorescent lanthanoid cation.

The hydrophilic polymer preferably comprises a unit represented by one of the following Formulae (I) or (II).

In the fluorescent polymer fine particle of the invention, a hydrophilic shell is formed by a hydrophilic polymer at least one hydrophilic unit selected from the group consisting of a hydrophilic (meth)acrylamide unit and a hydrophilic vinyl amine unit, each of which having a low affinity to a lanthanoid dye. As a result, an interaction with the surface (hydrophilic shell) of the polymer fine particle is suppressed, whereby a lanthanoid cation can be stably included in the core of the polymer fine particle. It is thus rendered possible to retain the lanthanoid dye stably in the hydrophobic core, and to realize fluorescent polymer fine particle having a high fluorescence intensity and an excellent stability in time.

Specifically, in a case where the hydrophibic polymer constituting the hydrophobic core of the polymer particle is bonded to a side chain of the hydrophilic polymer, there is assumed a structure in which the hydrophilic polymer is bonded in a branched state to the resin particle, thereby realizing a steric hindrance effect for stably dispersing the resin fine particles and also easily elevating the density of the hydrophilic shell constituting the resin fine particle, for maintaining the lanthanoid dye more stably in the hydrophobic core (one example being shown below).

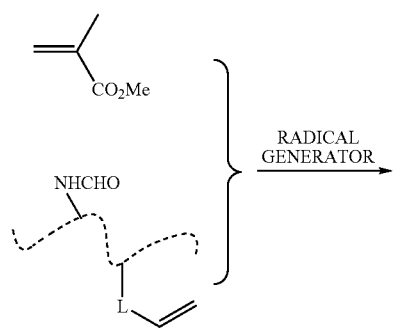

ETHYLENIC UNSATURATED BOND
GROUP-CONTAINING HYDROPHILIC POLYMER
(L: LINKING GROUP)

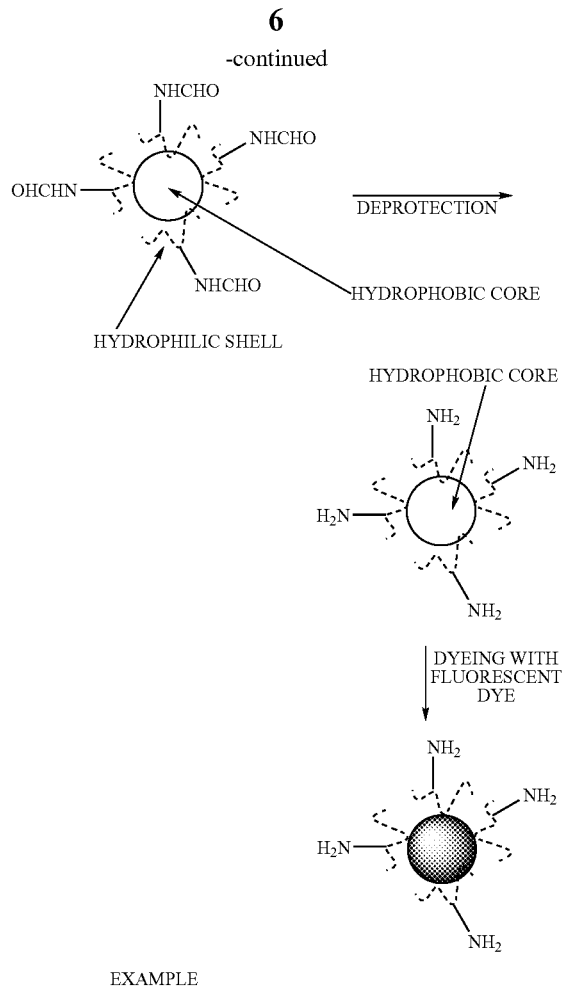

EXAMPLE

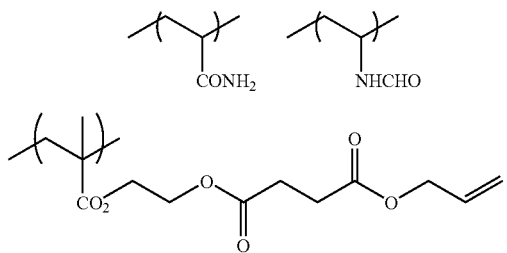

In the following, the present invention will be further explained in detail.

Hydrophilic Polymer

The hydrophilic polymer that forms the hydrophilic shell of the polymer fine particle of the invention contains at least one of a hydrophilic (meth)acrylamide unit and a hydrophilic vinylamine unit, which contribute to provide the hydrophilicity of the shell and have little compatibility with the fluorescent lanthanoid dye. The hydrophilic (meth)acrylamide unit is not particularly limited as long as it has a chemical structure (skeleton) derived of (meth)acrylamide. The hydrophilic vinylamine unit is not particularly limited as long as it has a chemical structure (skeleton) derived of vinylamine.

The hydrophilic (meth)acrylamide unit is preferably a hydrophilic unit represented by the following Formula (I). Further, the hydrophilic vinylamine unit is preferably a hydrophilic unit represented by the following Formula (II).

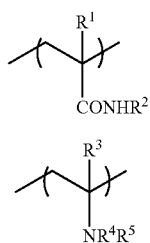

Formula (I)

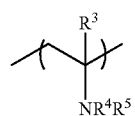

Formula (II)

In Formulae (I) and (II), each of $R^1$ and $R^3$ independently represents a hydrogen atom, an alkyl group having 1 to 6 carbon atoms or a halogen atom. In view of particle formation property, each of $R^1$ and $R^3$ preferably independently represents a hydrogen atom, an alkyl group having 1 to 3 carbon atoms (such as a methyl group, an ethyl group, a propyl group or an isopropyl group) or a halogen atom, and further preferably independently represents a hydrogen atom or a methyl group.

$R^2$ represents a hydrogen atom or an alkyl group having 1 to 4 carbon atoms (such as a methyl group, an ethyl group, a propyl group, an isopropyl group or a butyl group). In view of particle formation property and generation of an amino group by de-protecting, $R^2$ preferably represents a hydrogen atom or a methyl group.

Each of $R^4$ and $R^5$ independently represents a hydrogen atom or an alkyl group having 1 to 6 carbon atoms. In a case where $R^4$ and $R^5$ independently represents an alkyl group, the alkyl group may have a substituent. Further, $R^4$ and $R^5$ may be bonded with each other to form a nitrogen-containing ring. Examples of the alkyl group include a methyl group, an ethyl group and a propyl group. Examples of the nitrogen-containing ring formed by $R^4$ and $R^5$ bonded with each other include a pyrrolidine ring, a piperazine ring, a morpholine ring, a pyrolidone ring and a pyrrole ring. In view of hydrophilicity and particle formation property of the hydrophilic polymer, it is preferable that $R^4$ represents a methyl group while $R^5$ represents a hydrogen atom, or $R^4$ and $R^5$ are bonded with each other to form a pyrolidone ring.

In the invention, it is preferable that $R^1$ represents a hydrogen atom or a methyl group and $R^5$ represents a hydrogen atom or a methyl group in the hydrophilic unit represented by Formula (I). Further, it is preferable that $R^3$ represents a hydrogen atom or a methyl group, $R^4$ represents a methyl group while $R^5$ represents a hydrogen atom, or $R^4$ and $R^5$ are bonded with each other to form a pyrolidone ring in the hydrophilic unit represented by Formula (II).

In the polymer particle of the invention, in view of attaining a high density in the hydrophilic polymer, the hydrophobic polymer constituting the hydrophobic core is preferably bonded to a side chain of the hydrophilic polymer. The hydrophilic polymer constituting the polymer particle can be obtained by using a hydrophilic polymer precursor which includes either a (meth)acrylamide hydrophilic unit or a vinylamine hydrophilic unit and a polymerizable unit containing a polymerizable group. In a hydrophilic polymer precursor in the invention, the polymerizable unit in the hydrophilic polymer precursor preferably has a polymerizable group in a side chain.

Such hydrophilic polymer precursor can be dissolved in an aqueous solvent, and can react with radical species, which is generated by a reaction of a radical-polymerizable monomer explained in the followings and a radical generator. As a result, a fine particle, in which a hydrophobic core is formed by a polymer of the radical-polymerizable monomer and a hydrophilic shell is formed by the hydrophilic polymer, can be formed. Since the hydrophilic polymer has a polymerizable group in a side chain thereof, it can exhibit a satisfactory dispersion stabilizing effect by a steric repulsion when it is bonded to the particle surface.

The polymerizable group unit in the hydrophilic polymer precursor is preferably an polymerizable ethylenic unsaturated group unit represented by the following Formula (III) in consideration of particle forming property.

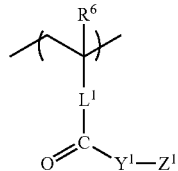

Formula (III)

In Formula (III), $R^6$ represents a hydrogen atom or a methyl group; $Y^1$ represents an oxygen atom or $—NR^7—$; $R^7$ represents a hydrogen atom or an alkyl group having 1 to 6 carbon atoms (such as a methyl group, an ethyl group, a propyl group, a butyl group, a pentyl group or a hexyl group), and may also form a branched structure or a cyclic structure.

$L^1$ represents a bivalent connecting group. Examples thereof include a single bond, an alkylene group having 1 to 6 carbon atoms, an alkyleneoxy group having 1 to 6 carbon atoms, $—COO—$, $—OCO—$ and a bivalent linking atomic group formed by a combination thereof.

$Z^1$ represents an allyl group, an allyloxyethyl group, or an atomic group represented by any one of the following Formulae (IIIA) and (IIIB). In the following Formulae (IIIA) and (IIIB), each of $R^8$ and $R^9$ independently represents a hydrogen atom or a methyl group. Further, in Formula (IIIA), m represents an integer of 1 to 12. In view of hydrophilicity and particle formation property, m preferably represents an integer of 1 to 6.

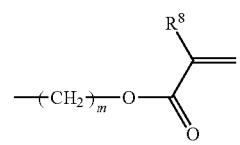

Formula (IIIA)

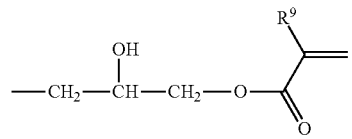

Formula (IIIB)

The hydrophilic polymer of the invention preferably has a reactive functional group capable of combining with a combination substance such as a physiologically active substance (an antibody, an enzyme, DNA, or the like) which are explained in the followings.

The reactive functional group may be introduced in the hydrophilic polymer at the formation of the hydrophilic polymer so as to be a unit contained therein and/or may be introduced to the hydrophilic polymer after the bonding thereof to the surface of the core portion. It is preferable to introduce the reactive functional group in the hydrophilic polymer at the formation of the hydrophilic polymer so as to be a unit contained therein, in view of regulating an introduction rate of the reactive functional group.

Such reactive functional group is not particularly restricted as long as it is stable in water (or an aqueous solvent) and is capable of reacting with a combination substance such as a physiologically active substance (such as an enzyme, DNA or the like) in a case where the fluorescent polymer particle of the invention is used as a labeled substance. Preferable examples of the functional group to be provided on the surface of the polymer fine particle include an aldehyde group, a carboxyl group, a mercapto group, an acid halide group such as an acid chloride group, an acid anhydride group, an ester group, an amide group, a maleimide group, a vinylsulfone group, a methanesulfonyl group, a thiol group, a hydroxyl group, and an amino group. More preferable examples among these include an aldehyde group, a carboxyl group, an acid chloride group, an acid anhydride group, a maleimide group, a thiol group, and an amino group. Most preferable examples among these include an aldehyde group, a maleimide group, a thiol group, and an amino group. Since an ester group can be easily converted into a carboxyl group by hydrolysis, the polymer fine particle having an ester group on the surface is a useful intermediate.

An amount of the functional groups for bonding the combination substance, represented in equivalents of the functional groups per unit weight of the polymer fine particles of the invention, is generally in a range of 0.001 to 0.5 meq/g, preferably in a range of 0.005 to 0.2 meq/g, more preferably in a range of 0.01 to 0.1 meq/g, further preferably in a range of 0.02 to 0.07 meq/g, and most preferably from 0.03 to 0.05 meq/g.

The reactive functional group unit for introducing an amino group is preferably an amino group-containing unit represented the following Formula (VI) in view of the particle forming property and the binding compatibility with a physiologically active substance as a combination substance. The amino group-containing unit is preferably a product derived from an amino group precursor unit which is included in a hydrophilic polymer precursor and is represented the following Formula (VI-1).

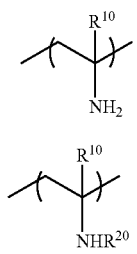

Formula (VI)

Formula (VI-1)

In Formulae (VI) and (VI-1), $R^{10}$ represents a hydrogen atom or a methyl group. $R^{20}$ represents an acyl group. Preferable examples of the acyl group represented by $R^{20}$ include a formyl group and an acetyl group.

Introduction of the amino group precursor unit represented by Formula (VI-1) into the hydrophilic polymer precursor allows to introduce, into the main chain, a large number of amino groups which are preferable as reactive groups for bonding an antigen, an antibody or the like onto the surface of the fluorescent polymer fine particle of the invention. particularly, since the polymerizable polymer is bonded to a side chain of the hydrophilic polymer, the amino group is not restricted with regard to its the position within the main chain, and may be introduced at any position therein.

The hydrophilic polymer precursor of the invention can be obtained by, for example, a process including synthesizing a carbonic acid-containing polymer and reacting an ethylenically-unsaturated group-containing compound with the carbonic acid-containing polymer. The carbonic acid-containing polymer can be obtained by, for example, a process including performing a radical polymerization of a conventionally-known radical polymerizable monomer represented by any one of the following Formulae (VII) and (VIII) and a conventionally-known radical polymerizable monomer represented by the following Formula (IX) in the presence of a radical generator. The conventionally-known radical polymerizable monomer represented by any one of the following Formulae (VII) and (VIII) may be used singly or in combination of two or more of them. The conventionally-known radical polymerizable monomer represented by the following Formula (IX) may be used singly or in combination of two or more of them.

In a case where a reactive functional group is introduced into a hydrophilic polymer, a conventionally-known radical-polymerizable monomer such as that represented by the following Formula (X) can be used so as to obtain a hydrophilic polymer having a reactive functional group unit.

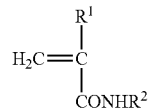

Formula (VII)

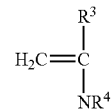

Formula (VIII)

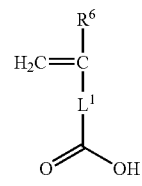

Formula (IX)

Formula (X)

In Formulae (VII), (VIII), (IX) and (X), $L^1$, $R^1$, $R^2$, $R^3$, $R^4$, $R^5$, $R^6$, $R^{10}$ and $R^{20}$ have the same meanings as $L^1$, $R^1$, $R^2$, $R^3$, $R^4$, $R^5$, $R^6$, $R^{10}$ and $R^{20}$ in Formulae (I), (II), (III), (VI) and (VI-1).

While an amount of the monomer represented by Formula (VII) or Formula (VIII) is variable depending on a size and a kind of the hydrophilic polymer precursor to be formed, in consideration of the water-solubility of the polymer and the particle dispersibility, the ratio (mole percentage) of the monomer with respect to all monomers to be reacted is preferably in a range of 0 to 99 mol %, more preferably from 10 to 90 mol % and particularly preferably from 20 to 80 mol %.

While an amount of the monomer represented by Formula (IX) is variable depending on a size and a kind of the hydrophilic polymer precursor to be formed, in consideration of the introduced amount of the ethylenic unsaturated bonds required for particle formation, the ratio (mole percentage) of the monomer with respect to all monomers to be reacted is preferably in a range of 0.1 to 50 mol %, more preferably from 0.5 to 20 mol % and particularly preferably from 1 to 10 mol %.

While an amount of the monomer represented by Formula (X) is variable depending on a size and a kind of the hydrophilic polymer precursor to be formed, in consideration of the amount to be bonded with the physiologically active substance, the ratio (mole percentage) of the monomer with respect to all monomers to be reacted is preferably in a range of 1 to 99 mol %, more preferably from 2 to 80 mol % and particularly preferably from 5 to 60 mol %.

A solvent used in the polymerization reaction for forming the hydrophilic polymer precursor is a solvent capable of dissolving the radical-polymerizable monomer for forming the hydrophilic polymer. Example thereof include ethanol, 1-methoxy-2-propanol, dimethylacetamide, water, dimethylsulfoxide and a mixture of these.

A monomer concentration is preferably in a range of 10 to 50 mass %, and more preferably in a range of 15 to 40 mass %, with respect to a sum of weights of monomer and solvent, in consideration of molecular weight control and reaction stability.

While an amount of the radical generator may be suitably selected according to the required molecular weight, in consideration of a stable polymerizability and a particle forming property using the hydrophilic polymer, it is preferably in a range of 0.01 to 2 mol %, and more preferably in a range of 0.1 to 1 mol %, with respect to the total monomer amount.

While a reaction temperature may be suitably selected according to the decomposition temperature of the employed initiator, it is preferably in a range of 40 to 100° C. and more preferably in a range of 60 to 80° C.

The thus obtained carboxylic acid-containing polymer is reacted with a compound containing an ethylenic unsaturated group so as to synthesize the hydrophilic polymer precursor containing an ethylenic unsaturated bond.

For example, an ethylenic unsaturated bond can be introduced in a side chain of the polymer by employing an alcohol such as allyl alcohol, allyloxyethyl alcohol, hydroxyethyl acrylate or hydroxyethyl methacrylate as a compound having an ethylenic unsaturated bond, and executing an esterification reaction with a carboxylic acid. In such a case, an acid such as sulfuric acid, hydrochloric acid, or toluenesulfonic acid, can be used as a catalyst, and a carbodiimide compound such as 1-ethyl-3-(3-dimethylaminopropyl)carbodiimide hydrochlorate can be used as a condensing agent. It is also possible to introduce an ethylenic unsaturated bond in a side chain of the polymer by employing an epoxide compound such as glycidyl methacrylate as the compound having an ethyneic unsaturated bond and executing a reaction ring-opening of an epoxide therein. In such a case, it is possible to utilize, as a catalyst, a quaternary ammonium compound such as tetrabutylammonium chloride or tetrabutylammonium bromide, a quaternary phosphonium compound such as tetrabutylphosphonium bromide, or an amine compound such as N,N-dimethyl-n-dodecylamine, 1,8-diazabicyclo[5.4.0]-7-undecene, or 4-dimethylaminopyridine.

While a number-average molecular weight of the hydrophilic polymer precursor of the invention is not particularly restricted, in consideration of water-solubility and particle forming property, it is preferably in a range of 500 to 200,000, and more preferably in a range of 1,000 to 100,000.

In the synthesis of the hydrophilic polymer precursor, for the purpose of regulating the solubility in water and in solvents, a conventionally-known radical-polymerizable monomer may be copolymerized in addition to the monomers represented by any one of Formulae (VII) to (X).

Examples of the conventionally-known radical-polymerizable monomer include styrenic monomers such as styrene, methylstyrene, chloromethylstyrene, 4-methoxystyrene, and 4-acetoxystyrene; (meth)acrylate esters such as methyl (meth)acrylate, ethyl (meth)acrylate, hydroxyethyl (meth)acrylate, propyl (meth)acrylate, butyl (meth)acrylate, hexyl (meth)acrylate, octyl (meth)acrylate, 2-ethylhexyl (meth)acrylate, cyclohexyl (meth)acrylate, dodecyl (meth)acrylate, stearyl (meth)acrylate, phenyl (meth)acrylate, benzyl (meth)acrylate, and 2-hydroxyethyl (meth)acrylate; and vinyl monomers such as vinyl acetate, and vinylimidazole. Such radical-polymerizable monomer may be copolymerized preferably in an amount of 0 to 30 mol %, and more preferably 0 to 10 mol %, with respect to all the hydrophilic polymer.

While Exemplary compounds P-1 to P-39 are shown below as specific examples of the hydrophilic polymer precursor of the invention, the present invention is not limited by such examples. Composition ratios shown in the formulae represent molar ratios.

P-1

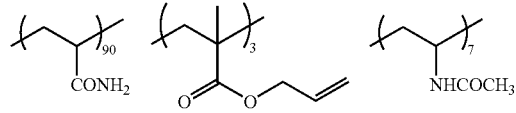

P-2

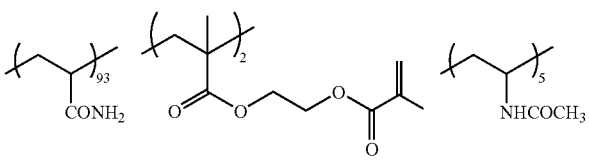

P-3

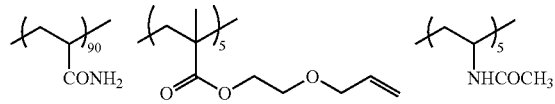

P-4

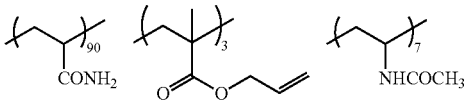

P-5

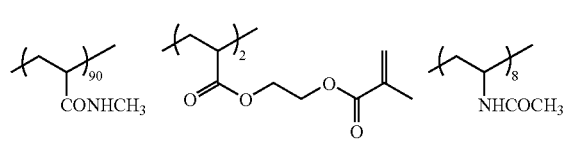

P-6

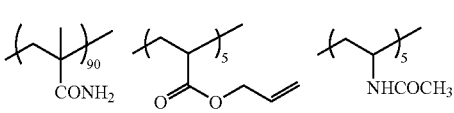

-continued
P-7
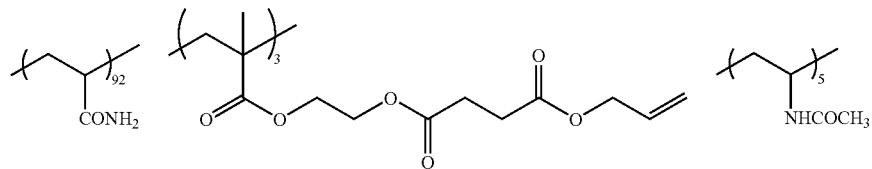
P-8
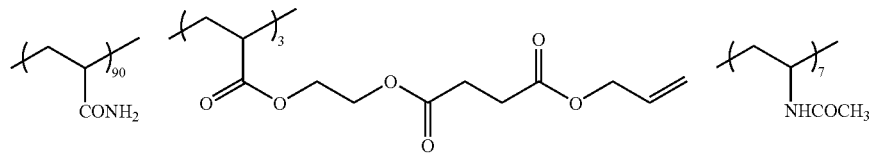
P-9
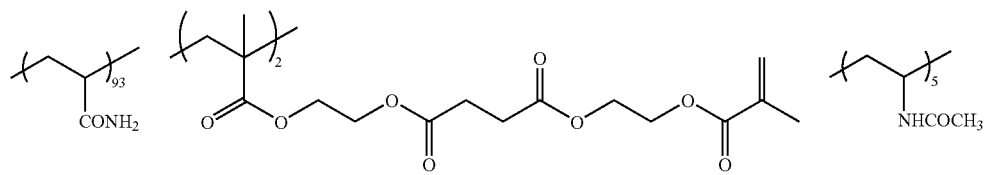
P-10                                   P-11
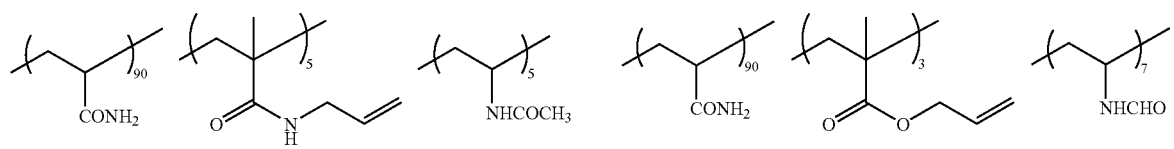
P-12
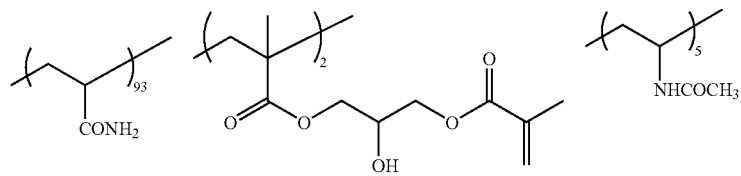
P-13
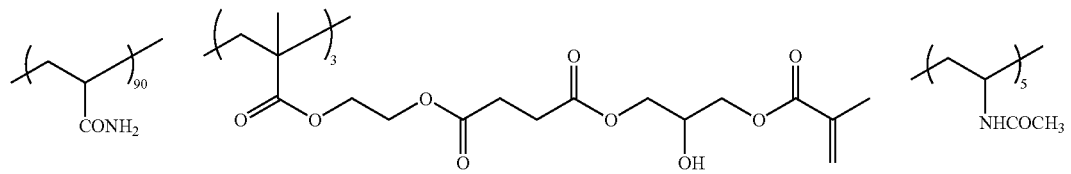
P-14                                   P-15
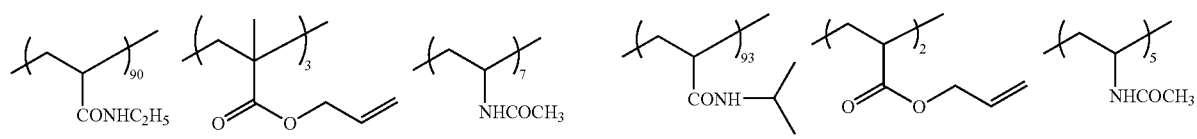
P-16
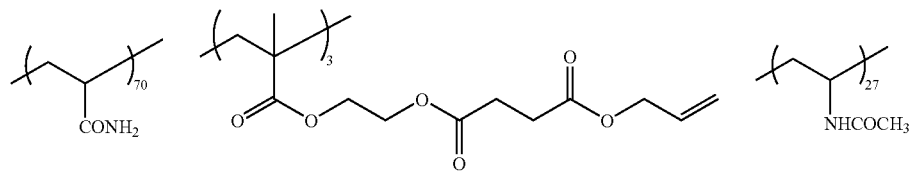

-continued
P-17
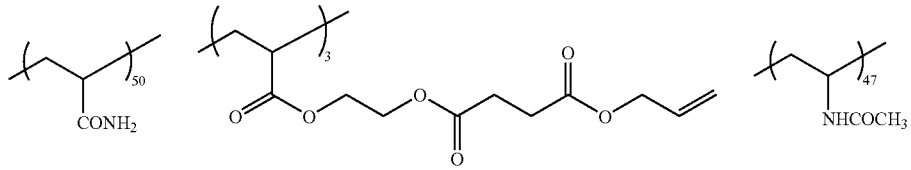
P-18
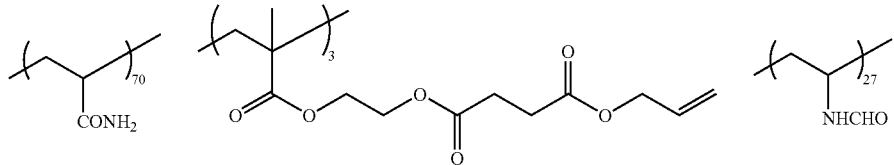
P-19
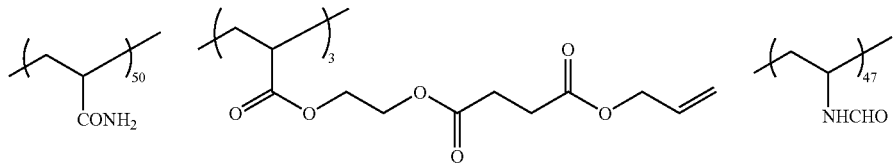
P-20
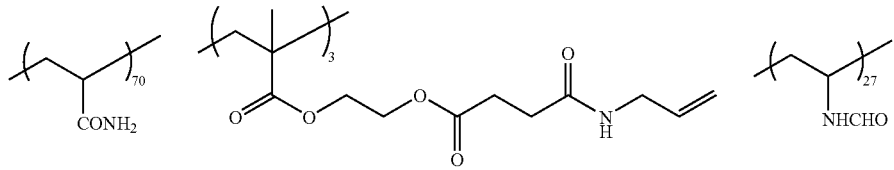
P-21
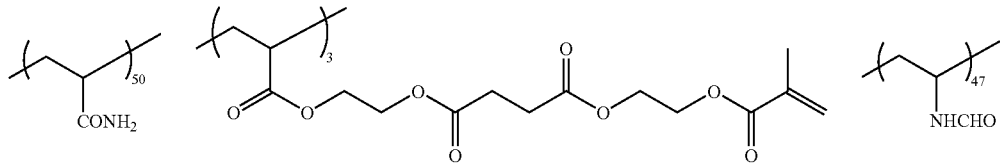
P-22
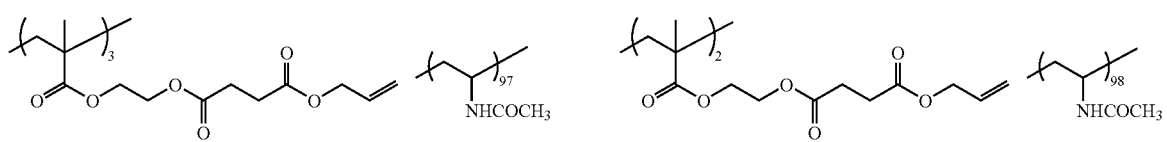
P-23
P-24
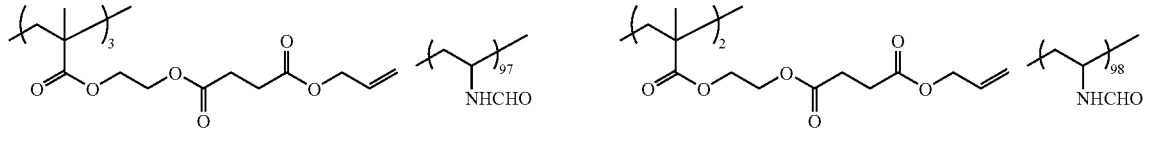
P-25
P-26
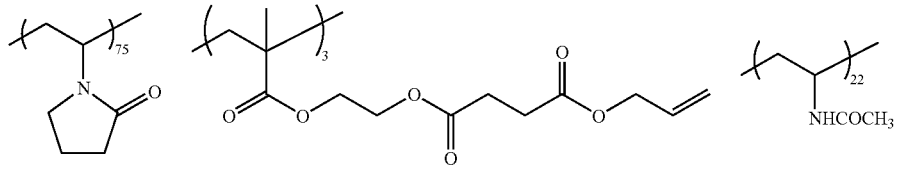
P-27
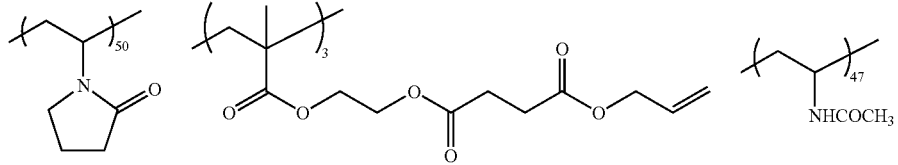

-continued
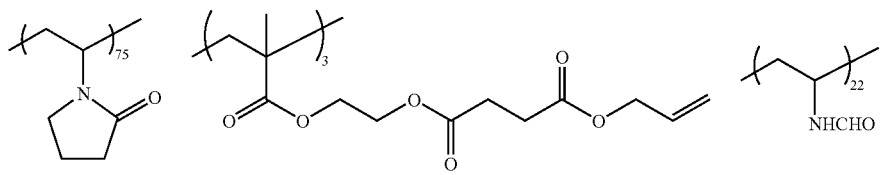 P-28
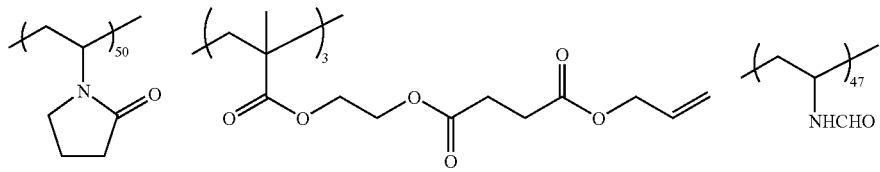 P-29
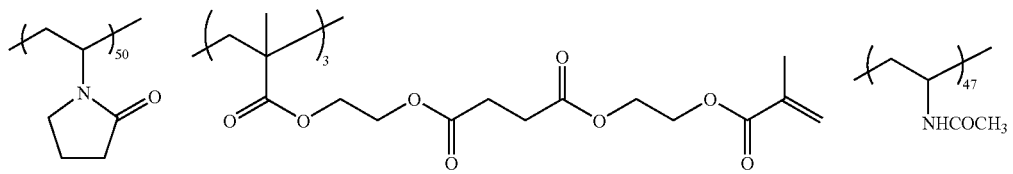 P-30
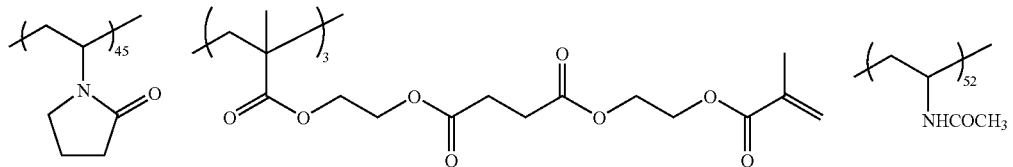 P-31
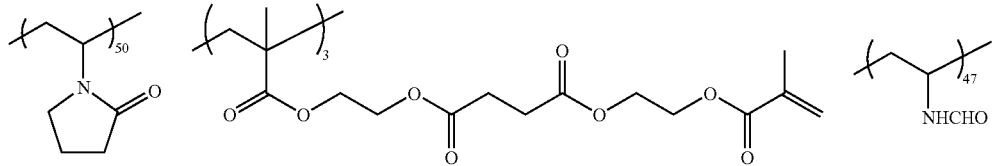 P-32
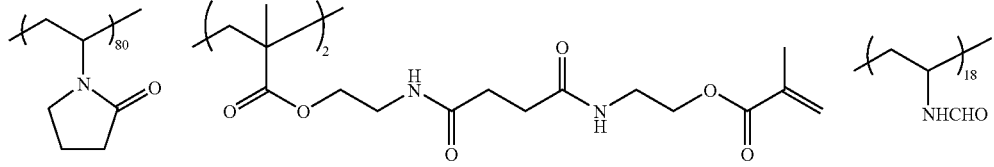 P-33
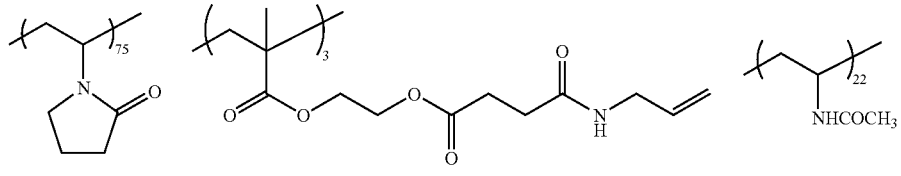 P-34
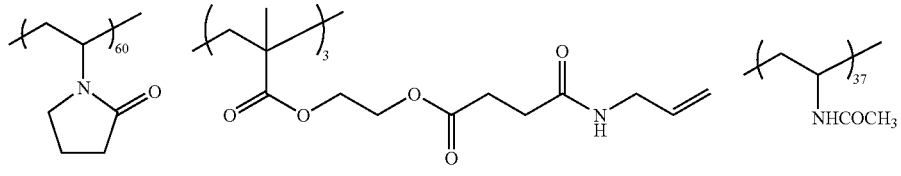 P-35
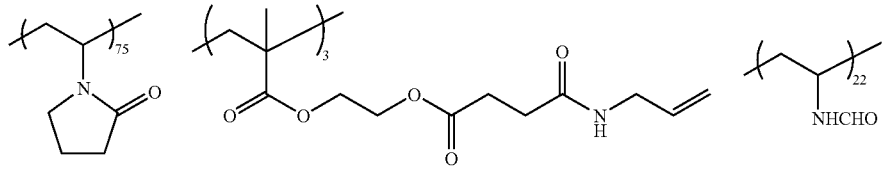 P-36

-continued

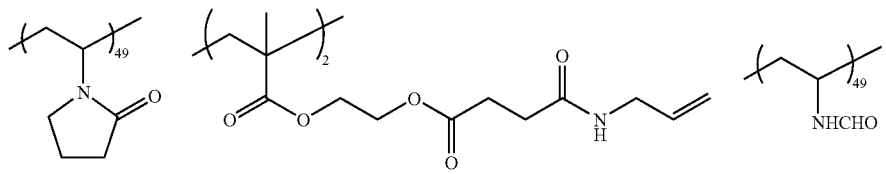

P-37

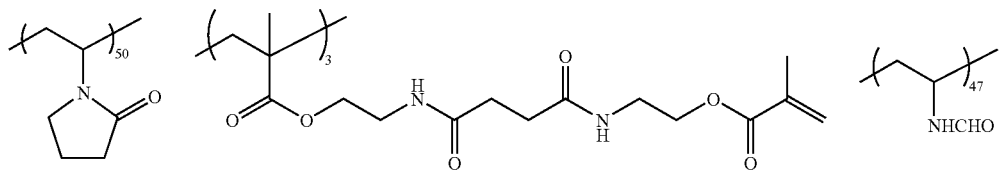

P-38

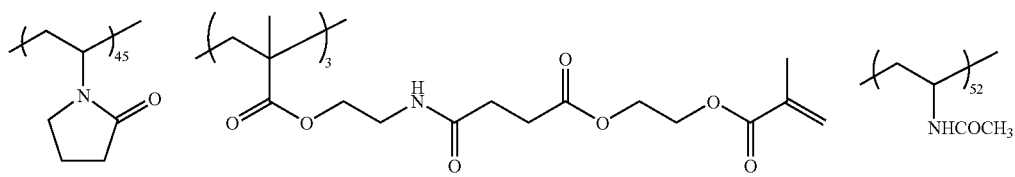

P-39

SYNTHESIS EXAMPLES

Synthesis of Exemplary Compound P-1

Under a nitrogen flow, 19.19 g of acrylamide, 0.77 g of methacrylic acid, and 1.79 g of N-vinylacetamide were dissolved in 90 g of N,N-dimethyl acetamide, and were heated to 60° C. Then 0.37 g of 2,2'-azobis(2,4-dimethylvaleronitrile) was added thereto. The thus-obtained mixture was agitated at 60° C. for 2 hours, and further agitated at 70° C. for 2 hours. After cooling to the room temperature, the thus-obtained reaction mixture was poured into ethanol, and a polymer deposited thereby was separated by suction filtration and dried under a reduced pressure at the room temperature so as to obtain 21.5 g of the polymer. An acid value measurement by a titration with a 0.1N aqueous solution of potassium hydroxide indicated that 1 g of the polymer contained 0.41 mmols of acid. A GPC measurement indicated that the polymer had a number-average molecular weight Mn of 6,500.

20 g of the thus-obtained polymer, 9.5 g of allyl alcohol, and 0.1 g of dimethylaminopyridine were dissolved in 100 g of distilled water. 15 g of hydrochloride of 1-ethyl-3-(3-dimethylamino propyl)carbodiimide was added thereto. The thus-obtained mixture was agitated at room temperature for one day. The resultant was poured into 1 L of ethanol, and a polymer deposited thereby was separated by suction filtration and dried under a reduced pressure at the room temperature so as to obtain 19.8 g of a polymer (a hydrophilic macromonomer precursor P-1).

A titration with a 0.1N aqueous solution of potassium hydroxide detected equal to or less than 0.01 mmols of acid per 1 g of the polymer, indicating that most of carboxylic acids in the polymer were esterified by the reaction with allyl alcohol.

Synthesis of Exemplary Compound P-29

Under a nitrogen flow, 13.36 g of N-vinylformamide, 22.23 g of N-vinylpyrolidone, and 2.76 g of 2-acryloyloxyethyl succinate (trade name: NK ESTER SA, manufactured by Shin-nakamura Chemical Corporation) were dissolved in 114 g of N,N-dimethyl acetamide, and were heated to 60° C. Then 0.5 g of 2,2'-azobis(2,4-dimethylvaleronitrile) was added thereto. The thus-obtained mixture was agitated at 60° C. for 4 hours, and further agitated at 75° C. for 2 hours. After cooling to the room temperature, 50 g of N,N-dimethyl acetamide was poured into the thus-obtained reaction mixture for diluting. Further, the diluted resultant was poured into 2.5 L of ethyl acetate, and a polymer deposited thereby was separated by suction filtration and dried under a reduced pressure at the room temperature so as to obtain 37 g of the polymer (PP-1). An acid value measurement by a titration with a 0.1N aqueous solution of potassium hydroxide indicated that 1 g of the polymer contained 0.28 mmols of acid. A GPC measurement indicated that the polymer had a number-average molecular weight Mn of 9,000.

24 g of the thus-obtained polymer (PP-1) was dissolved in 96 g of dimethyl sulfoxide. 4.7 g of allyl alcohol, 0.27 g of dimethylaminopyridine and 5.1 g of N,N-diisopropyl carbodiimide were added thereto. The thus-obtained mixture was agitated at 40° C. for 4 hours. After 2 g of acetic acid and 30 g of ethanol were added, the mixture was further agitated at 40° C. for 2 hours. The resultant was poured into 2 L of ethyl acetate, and a polymer deposited thereby was separated by suction filtration and dried under a reduced pressure at the room temperature so as to obtain 23 g of the hydrophilic polymer precursor P-29.

A titration with a 0.1N aqueous solution of potassium hydroxide detected no acid in the polymer, indicating that carboxylic acids in the polymer disappeared by the reaction with allyl alcohol. A GPC measurement indicated that the hydrophilic polymer precursor P-29 had a number-average molecular weight Mn of 9,000.

Synthesis of Exemplary Compound P-32

12 g of the polymer PP-1, which was obtained by the synthesis of the hydrophilic polymer precursor P-29, was dissolved in 48 g of dimethyl sulfoxide. 5.26 g of 2-hydroxyethyl methacrylate, 0.13 g of dimethylaminopyridine and 2.6 g of N,N-diisopropyl carbodiimide were added thereto. The thus-obtained mixture was agitated at 40° C. for 4 hours. After 1 g of acetic acid and 20 g of ethanol were added, the mixture was further agitated at 40° C. for 2 hours. After cooling to the room temperature, the resultant was poured into 1.5 L of ethyl acetate, and a polymer deposited thereby was separated by suction filtration and dried under a reduced pressure at the room temperature so as to obtain 9 g of the hydrophilic polymer precursor P-32.

A titration with a 0.1N aqueous solution of potassium hydroxide detected no acid in the polymer, indicating that carboxylic acids in the polymer disappeared by the reaction with 2-hydroxyethyl methacrylate. A GPC measurement indicated that the hydrophilic polymer precursor P-32 had a number-average molecular weight Mn of 9,100.

The fluorescent polymer fine particle of the invention comprises a polymer particle having a core-shell configuration comprising a hydrophobic core and a hydrophilic shell, and a fluorescent lanthanoid dye that is integrated with the polymer particle and comprises a fluorescent lanthanoid cation. A hydrophilic polymer which forms the hydrophilic shell comprises a hydrophilic (meth)acryl macromonomer or a hydrophilic vinyl macromonomer (hereinafter, these macromonomers are sometimes generically referred as a "hydrophilic macromonomer"), and a hydrophobic polymer which forms the hydrophobic core is bonded to one terminal of a main chain of the hydrophilic macromonomer the hydrophilic (meth)acryl macromonomer or the hydrophilic vinyl macromonomer.

The fluorescent polymer fine particle of the invention has the hydrophilic shell formed of the hydrophilic (meth)acryl macromonomer or the hydrophilic vinyl macromonomer, which has little compatibility with the fluorescent lanthanoid dye. In addition, the fluorescent polymer fine particle of the invention has the hydrophobic polymer which forms the hydrophobic core and is bonded to one terminal of a main chain of the hydrophilic (meth)acryl macromonomer or the hydrophilic vinyl macromonomer. As a result thereof, an interaction between the fluorescent lanthanoid dye and a surface of the fluorescent polymer fine particle (the hydrophilic shell) is suppressed so that the fluorescent lanthanoid dye is capable of being stably integrated with the fluorescent polymer fine particle. The fluorescent polymer fine particle is thus formed so that it can stably keep the fluorescent lanthanoid dye in the hydrophobic core so as to have high fluorescent intensity and long time stability.

Particularly, since the hydrophobic polymer is bonded to one terminal of a main chain of the hydrophilic (meth)acryl macromonomer or the hydrophilic vinyl macromonomer, the main chain can be easily functionalized. For example, it is possible to introduce a large amount of the reactive functional groups to the hydrophilic macromonomer.

Following is an exemplary scheme of the functionalization of the fluorescent polymer fine particle.

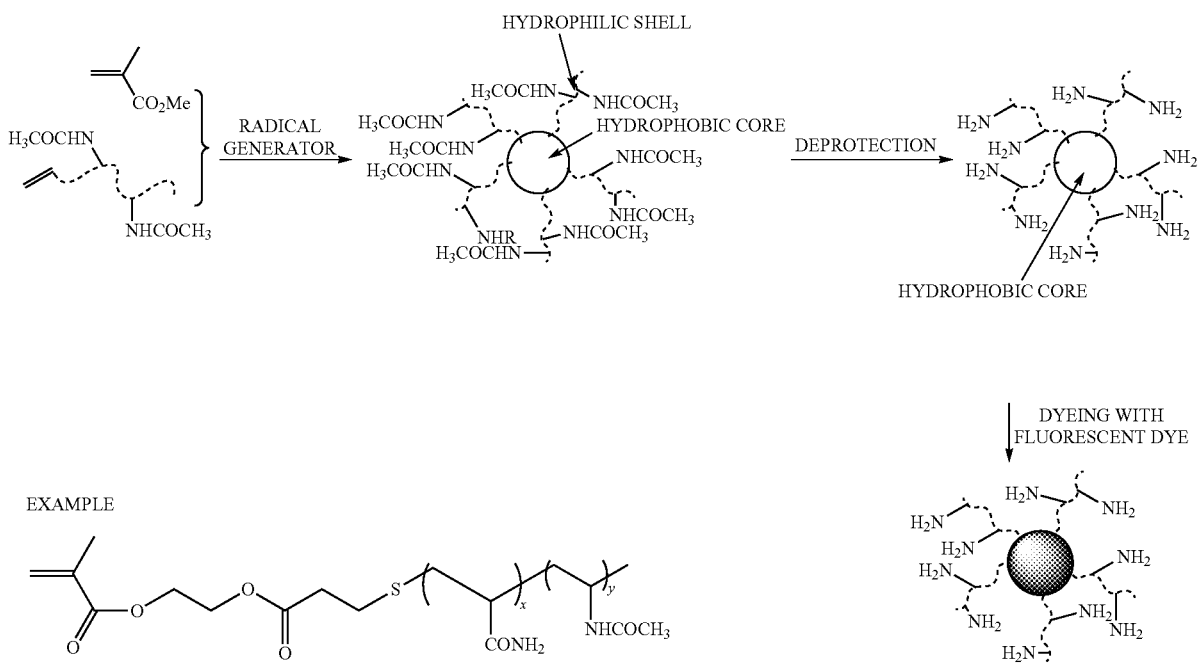

Hydrophilic Macromonomer

The macromonomer of the invention is characterized by being a hydrophilic (meth)acrylic macromonomer or a hydrophilic vinyl macromonomer having a polymerizable double bond at a terminal end of a polymer main chain. The hydrophilic macromonomer is formed into a hydrophilic shell, by reacting, in an aqueous solvent, with radical species generated by a reaction between a hydrophobic radical-polymerizable monomer explained in the followings and a polymerization initiator. The hydrophobic polymer, which is formed of the hydrophobic radical-polymerizable monomer bonded to the terminal end of the hydrophilic macromonomer, is formed into a hydrophobic core, thereby constructing a resin fine particle having a core-shell configuration. Since the hydrophilic macromonomer is bonded to the particle surface, the hydrophilic macromonomer exerts a stabilizing effect for dispersion by a steric repulsion.

The hydrophilic macromonomer of the invention preferably has a reactive functional group capable of combining with a combination substance such as a physiologically active substance (an antibody, an enzyme, DNA, or the like) which are explained in the followings.

The reactive functional group may be introduced in the hydrophilic macromonomer at the formation of the hydrophilic macromonomer and/or may be introduced to the hydrophilic macromonomer after the bonding thereof to the surface of the core portion. It is preferable to introduce the reactive functional group in the hydrophilic macromonomer at the formation of the hydrophilic macromonomer, in view of regulating an introduction rate of the reactive functional group.

Explanations regarding the reactive functional group for the hydrophilic polymer can be also applicable to the reactive functional group for the hydrophilic macromonomer.

In view of the interaction with lanthanoid dye, particle formation property and in consideration of the reactivity with a combination substance explained in the followings, it is preferable that in the hydrophilic macromonomer, the hydrophilic (meth)acryl macromonomer is represented by the following Formula (IV), and/or the hydrophilic vinyl macromonomer is represented by the following Formula (V).

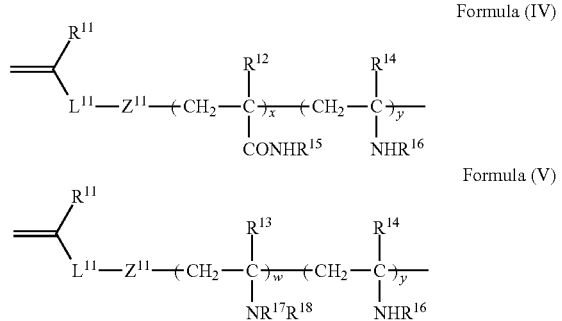

In Formulae (IV) and (V), $R^{11}$, $R^{12}$, $R^{13}$ and $R^{14}$ each independently represents a hydrogen atom, an alkyl group having 1 to 6 carbon atoms, or a halogen atom. Specific examples of alkyl group include a methyl group, an ethyl group, a propyl group, a butyl group, a pentyl group and a hexyl group, and may be linear or cyclic. Further, the alkyl group may have a substituent, and examples thereof include an aryl group, a hydroxyl group, an amino group, a heterocyclic group, an alkylthio group, an arylthio group, an alkoxy group, an alkoxycarbonyl group, an aryloxy group, an amide group, an ureido group, a halogen atom (fluorine, chlorine, bromine or iodine), and a cyano group. In the cited examples, the substituent preferably contains, excluding hydrogen atom, 1 to 50 atoms, more preferably 1 to 30 atoms and most preferably 1 to 20 atoms. In the case where aryl group has a substituent, preferable examples of the substituent include an alkyl group, an alkenyl group, an alkinyl group, an aryl group, a heterocyclic group, a silyl group, an alkoxy group, an amino group, an alkylamino group, a dialkylamino group, an acylamino group, an alkylsulfonylamino group, an arylsulfonylamino group, an acyl group, an alkylsulfonyl group, an arylsulfonyl group, a formyl group, an alkoxycarbonyl group, a carbamoyl group, a sulfamoyl group, a halogen atom, a cyano group, a sulfo group and a carboxyl group. $R^{11}$, $R^{12}$, $R^{13}$ and $R^{14}$ each is preferably a hydrogen atom or a methyl group, in view of particle formation.

$R^{15}$ represents a hydrogen atom or an alkyl group having 1 to 4 carbon atoms. Examples of the alkyl group include a methyl group, an ethyl group, a propyl group, an isopropyl group and a butyl group. In view of hydrophilicity of the macromonomer, $R^{15}$ preferably represents a methyl group or a hydrogen atom, and particularly represents a hydrogen atom.

$R^{16}$ represents a hydrogen atom or an acyl group. Preferable examples of the acyl group include a formyl group and an acetyl group.

Each of $R^{17}$ and $R^{18}$ independently represents a hydrogen atom or an alkyl group having 1 to 6 carbon atoms. In a case where $R^{17}$ and $R^{18}$ independently represents an alkyl group, the alkyl group may have a substituent. Further, $R^{17}$ and $R^{18}$ may be bonded with each other to form a nitrogen-containing ring. Examples of the alkyl group include a methyl group, an ethyl group and a propyl group. Examples of the nitrogen-containing ring formed by $R^{17}$ and $R^{18}$ bonded with each other include a pyrrolidine ring, a piperazine ring, a morpholine ring, a pyrolidone ring and a pyrrole ring. In view of hydrophilicity and particle formation property of the macromonomer, it is preferable that $R^{17}$ represents a methyl group while $R^{18}$ represents a hydrogen atom, or $R^{17}$ and $R^{18}$ are bonded with each other to form a pyrolidone ring.

$L^{11}$ represents a bivalent linking group selected from the group consisting of a single bond, an alkylene group having 1 to 4 carbon atoms (such as a methylene group, an ethylene group, or a propylene group), an alkyleneoxy group having 1 to 6 carbon atoms (such as an ethyleneoxy group or a propyleneoxy group), —COO—, —OCO—, —$(CH_2)_t$COO—, —$(CH_2)_k$OCO—, —O—, —$SO_2$—, —CONHCOO—, —CONHCONH—, —CON($R^{19}$)—, —$SO_2$N($R^{19}$)— (wherein $R^{19}$ represents a hydrogen atom or a hydrocarbon atom such as an alkyl group, having 1 to 22 carbon atoms; t represents an integer 1, 2 or 3; and k represents an integer of from 1 to 4), an atomic group represented by the following Formula (IV-A), and an atomic group formed by a combination of any of these.

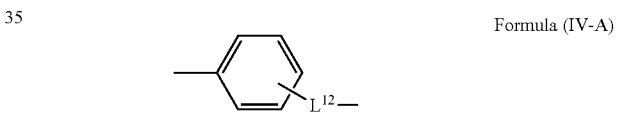

In Formula (IV-A), $L^{12}$ represents a single bond, a methylene group, —O—, —OCO—, —COO— or a bivalent atomic group formed by a combination thereof. In a case where $L^{11}$ represents an alkylene group, an alkyleneoxy group or an atomic group represented by Formula (IV-A), the moiety represented by $L^{11}$ may have a substituent, and examples of the substituent include an alkyl group having 1 to 6 carbon atoms, and substituents which are similar to those when $R^{11}$ in Formula (IV) is an alkyl group.

Further, in —CON($R^{19}$)— or —$SO_2$N($R^{19}$)— represented by $L^{11}$, $R^{19}$ preferably represents a hydrogen atom or an alkyl group such as a methyl group, an ethyl group, a propyl group, a butyl group, a pentyl group, a hexyl group, a heptyl group, an octyl group, a decyl group or a dodecyl group.

$Z^{11}$ represents an atomic group which is linked to a terminal end of the polymer main chain. More specifically, $Z^{11}$ represents a bond directly linking to a terminal end of the polymer main chain, or a bonding group via an arbitrary linking group.

The bonding group is formed by an arbitrary combination of atomic groups each formed by a carbon atom-carbon atom bond (single bond or a double bond), a carbon atom-hetero atom bond (examples of the hetero atom include an oxygen atom, a sulfur atom, a nitrogen atom and a silicon atom), and a hetero atom-hetero atom bond. Specific examples thereof include the bonding group shown below:

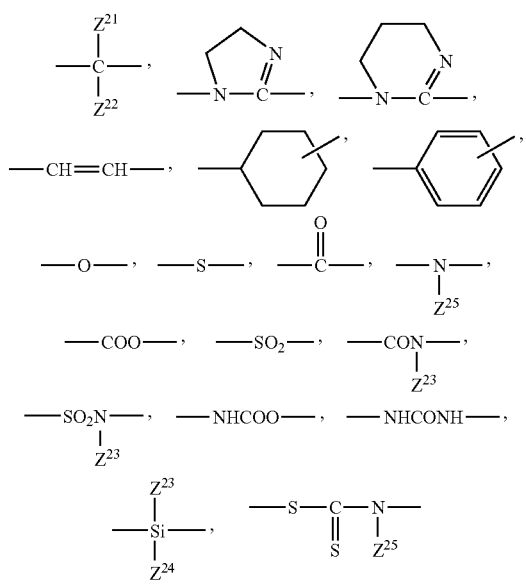

$Z^{21}$ and $Z^{22}$ each represents a hydrogen atom, a halogen atom (such as a fluorine atom, a chlorine atom, or a bromine atom), a cyano group, a hydroxyl group, or an alkyl group (such as a methyl group, an ethyl group or a propyl group). $Z^{23}$ and $Z^{24}$ each represents a hydrogen atom, a hydrocarbon group having 1 to 8 carbon atoms (such as a methyl group, an ethyl group, a propyl group, a butyl group, a pentyl group, a hexyl group, a benzyl group, a phenethyl group, a phenyl group or a tolyl group), or —$OZ^{25}$, wherein $Z^{25}$ have the same meaning as the hydrocarbon group in $Z^{23}$.

x and y each represents a number of repeat of 1 or more.

In case where the sum of x and y is 100, x is preferably in a range of 10 to 99, more preferably from 20 to 99, and particularly preferably from 60 to 99, in consideration of the solubility of macromonomer in water. In such a case, y is preferably in a range of 1 to 60, more preferably from 2 to 50, and particularly preferably from 5 to 40, in consideration of the introduction amount of the combination substance.

w represents a number of repeat of 0 or more.

In a case where the sum of w and y is 100, w is preferably an integer in a range of 0 to 99, more preferably in a range of 5 to 90, and further preferably in a range of 10 to 80, in view of hydrophilicity of the macromonomer. In this case, y is preferably an integer in a range of 1 to 60, more preferably in a range of 2 to 50, and further preferably in a range of 5 to 40, in view of an amount of introduced combination substance.

The hydrophilic (meth)acrylic macromonomer and the hydrophilic vinyl macromonomer of the present invention can be easily produced by methods which use a polymer which is obtained by polymerizing a known polymerizable monomer represented by any one of the following Formulae (XI), (XII) and (XIII) by a known radical polymerization (for example iniferter process), an anionic polymerization or a cationic polymerization, and further including any one of: reacting various reagents containing various double bond groups with a terminal end of a polymer; reacting a reagent containing a specific reactive group (such as —OH, —COOH, —SO$_3$H, —NH$_2$, —SH, —PO$_3$H$_2$, —NCO, —NCS,

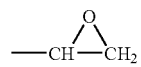

, —COCl or —SO$_2$Cl) with a terminal end of the polymer, and then introducing a polymerizable double bond group by a polymer reaction (method by ionic polymerization); and executing a radical polymerization with a polymerization initiator and/or a chain shifting agent which has the specific reactive group, and then executing a polymer reaction utilizing the specific reactive group bonded to a terminal end a main chain of the polymer thereby introducing a polymerizable double bond group to the polymer.

More specifically, the polymerizable double bond group can be introduced according to the methods described in general reports such as Takayuki Otsu, *Kobunshi*, 33 (No. 3), 222 (1984), P. Dreyfuss and R P. P. Quirk, Encycl. Polym. Sci. Eng., 7, 551(1987), Yoshiki Nakajo and Yuya Yamashita, *Senryo to Yakuhin*, 30, 232(1985), Akira Ueda and Susumu Nagai, *Kagaku to Kogyo*, 60, 57(1986), P. F. Pempp & E. Franta, Advances in Polymer Science, 58, 1(1984), Koichi Itoh, *Kobunshi Kako*, 35, 262(1986), and V. Perce, Applied Polymer Science, 285, 97(1984), and references cited therein.

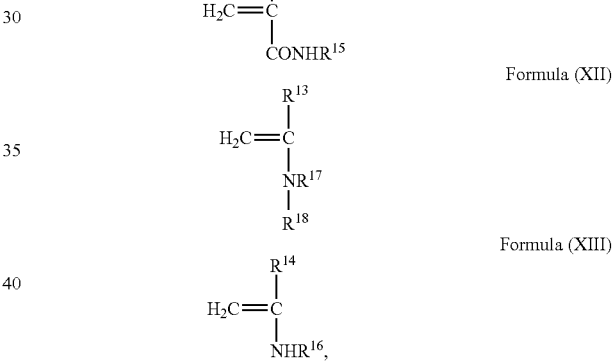

In Formulae (XI), (XII) and (XIII), $R^{12}$ to $R^{18}$ have the same meanings as $R^{12}$ to $R^{18}$ in Formulae (IV) and (V).

More specific examples of the method of synthesizing the polymer in which the specific reactive group is bonded to a terminal end of the polymer main chain include: (a) a method including polymerizing a mixture of at least a monomer corresponding to the repeating unit represented by any one of Formulae (XI), (XII) and (XIII) and a chain transfer agent containing the specific reactive group within the molecule using a polymerization initiator (such as an azobis compound or a peroxide); (b) a method including polymerizing a mixture of at least a monomer corresponding to the repeating unit represented by any one of Formulae (XI), (XII) and (XIII) utilizing a polymerization initiator containing the specific reactive group within the molecule without utilizing the chain transfer agent; and (c) a method including polymerizing polymerizing a mixture of at least a monomer corresponding to the repeating unit represented by any one of Formulae (XI), (XII) and (XIII) using a chain transfer agent and a polymerization initiator both containing the specific reactive group within the molecule, and then introducing a polymerizable double bond group by a polymer reaction using such specific reactive group.

Examples of the usable chain transfer agent include mercapto compounds containing the specific reactive group or a substituent which can be induced to become the specific reactive group [such as thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotic acid, 3-[N-(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 1-mercapto-2-propanol, 3-mercapto-2-butanol, mercaptophenol, 2-mercaptoethylamine, 2-mercaptoimidazole, or 2-mercapto-3-pyridinol], and iodoalkyl compounds containing the specific reactive group or a substituent which can be induced to become the specific reactive group [such as iodoacetic acid, iodopropionic acid, 2-iodoethanol, 2-iodoethanesulfonic acid, or 3-iodopropanesulfonic acid], and among these, the mercapto compounds are preferable.

Examples of the polymerization initiator containing the specific reactive group or a substituent which can be induced to become the specific reactive group include azobis compounds [such as 4,4'-azobis(4-cyanovaleric acid), 4,4'-azobis(4-cyanovaleryl chloride), 2,2'-azobis(2-cyanopropanol), 2,2'-azobis(2-cyanopentaol), 2,2'-azobis[2-(5-hydroxy-3,4,5,6-tetrahydropyrimidin-2-yl)propane], 2,2'-azobis[2-methyl-N-[1,1-bis(hydroxymethyl)-2-hydroxyethyl]propionamide], 2,2'-azobis[2-methyl-N-[1,1-bis(hydroxymethyl)-ethyl]propionamide], 2,2'-azobis[2-methyl-N-(2-hydroxyethyl)-propionamide], or 2,2'-azobis(2-amidinopropane)], and thiocarbamate compounds [such as benzyl-N-methyl-N-hydroxyethyl dithiocarbamate, 2-carboxyethyl-N,N-diethyl dithiocarbamate, or 3-hydroxypropyl-N,N-dimethl dithiocarbamate].

The chain transfer agent and polymerization initiator may be respectively employed in an amount of from 0.01 to 10 parts by mass, and preferably from 0.05 to 5 parts by mass, with respect to 100 parts by mass of all the monomers. While a number-average molecular weight of the hydrophilic acrylamide macromonomer of the invention is not particularly restricted, in view of particle formation, it is preferably in a range of 500 to 200,000, more preferably in a range of 1,000 to 100,000 and further preferably in a range of 2,000 to 50,000.

In synthesizing the hydrophilic macromonomer of the invention, for the purpose of regulating the hydrophilicity and the solubility to solvents, a known polymerizable monomer may be copolymerized in addition to the monomers represented by any one of Formulae (XI), (XII) and (XIII).

Examples of the known polymerizable monomer include styrene monomers such as styrene, methylstyrene, chloromethylstyrene, 4-methoxystyrene, or 4-acetoxystyrene; (meth)acrylate esters such as methyl (meth)acrylate, ethyl (meth)acrylate, hydroxyethyl (meth)acrylate, propyl (meth)acrylate, butyl (meth)acrylate, hexyl (meth)acrylate, octyl (meth)acrylate, 2-ethylhexyl (meth)acrylate, cyclohexyl (meth)acrylate, dodecyl (meth)acrylate, stearyl (meth)acrylate, phenyl (meth)acrylate, benzyl (meth)acrylate, and 2-hydroxyethyl (meth)acrylate; and vinyl monomers such as vinyl acetate or vinylimidazole. Such polymerizable monomer may be copolymerized preferably in an amount of 0.1 to 30 mol %, and more preferably 1 to 10 mol %, with respect to all the polymerizable monomers.

While specific examples of the hydrophilic macromonomers are shown below, the present invention is not limited thereby.

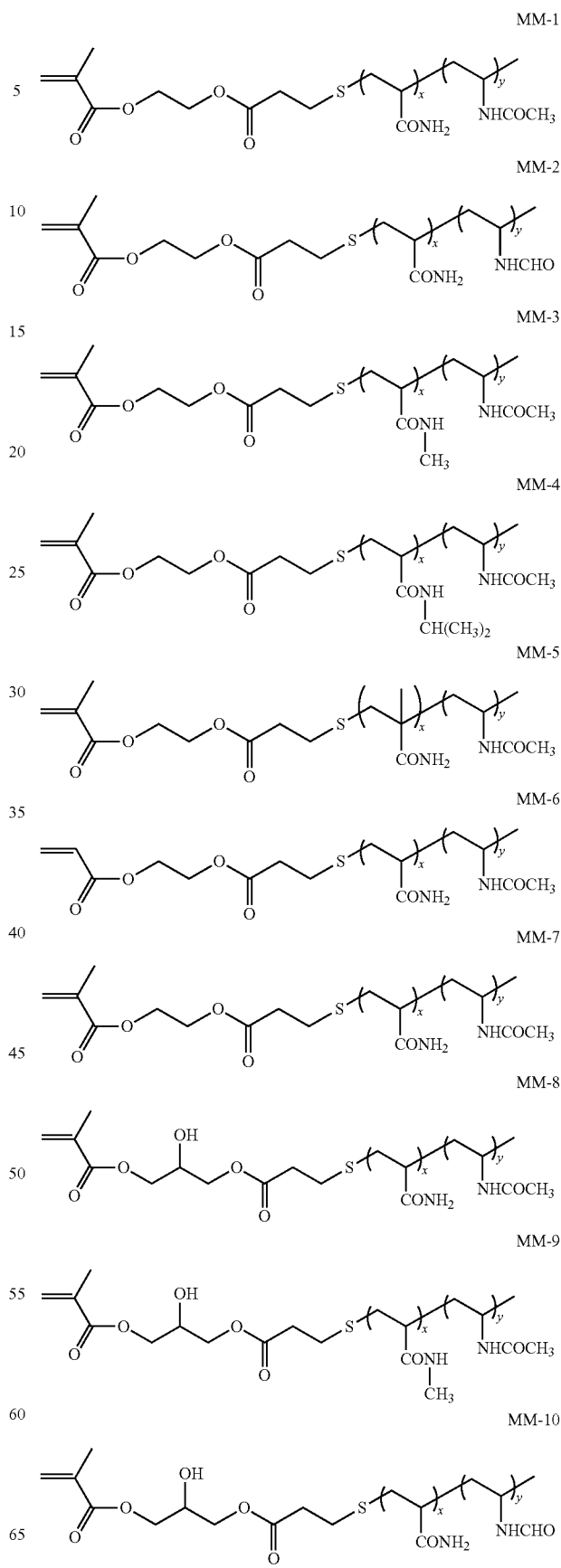

MM-11 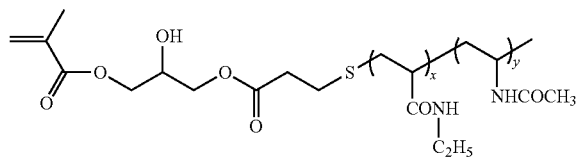
MM-12 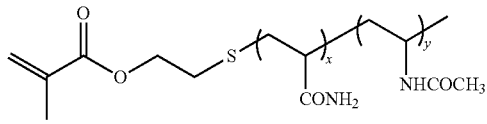
MM-13 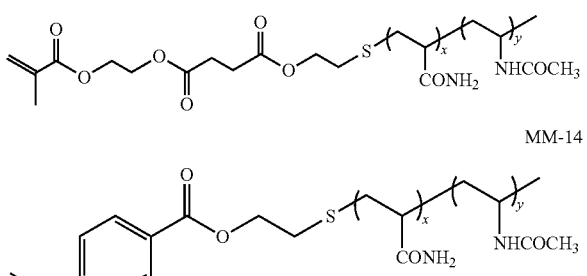
MM-14 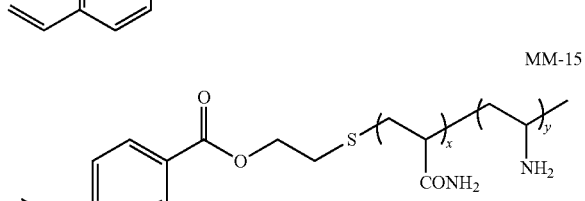
MM-15 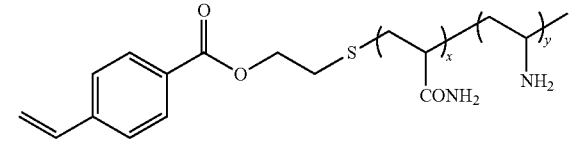
MM-16 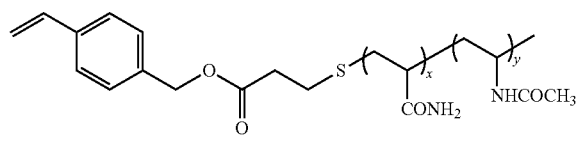
MM-17 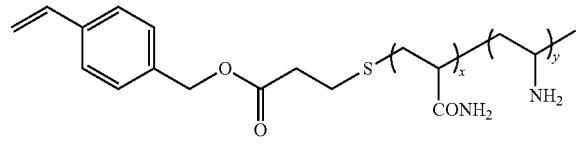
MM-18 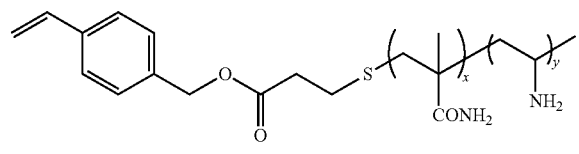
MM-19 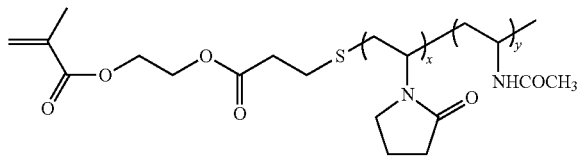
MM-20 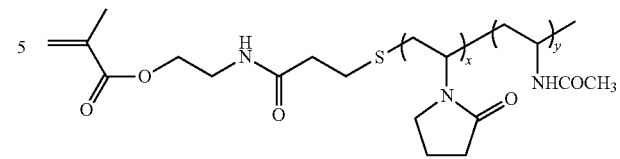
MM-21 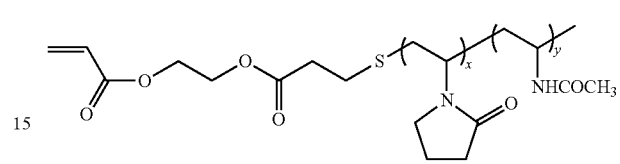
MM-22 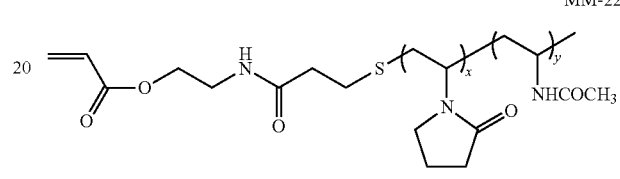
MM-23 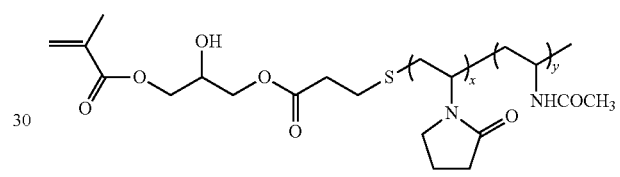
MM-24 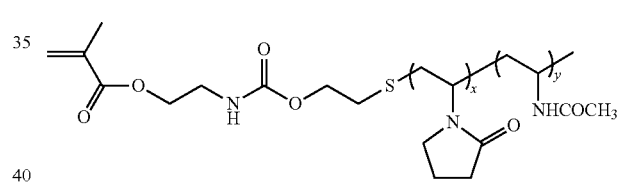
MM-25 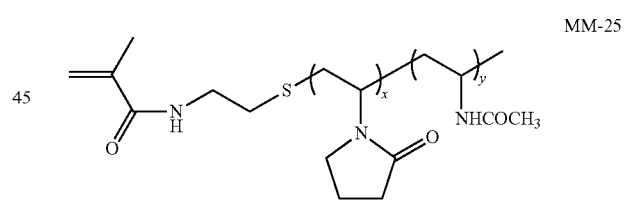
MM-27 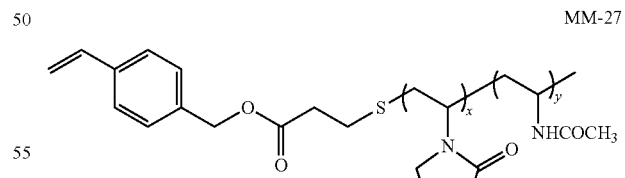
MM-28 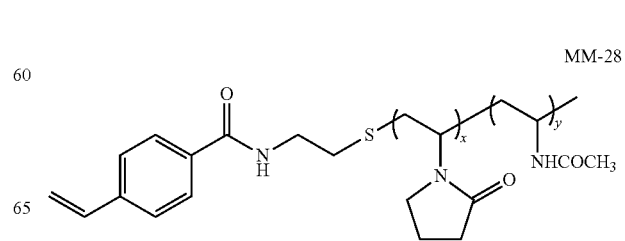

MM-29
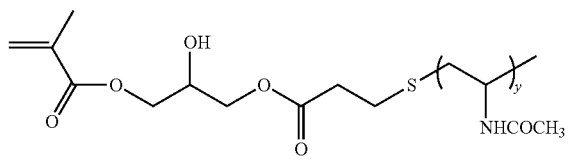

MM-30
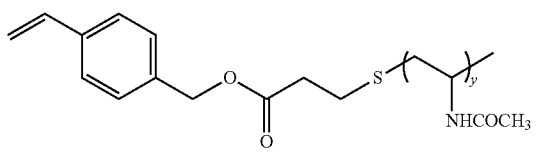

MM-31
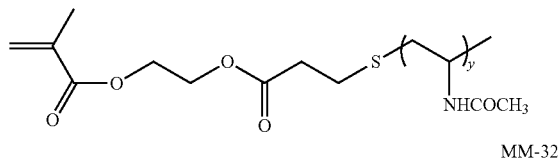

MM-32
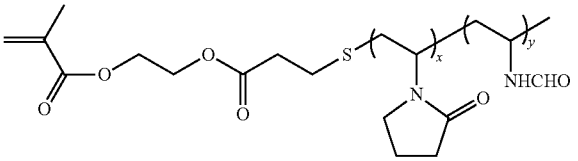

MM-33
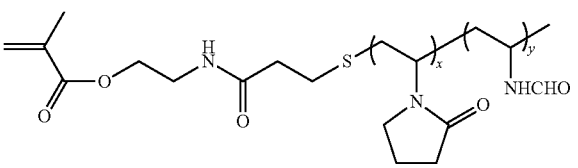

MM-34
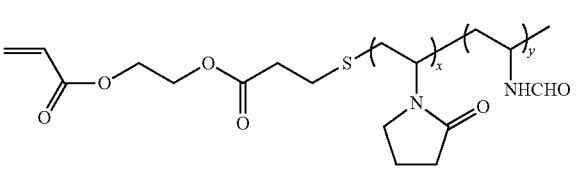

MM-35
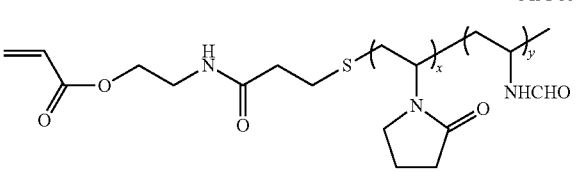

MM-36
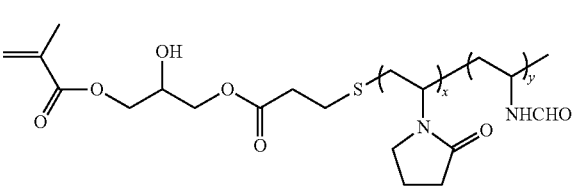

In view of supporting the particle formation property, a macromonomer which is other than the hydrophilic macromonomer may also be used in combination in the invention. Specific examples thereof include a polyalkyleneoxy group-containing hydrophilic macromonomer. Commercially-available macromonomers may be used as the polyalkyleneoxy group-containing hydrophilic macromonomer. Specific examples thereof include: BLEMMER®PE-90, BLEMMER®PE-200, BLEMMER®PE-350, BLEMMER®AE-90, BLEMMER®AE-200, BLEMMER®AE-350, BLEMMER®70PEP-350B BLEMMER®AEP, BLEMMER®55PET-800, BLEMMER®PME-100, BLEMMER®PME-200, BLEMMER®PME-400, BLEMMER®PME-1000, BLEMMER®PME-4000, and BLEMMER®AME-400 (all manufactured by Nippon Oil & Food Corporation); and methoxy polyethyleneglycol acrylate AM-90G, methoxy polyethyleneglycol acrylate AM-230G, methoxy polyethyleneglycol acrylate M-90G, and methoxy polyethyleneglycol acrylate M-230G (all manufactured by Shin-nakamura Chemical Corporation).

SYNTHESIS EXAMPLES

Synthesis of Exemplary Compound MM-1

Under a nitrogen flow, 19.19 g of acrylamide, 2.53 g of N-vinylacetamide and 2.71 g of mercaptopropionic acid were dissolved in 90 g of N,N-dimethylformamide, and were heated to 60° C. Then 0.84 g of 2,2'-azobisisobutyronitrile were added thereto. The thus-obtained mixture was agitated at 60° C. for 4 hours, further agitated at 70° C. for 2 hours, and furthermore agitated at 85° C. for 2 hours. After cooling to the room temperature, the thus-obtained reaction mixture was poured into ethanol, and a polymer deposited thereby was separated by suction filtration and dried under a reduced pressure at the room temperature so as to obtain 21.2 g of the polymer. An acid value measurement by a titration with a 0.1N aqueous solution of potassium hydroxide indicated that 1 g of the polymer contained 0.43 mmols of acid. A GPC measurement indicated that the polymer had a number-average molecular weight Mn of 2,400.

20 g of the thus-obtained polymer, 10 g of 2-hydroxyethyl methacrylate and 0.11 g of dimethylaminopyridine were dissolved in 100 g of distilled water. Then 15.75 g of 1-ethyl-3-(3-dimethylaminopropyl)carbodiimide hydrochloride was added thereto. The thus-obtained mixture was agitated for one day at the room temperature. The thus-obtained reaction mixture was poured into 1 L of ethanol, and a polymer precipitated thereby was separated by a suction filtration and vacuum dried at the room temperature so as to obtain 19.8 g of the polymer MM-1. A titration with a 0.1N aqueous solution of potassium hydroxide detected 0.011 mmols of acid per 1 g of the polymer, indicating that most of carboxylic acids in the polymer were esterified by the reaction with 2-hydroxyethyl methacrylate. A GPC measurement indicated that the polymer had a number-average molecular weight Mn of 2,500.

Synthesis of Exemplary Compound MM-31

Under a nitrogen flow, 42.56 g of N-vinylacetamide and 5.31 g of mercaptopropionic acid were dissolved in 127 g of ethanol, and were heated to 60° C. Then 2.48 g of 2,2'-azobis (2,4-dimethylvaleronitrile) was added thereto. The thus-obtained mixture was agitated at 60° C. for 4 hours, and further agitated at 70° C. for 2 hours. After cooling to the room temperature, 50 g of ethanol was poured into the thus-obtained reaction mixture for diluting. Further, the diluted resultant was poured into 2 L of ethyl acetate, and a polymer deposited thereby was separated by suction filtration and dried under a reduced pressure at the room temperature so as to obtain 34.7 g of the polymer. An acid value measurement by a titration with a 0.1N aqueous solution of potassium hydroxide indicated that 1 g of the polymer contained 0.29 mmols of acid. A GPC measurement indicated that the polymer had a number-average molecular weight Mn of 3,500.

33 g of the thus-obtained polymer was dissolved in 132 g of dimethyl sulfoxide. 15.1 g of 2-hydroxyethyl methacrylate, 0.39 g of dimethylaminopyridine and 7.3 g of diisopropyl carbodiimidewere were added thereto. The thus-obtained mixture was agitated at 40° C. for 4 hours. After cooling to the room temperature, 30 g of ethanol was poured into the thus-obtained reaction mixture for diluting. Further, the diluted resultant was poured into 2 L of ethyl acetate, and a polymer deposited thereby was separated by suction filtration and dried under a reduced pressure at the room temperature so as to obtain 31.3 g of the hydrophilic macromonomer MM-31.

A titration with a 0.1N aqueous solution of potassium hydroxide detected the presence of no acid in the polymer, indicating that carboxylic acids in the polymer disappeared by the reaction with 2-hydroxyethyl methacrylate. A GPC measurement indicated that the polymer had a number-average molecular weight Mn of 3,600.

Synthesis of Exemplary Compound MM-32

Under a nitrogen flow, 14.22 g of N-vinylacetamide, 22.23 g of N-vinylpyrolidone and 3.4 g of mercaptopropionic acid were dissolved in 106 g of ethanol, and were heated to 60° C. Then 1.0 g of 2,2'-azobis(2,4-dimethylvaleronitrile) was added thereto. The thus-obtained mixture was agitated at 60° C. for 4 hours, and further agitated at 75° C. for 2 hours. After cooling to the room temperature, 50 g of ethanol was poured into the thus-obtained reaction mixture for diluting. Further, the diluted resultant was poured into 2 L of ethyl acetate, and a polymer deposited thereby was separated by suction filtration and dried under a reduced pressure at the room temperature so as to obtain 35 g of the polymer. An acid value measurement by a titration with a 0.1N aqueous solution of potassium hydroxide indicated that 1 g of the polymer contained 0.34 mmols of acid. A GPC measurement indicated that the polymer had a number-average molecular weight Mn of 3,000.

25 g of the thus-obtained polymer was dissolved in 100 g of dimethyl sulfoxide. 13.08 g of 2-hydroxyethyl methacrylate, 0.34 g of dimethylaminopyridine and 6.34 g of diisopropyl carbodiimidewere were added thereto. The thus-obtained mixture was agitated at 40° C. for 4 hours. After cooling to the room temperature, 30 g of ethanol was poured into the thus-obtained reaction mixture for diluting. Further, the diluted resultant was poured into 2 L of ethyl acetate, and a polymer deposited thereby was separated by suction filtration and dried under a reduced pressure at the room temperature so as to obtain 23 g of the hydrophilic macromonomer MM-32.

A titration with a 0.1N aqueous solution of potassium hydroxide detected the presence of no acid in the polymer, indicating that carboxylic acids in the polymer disappeared by the reaction with 2-hydroxyethyl methacrylate. A GPC measurement indicated that the polymer had a number-average molecular weight Mn of 3,100.

Hydrophobic Radical-polymerizable Monomer

Conventionally-known radical-polymerizable monomers which can bind to an ethylenic unsaturated bond may be employed as the hydrophobic radical-polymerizable monomer in the invention. Radical-polymerizable monomers which are soluble in water or an aqueous solvent may be also employed as the hydrophobic radical-polymerizable monomer in the invention.

Examples of the known radical-polymerizable monomer include styrenic monomers such as styrene, methylstyrene, chloromethylstyrene, 4-methoxystyrene, and 4-acetoxystyrene; (meth)acrylate esters such as methyl (meth)acrylate, ethyl (meth)acrylate, propyl (meth)acrylate, butyl (meth) acrylate, hexyl (meth)acrylate, octyl (meth)acrylate, 2-ethylhexyl (meth)acrylate, cyclohexyl (meth)acrylate, dodecyl (meth)acrylate, stearyl (meth)acrylate, phenyl (meth)acrylate, benzyl (meth)acrylate, and 2-hydroxyethyl (meth)acrylate; and vinyl monomers such as vinyl acetate, vinyl chloride, vinylimidazole and vinylpyridine. The polymerization of the radical-polymerizable monomer may be conducted either using single kind of these monomers or using two or more kinds thereof in a copolymerization manner.

A crosslinking structure may be introduced into the particle polymer for the purpose of improving the strength of the particle. A bivalent radical-polymerizable monomer such as divinylbenzene or ethyl glycol dimethacrylate is preferably utilized for this purpose. The bivalent radical-polymerizable monomer may be employed in a range of 1 to 20 mol %, and more preferably in a range of 2 to 10 mol %, with respect to the total molar amount of the radical-polymerizable monomers constituting the particle.

Polymer Fine Particle

A polymer for constituting the polymer fine particle of the invention is preferably a styrene resin or a (meth)acrylic resin explained in the followings, and more preferably a (meth) acrylic resin in terms of the transparency in the ultraviolet region. Such polymer can be obtained by radical polymerizing a radical-polymerizable monomer, in the presence of a radical generator explained in the followings. Examples of the radical-polymerizable monomer include styrenic monomers such as styrene, methylstyrene, chloromethylstyrene, 4-methoxystyrene or 4-acetoxystyrene; and (meth)acrylate esters such as methyl (meth)acrylate, ethyl (meth)acrylate, propyl (meth)acrylate, butyl (meth)acrylate, hexyl (meth) acrylate, octyl (meth)acrylate, 2-ethylhexyl (meth)acrylate, cyclohexyl (meth)acrylate, dodecyl (meth)acrylate, stearyl (meth)acrylate, phenyl (meth)acrylate, benzyl (meth)acrylate, or 2-hydroxyethyl (meth)acrylate.

While a particle size of the polymer fine particles is not particularly restricted, a volume-average particle size of the polymer fine particles is generally in a range of 0.01 to 20 µm. Particularly in a case where the polymer fine particles is used in a complex member for fluorescence detection, the volume-average particle size is preferably in a range of 0.05 to 2 µm. Problems such as precipitating property can be prevented by conditioning the volume-average particle size to be equal to or less than 2 µm. In addition, handling property can be improved by conditioning the volume-average particle size to be equal to or more than 0.05 µm. For these reasons, the polymer fine particles of the invention more preferably have a volume-average particle size of from 0.05 to 1 µm, further preferably from 0.05 to 0.5 µm, and most preferably from 0.05 to 0.3 µm.

The polymer particle is preferably, in view of suppressing a non-specific reaction, a particle having a core-shell configuration formed of a hydrophobic core and a hydrophilic shell as described in JP-A-7-316244, JP-A-8-183760 and WO 2002/097436.

A water-insoluble polymer compound, to be employed for forming the core portion, may be any polymer compound as long as it is insoluble in water and that is capable, in forming the core portion, of integrating a signal generating substance therein. Examples of the water-insoluble polymer compound include hydrophobic polymers such as polystyrene, polymethyl methacrylate, poly-2-hydroxyethyl methacrylate, polyisoprene, polyvinyl chloride, polylactic acid, polylactone or polylactam. The core portion may be substantially formed of one kind of these water-insoluble polymer compounds or a combination of two or more kinds thereof.

While a number-average molecular weight of the water-insoluble polymer compound is not particularly restricted, in consideration of the dispersibility of the polymer particles, it is in a range of 500 to 100,000 and preferably in a range of 1,000 to 10,000.

While a shape of the core portion is not particularly limited, it is generally approximately spherical or approximately ellipsoidal. While a dimension of the core portion is not also particularly limited, and it may be suitably changed according to the purpose, a diameter of the core portion of approximately spherical shape is generally about from 5 to 500 nm.

A hydrophilic high molecular compound employable for forming the shell portion is a linear polymer compound, which is not particularly restricted, as long as it has a portion which is capable of bonding with a surface of the core portion and further has a portion having a reactive functional group or it is capable of being introduced by a reactive functional group and can be disposed in a brush-like state on the surface of the core portion.

In the invention, "shell portion covering the surface of the core portion in a brush-like state" means that the shell portion is formed by a plurality of linear hydrophilic high molecular compounds, each of which is bonded, at a portion thereof, to the surface of the core portion, and at least one free terminal end thereof protrudes in a fiber-like or rod-like manner into a reaction liquid system for reacting at least the hydrophilic high molecular compound with a substance to be bonded thereto (such as an antigen or an antibody).

Each free terminal end of the hydrophilic high molecular compound chains in such a brush-like state is provided with a reactive functional group capable of bonding with the combination substance such as a physiologically active substance (such as antibody, enzyme or DNA), thus the outermost periphery of the shell portion is covered by a plurality of reactive functional groups.

Examples of the hydrophilic high molecular compound (hydrophilic polymer) include polyethylene glycol (PEG), polyvinyl alcohol, polyamino acid, poly(meth)acrylic acid, polydimethylaminoethyl (meth)acrylate and polyallylamine. Examples thereof further include a hydrophilic polymer having a unit represented by Formula (I) or Formula (II) and a hydrophilic macromonomer such as a (meth)acrylic macromonomer and a vinyl macromonomer.

Preferable examples of the hydrophilic polymer compound include polyethylene glycol (PEG), polyvinyl alcohol, a hydrophilic polymer having a unit represented by Formula (I) or Formula (II) and a hydrophilic macromonomer such as a (meth)acrylic macromonomer and a vinyl macromonomer.

Details of the hydrophilic polymer having a unit represented by Formula (I) or Formula (II) and the hydrophilic macromonomer such as a (meth)acrylic macromonomer and a vinyl macromonomer is provided in the paragraphs of the above "Hydrophilic polymer" and "Hydrophilic macromonomer".

While a molecular weight of the hydrophilic high molecular compound is not particularly restricted, in consideration of the particle size control and the dispersion stability of the polymer particles, the number-average molecular weight is preferably in a range of 500 to 200,000, and more preferably in a range of 1,000 to 100,000.

In the hydrophilic polymer chains constituting the shell portion of the invention, each chain of the hydrophilic high molecular compound may be substantially formed by only one kind of the hydrophilic high molecular compounds described above, or may be substantially formed by a combination of two or more kinds of the hydrophilic high molecular compounds, having hydrophilic polymer compound chains which are different from each other.

A ratio of the diameter of the core portion to the thickness of the shell portion may be suitably changed according to the purpose. For example, the diameter of the core portion may be selected from a range of 5 to 500 nm, and the thickness of the shell portion may be selected from a range of 5 to 500 nm.

The ratio of the diameter of the core portion to the thickness of the shell portion may be suitably changed according to amounts and kinds of the hydrophilic polymer and the hydrophibic radical polymerizable monomer.

In a case where a reactive functional group resides on a free terminal end of the chain of the hydrophilic high molecular compound in the invention, the reactive functional group may be positioned on one terminal end of the hydrophilic high molecular compound (the free terminal end) before another terminal end of the hydrophilic high molecular compound (bonding terminal end) is bonded to a portion of a surface of the core. Alternatively, the reactive functional group may be introduced into one terminal end of the hydrophilic high molecular compound (the free terminal end) after another terminal end of the hydrophilic high molecular compound (bonding terminal end) is bonded to a portion of a surface of the core.

Method for Forming Polymer Fine Particle

The polymer fine particle of the present invention is formed by dispersing a radical-polymerizable monomer such as a styrene compound or an acrylic acid compound in water or in an aqueous organic solvent, and executing a radical polymerization in the presence of a suitable dispersion stabilizer and a radical generator. Examples of generally-used method which matches such forming process include: an emulsion polymerization in which monomers are added to a system containing micelles of the dispersion stabilizer has been initially formed; a miniemulsion polymerization or a microemulsion polymerization in which monomers are initially formed into liquid droplets, stabilized by a dispersion stabilizer, and then subjected to a polymerization; a suspension polymerization in which a liquid containing monomers and radical generator is formed into a suspension and subjected to a polymerization; and a seed polymerization in which monomers are added to a dispersion system of solid nuclei of polymer ultrafine particles and the like and subjected to a polymerization.

The polymer fine particle of the invention, particularly in case where a polymer particle has core-shell configuration, can be formed by a polymerization method which is generally called a dispersion polymerization. More specifically, it can be formed by dispersing the radical-polymerizable monomer in water or in an aqueous organic solvent, and by executing a radical polymerization in the presence of a radical generator and a hydrophilic macromonomer having a radical-polymerizable group at a terminal end and a reactive functional group at the other terminal end.

Particularly, the polymer fine particle of the invention can be formed by dispersing and polymerizing a hydrophobic radical-polymerizable monomer in an aqueous solvent in the presence of the radical generator and a hydrophilic polymer precursor which has a polymerizable unit and at least one hydrophilic unit selected from a (meth)acrylamide hydrophilic unit and a vinylamine hydrophilic unit so that the polymer fine particle have the core-shell configuration in which a hydrophobic polymer which forms a hydrophobic core is bonded to a hydrophilic polymer which forms a hydrophilic shell.

In addition, the polymer fine particle of the invention can be formed by dispersing a hydrophobic radical-polymerizable monomer in an aqueous solvent in the presence of the radical generator and a hydrophilic (meth)acrylic macromonomer or the hydrophilic vinyl macromonomer which has a polymerizable double bond on one terminal of a main chain thereof so that the polymer fine particle have the core-shell configuration in which a hydrophobic polymer which forms a hydrophobic core is bonded to a hydrophilic polymer which forms a hydrophilic shell.

In such polymerization, while there may be employed a method of mixing and dissolving the entire amount of the hydrophobic radical-polymerizable monomer and either the hydrophilic polymer precursor or the hydrophilic macromonomer and adding the radical generator (polymerization initiator), for the purpose of controlling the reaction temperature and the particle size, a method of gradually adding the hydrophobic radical-polymerizable monomer and the radical generator to water or the aqueous organic solvent, in which either the hydrophilic polymer precursor or the hydrophilic macromonomer is dissolved in advance.

In consideration of the particle forming property, the amount of the hydrophilic polymer precursor or the hydrophilic macromonomer may be in a range of 1 to 200 mol %, and more preferably in a range of 10 to 100 mol %, with respect to the total amount of the hydrophobic radical-polymerizable monomer.

Preferable examples of the aqueous organic solvent include mixtures of water and methanol, ethanol, acetone, N,N-dimethylformamide, or tetrahydrofuran.

Commonly-known radical generator can be used in the invention. Examples thereof include persulfate salts such as sodium persulfate, potassium persulfate, lithium persulfate or ammonium persulfate, and those soluble to the radical-polymerizable monomer or the aqueous solvents such as an azo compound such as N,N-azobisisobutyronitrile (AIBN) or 2,2'-azobis(2,4-dimethylvaleronitrile) or peroxides such as benzoyl peroxide. Different kind of a radical generator may also be used in combination. An amount of the radical generator is preferably in a range of 0.01 to 5 mass %, and more preferably in a range of 0.1 to 3 mass %, with respect to the total amount of the radical-polymerizable monomer.

A reaction temperature is suitably selected according to the decomposition temperature of the initiator to be employed, and is preferably in a range of 40 to 100° C. and more preferably in a range of 60 to 80° C.

In the fluorescent polymer fine particle of the invention, it is also possible to use an additive which is capable of coordinating with the lanthanoid cation so as to suppress a loss in the fluorescence intensity caused by a hydration or the like as long as the intention of the invention is not significantly affected. Examples of the additive include an organic phosphor compound such as trioctylphosphine oxide or tributylphosphine oxide. Such additive is preferably added the monomer solution in advance to the start of the polymerization process.

Fluorescent Lanthanoid Dye

The fluorescent lanthanoid dye to be employed in the present invention is a fluorescent dye which has a lanthanoid cation and at least one organic ligand. Such fluorescent dye can be excited with a visible light, and exhibits a sensitizing effect of the ligand (a phenomenon of light emission from the lanthanoid cation by the energy of light to excite the ligand).

Such ligand is preferably a ligand including a nitrogen-containing heterocycle which has a high fluorescence intensity and a long fluorescence lifetime and is represented by Formula (L-I).

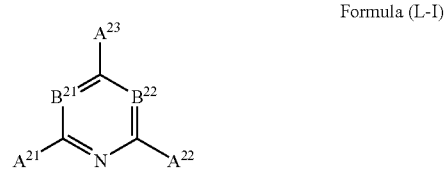

Formula (L-I)

In Formula (L-I), each of $A^{21}$, $A^{21}$, and $A^{23}$ may be the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group. Each of $B^{21}$ and $B^{22}$ independently represents a nitrogen atom or $=C(-R^{30})-$; and $R^{30}$ represents a hydrogen atom or a substituent.

More specifically, in Formula (L-I), $A^{21}$, $A^{22}$, and $A^{23}$ each represents an atomic group represented by any one of the following Formulae (L-II) to (L-V), a hydroxyl group, an alkoxy group, an aryloxy group, an alkylamino group, a dialkylamino group, an arylamino group or a diarylamino group, and may be mutually same. In the case where each represents an alkoxy group, an aryloxy group, an alkylamino group, a dialkylamino group, an arylamino group or a diarylamino group, it preferably has 1 to 12 carbon atoms in consideration of easiness in integration in the polymer fine particle and solubility to solvents.

$A^{21}$, $A^{22}$, and $A^{23}$ each is preferably an atomic group represented by any one of the following Formulae (L-II) to (L-V), in consideration of fluorescence intensity, regulation of excitation wavelength, regulation of affinity with the lanthanoid ion, easiness in integration in the polymer fine particle and solubility to solvents.

Formula (L-II)

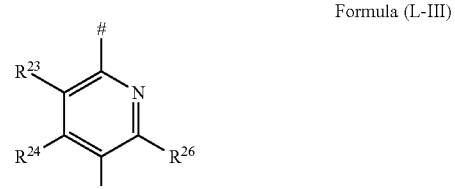

Formula (L-III)

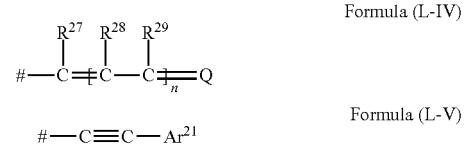

Formula (L-IV)

Formula (L-V)

In Formulae (L-II) to (L-V), each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ may be bonded with each other to form a ring. n represents an integer of 0, 1 or 2. G represents a substituted or unsubstituted carbon atom or a nitrogen atom. Q represents an atomic group which is used to form a 5-membered or 6-membered nitrogen-containing heterocyclic ring which may form a condensed ring. $Ar^{21}$ represents an aromatic hydrocarbon ring or an aromatic heterocyclic ring. Further, # represents a site to be bonded with the nitrogen-containing heterocycle in the ligand represented by Formula (L-I).

More specifically, in the formulae, $R^{21}$ and $R^{22}$ each represents a hydrogen atom or a substituent. Examples of the substituent include an alkyl group, an aryl group, an amino group, a heterocyclic group, an alkylthio group, an arylthio group, an alkoxy group, an aryloxy group, an amide group, an ureido group and a halogen atom (fluorine, chlorine, bromine or iodine). In these examples, the substituent preferably contains, excluding hydrogen atom, 1 to 50 atoms, more preferably 1 to 30 atoms and most preferably 1 to 20 atoms. In the case where the substituent contains an alkyl group, it may be of a cyclic structure or a chain-like structure which can be linear or branched, and may be saturated or may include an unsaturated bond. In the case where the alkyl group or aryl group has a substituent, preferable examples of the substituent include an alkyl group, an alkenyl group, an alkinyl group, an aryl group, a heterocyclic group, a silyl group, an alkoxy group, an amino group, an alkylamino group, a dialkylamino group, an acylamino group, a sulfonylamino group, an acyl group, a sulfonyl group, a formyl group, an alkoxycarbonyl group, a carbamoyl group, a sulfamoyl group, a halogen atom, a cyano group, a sulfo group and a carboxyl group.

$R^{23}$ to $R^{26}$ each independently represents a hydrogen atom or a substituent. In the case where $R^{23}$ to $R^{26}$ represent a substituent(s), preferable examples thereof include an alkyl group that may be substituted, an alkenyl group, an alkinyl group, an aryl group, a heterocyclic group, a silyl group, an alkoxy group, an amino group, an acylamino group, a sulfonylamino group, an acyl group, a sulfonyl group, a formyl group, an alkoxycarbonyl group, a carbamoyl group, a sulfamoyl group, a halogen atom (fluorine, chlorine, bromine or iodine), a cyano group, a sulfo group and a carboxyl group, and more preferable examples include an alkyl group that may be substituted, an alkenyl group, an alkinyl group, an aryl group, an acylamino group, a sulfonylamino group, a halogen atom and a cyano group.

$R^{23}$ to $R^{26}$ each preferably contains, excluding hydrogen atoms, 1 to 60 atoms, more preferably 1 to 45 atoms and most preferably 1 to 35 atoms.

Each of $R^{27}$ to $R^{29}$ independently represents a hydrogen atom or a substituent, and $R^{27}$ and $R^{28}$, $R^{28}$ and $R^{29}$ and/or $R^{27}$ and $R^{29}$ may be bonded with each other to form a ring. The substituent above means a substituent group selected from the group consisting of an alkyl group, an aryl group, a carboamide group, a sulfonamide group, an alkylthio group, a heterocyclic group, an alkoxy group, an aryloxy group and a combination thereof. n represents 0, 1 or 2.

$R^{27}$ to $R^{29}$ each preferably contains, excluding hydrogen atoms, 1 to 60 atoms, more preferably 1 to 45 atoms and most preferably 1 to 35 atoms.

G represents a carbon atom or a nitrogen atom, that may have a substituent. Examples of the substituent in this case are the same as those cited for $R^{21}$ and $R^{22}$.

Q represents an atomic group required for forming a 5- or 6-membered nitrogen-containing heterocycle, and such nitrogen-containing heterocycle may constitute condensed rings. Q may also be bonded with $R^{27}$, $R^{28}$ or $R^{29}$ to form a ring structure.

Preferable examples of heterocycle as Q are shown below. Following examples show heterocyclic skeletal structures, each of which may be utilized as a partially saturated skeleton and in which the position of hetero atom may be suitably selected in each cyclic structure. Condensed rings may be condensed at an arbitrary position. In addition, the preferable examples further include a cyclic structure represented by a combination of the following heterocycles.

That is, examples of heterocycle denoted by Q include pyrrole, pyrazole, imidazole, triazole, tetrazole, thiophene, furan, oxazole, thiazole, oxadiazole, thiadiazole, selenazole, pyridine, pyrimidine, pyrazine, pyridazine, triazine, tetrazine, oxazine, thiazine, oxadiazine, thiadiazine, pyrrolopyrrole, indole, pyrrolopyrazole, pyrroloimidazole, pyrrolotriazole, pyrrolotriazole, pyrrolotetrazole, thienopyrrole, pyrroloxazole, thienopyrrole, pyrroloxazole, pyrrolothiazole, pyrrolopyridine, pyrrolopyrimidine, pyrrolopyrazine, pyrrolopyridazine, pyrrolotriazine, pyrrolotetrazine, pyrroloxazine, pyrrolothiazine, pyrroloxazine, pyrrolothiadiazine, indazole, benzimidazole, benzotriazole, benzothiophene, benzofuran, benzoxazole, benzothiazole, benzoxadiazole, benzothiadiazole, benzoselenazole, quinoline, quinazoline, quinoxaline, phthalazine, benzotriazine, benzoxazine, benzothiazine, pyrazolopyrazole, pyrazoloxazole, pyrazolothiadiazole, pyrazolopyridine, pyrazolopyrimidine, pyrazolopyrazine, pyrazolopyridazine, pyrazolotriazine, pyrazoloxazine, pyrazolothiazine, pyrazolothiadiazine, imidazolopyrazole, pyrazolotriazole, pyrazolotetrazole, thienopyrazole, furopyrazole, pyrazoloxazole, imidazoloimidazole, imidazolotriazole, imidazolotetrazole, thienoimidazole, furoimidazole, imidazoloxazole, thienoimidazole, imidazoloxadiazole, imidazolothiadiazole, imidazoleselenazole, imidazolepyridine, imidazolopyrimidine, imidazolopyrazine, imidazolopyridazine, imidazolotriazine, imidazoloxazine, imidazolothiazine, imidazoloxadiazine, imidazolothiadiazine, triazolotriazole, thienotriazole, furotriazole, triazoloxazole, triazolothiazole, triazoloxadiazole, triazolothiadiazole, triazolopyridine, triazolopyrimidine, triazolopyrazine, triazolopyridazine, triazolotriazine, triazoloxazine, triazolothiazine, triazoloxadiazine, triazolothiadiazine, tetrazoloxazole, tetrazolothiazole, tetrazolopyridine, tetrazolopyrimidine, tetrazolopyrazine, tetrazolopyridazine, tetrazoloxazine, tetrazolothiazine, thienothiophene, thienofuran, thienoxazole, thienothiazole, thionoxadiazole, thienothiadiazole, thienoselenazole, thienopyridine, thienopyrimidine, thienopyrazine, thienopyridazine, thienotriazine, thienotetrazole, thienoxazine, thienothiazine, thienoxadiazine, thienothiadiazine, furoxazole, furothiazole, furoxadiazole, furothiadiazole, furopyridine, furopyrimidine, furopyrazine, furopyridazine, furotriazine, furoxazine, furothiazine, oxazoloxazole, thiazoloxazole, oxazoloxadiazole, oxazolothiadiazole, oxazolopyridine, oxazolopyrimidine, oxazolopyrazine, oxazolopyridazine, oxazolotriazine, oxazoloxazine, oxazolothiazine, oxazoloxadiazine, oxazolothiadiazine, thiazolothiazole, thiazoloxadiazole, thiazoloxadiazole, thiazoloselenazole, thiazolopyridine, thiazolopyrimidine, thiazolopyrazine, thiazolopyridazine, thiazolotriazine, thiazoloxazine, thiazolothiazine, thiazoloxadiazine, thiazolothiadizine, dithiole, dioxole, benzodithiole, and benzodioxole.

Q preferably contains, excluding hydrogen atoms, 4 to 70 atoms, more preferably 5 to 55 atoms and most preferably 6 to 45 atoms.

$B^{21}$ and $B^{22}$ each independently represents a nitrogen atom or $=C(-R^{30})-$, wherein $R^{30}$ represents a hydrogen atom or a substituent. It is preferred that at least either of $B^{21}$ and $B^{22}$ represents a nitrogen atom.

$R^{30}$ represents a hydrogen atom or a substituent. In the case where $R^{30}$ represents a substituent, it is preferably an alkyl group, an alkenyl group, an alkinyl group, an aryl group, a heterocyclic group, a silyl group, an alkoxy group, an amino group, an acylamino group, a sulfonylamino group, an acyl group, a sulfonyl group, a formyl group, an alkoxycarbonyl group, a carbamoyl group, a sulfamoyl group, a halogen atom, a cyano group, a sulfo group, or a carboxyl group, each of these may be substituted when it can have a substituent. More preferably, R represents an alkyl group, an alkenyl group, an alkinyl group, an aryl group, an acyl group, a sulfonyl group, an alkoxycarbonyl group, a carbamoyl group, a halogen atom, or a cyano group, each of these may be substituted when it can have a substituent. $R^{30}$ preferably contains, excluding hydrogen atoms, 1 to 30 atoms, more preferably 1 to 20 atoms and most preferably 1 to 10 atoms.

$Ar^{21}$ represents an aromatic carbon ring or an aromatic heterocycle, having 6 to 30 carbon atoms. Preferable examples of the aromatic carbon ring include a benzene ring, a thiophene ring, a furan ring, a pyrrole ring, a pyrazole ring, a triazole ring, a thiazole ring, an imidazole ring, an oxazole ring, an oxadiazole ring and a thiadiazole ring, and another ring may be further condensed to such ring structure. In the case where $Ar^{21}$ has a substituent, examples thereof are the same as those cited for $R^{21}$ and $R^{22}$ above.

In Formulae (L-II) to (L-V), # indicates a position to be bonded with the nitrogen-containing heterocycle represented by Formula (L-I).

The nitrogen-containing heterocyclic ligand in the invention is, in consideration of the fluorescence intensity, absorption wavelength and easiness in integration in the polymer fine particle, preferably a triazine ring-containing ligand represented by Formula (L-VI), and more preferably a triazine ring-containing ligand represented by Formula (L-VII).

Formula (L-VI)

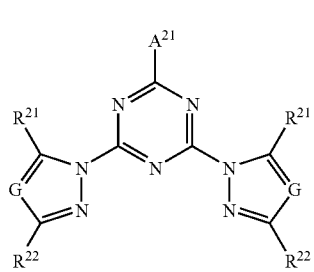

In Formula (L-VI), $A^{21}$ is the same as the above $A^1$ in Formula (L-I); and $R^{21}$, $R^{22}$ and G are respectively the same as the above $R^{11}$, $R^{12}$ and G in Formulae (L-II) to (L-V).

Formula (L-VII)

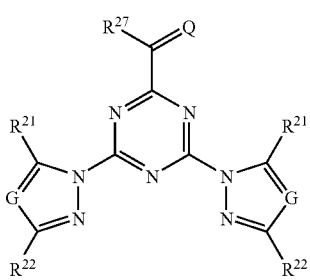

In Formula (L-VII), $R^{21}$, $R^{22}$, $R^{27}$, G and Q are respectively the same as the above $R^{21}$, $R^{22}$, $R^{27}$ and Q in Formulae (L-II) to (L-V).

While specific exemplary compounds 1 to 32 are shown below as the nitrogen-containing heterocyclic ligand used in the invention, it is noted that the invention is not limited by them.

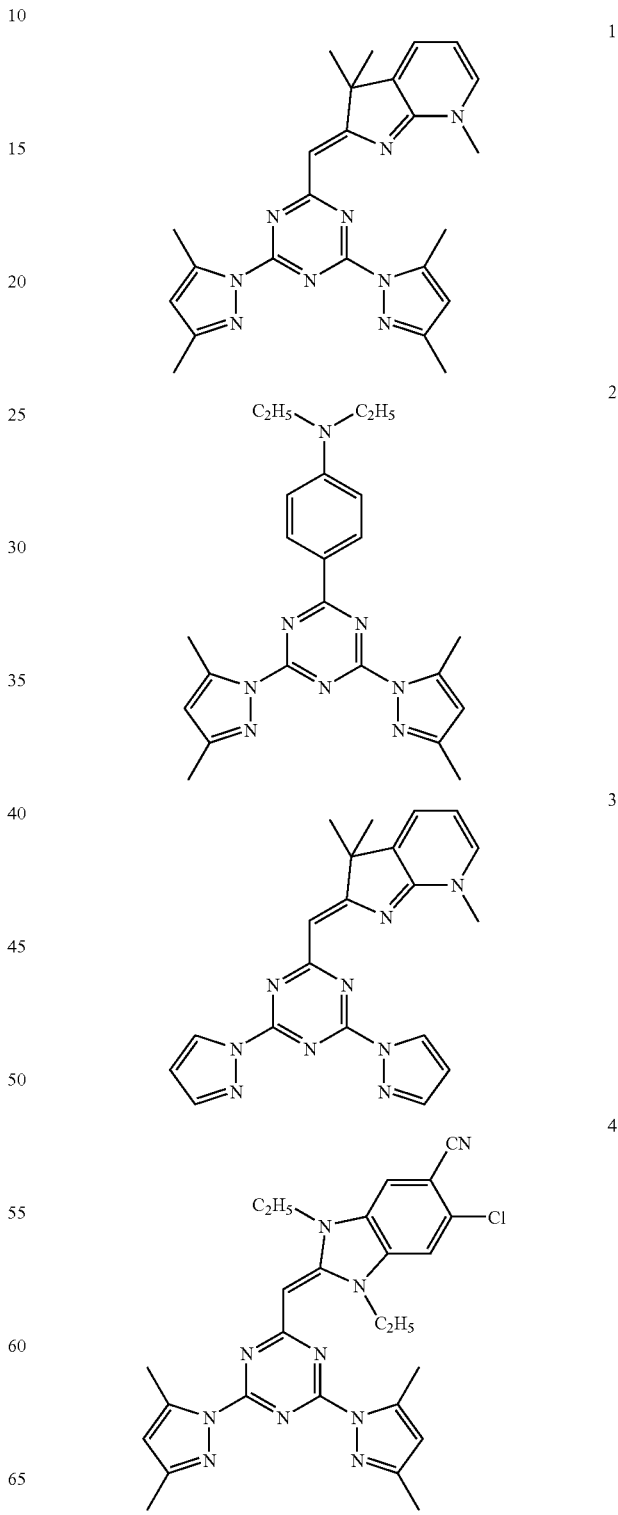

43
-continued
5
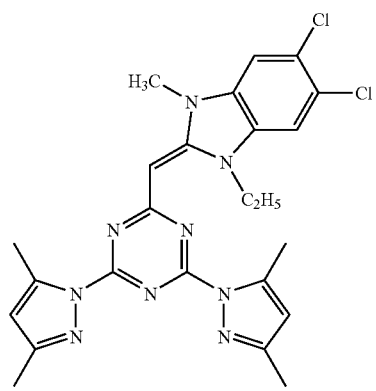
6
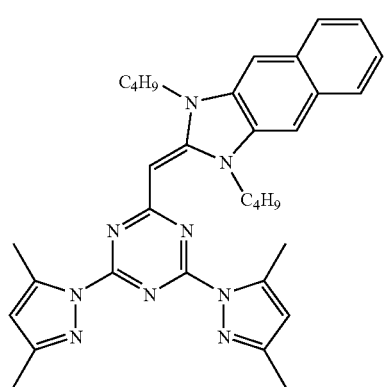
7
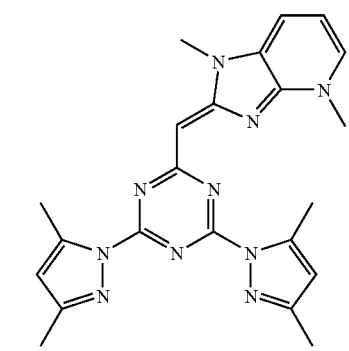
8
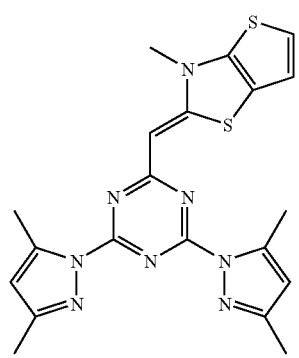
44
-continued
9
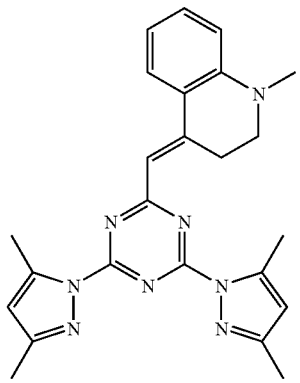
10
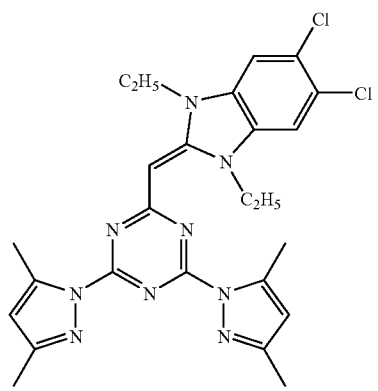
11
12

13
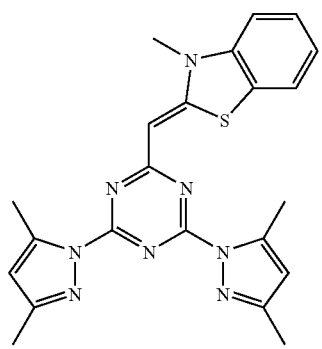
14
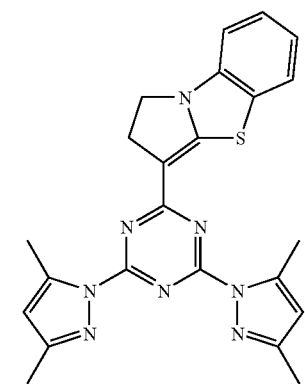
15
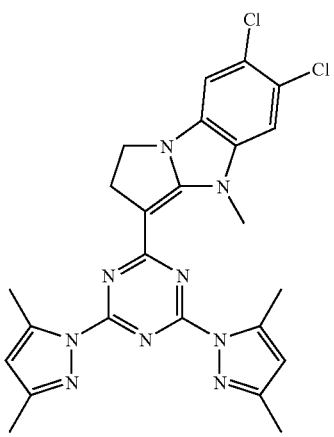
16
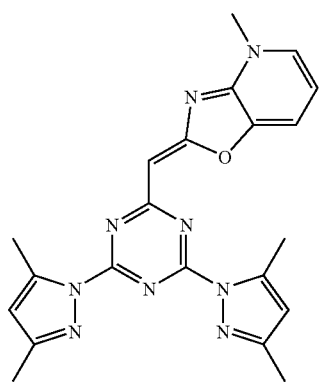
17
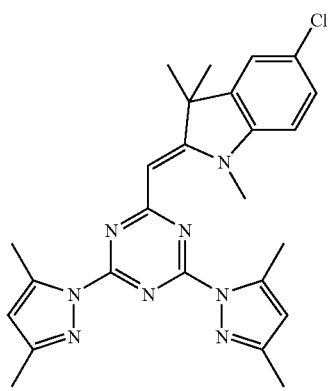
18
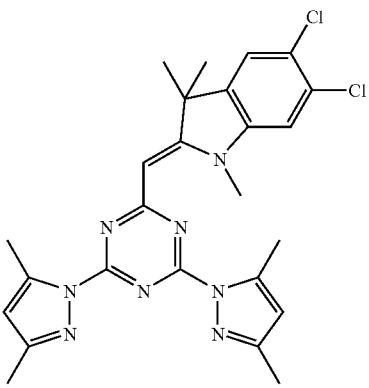
19
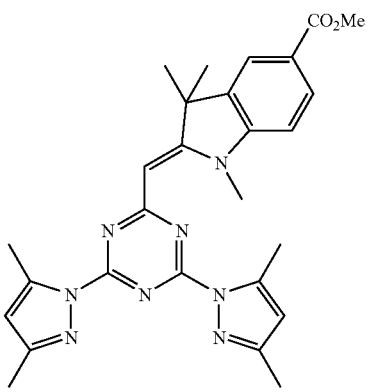
20
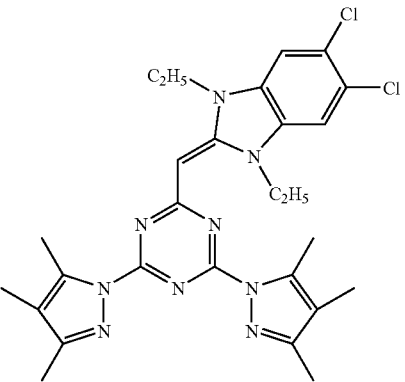

47
-continued
21
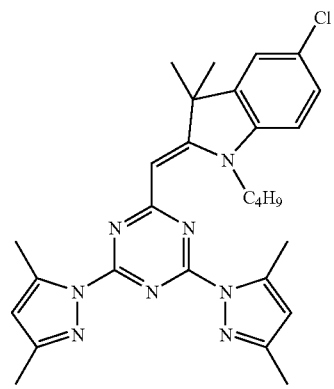
22
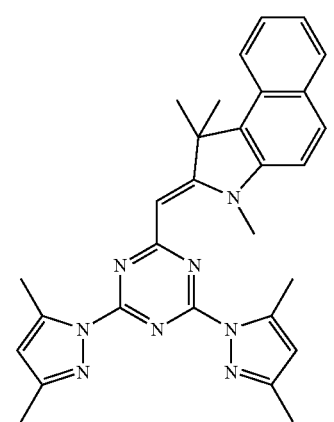
23
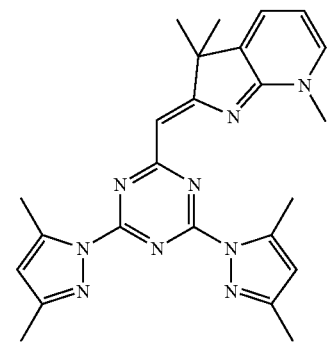
24
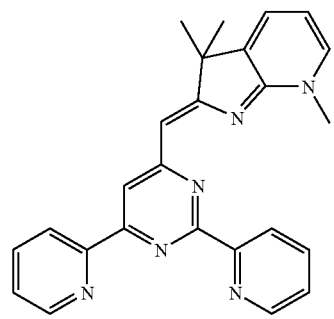
48
-continued
25
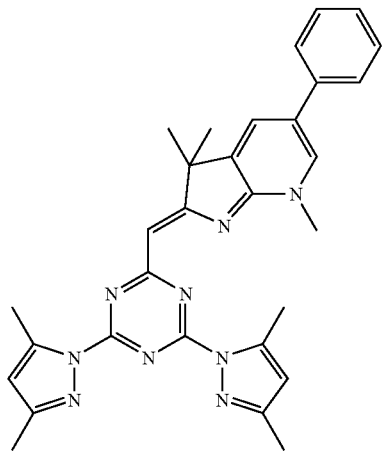
26
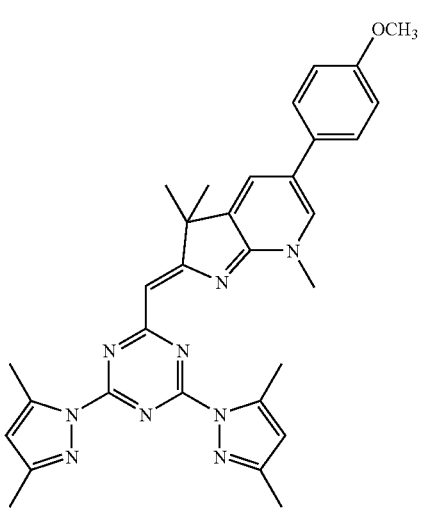
27
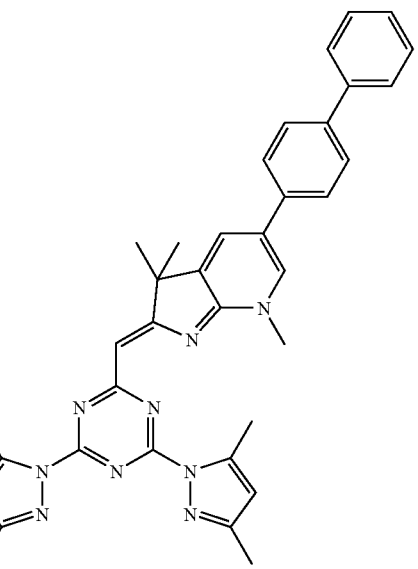

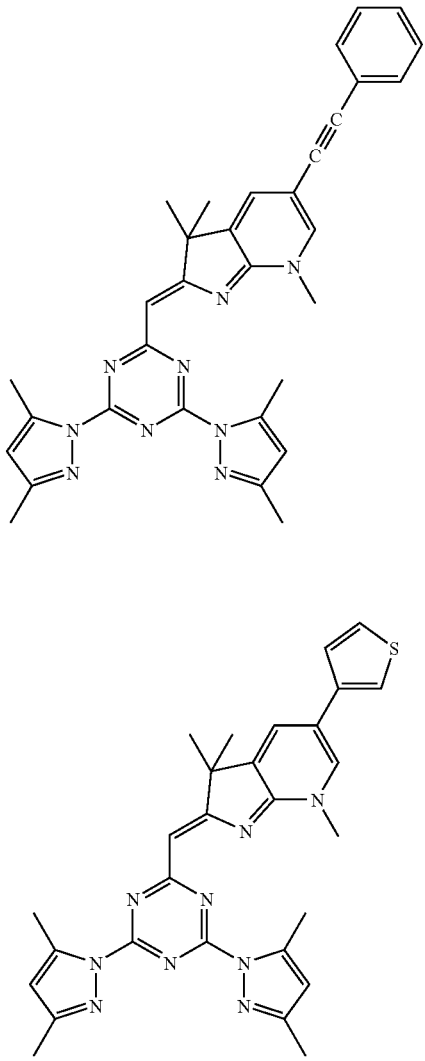

28

29

30

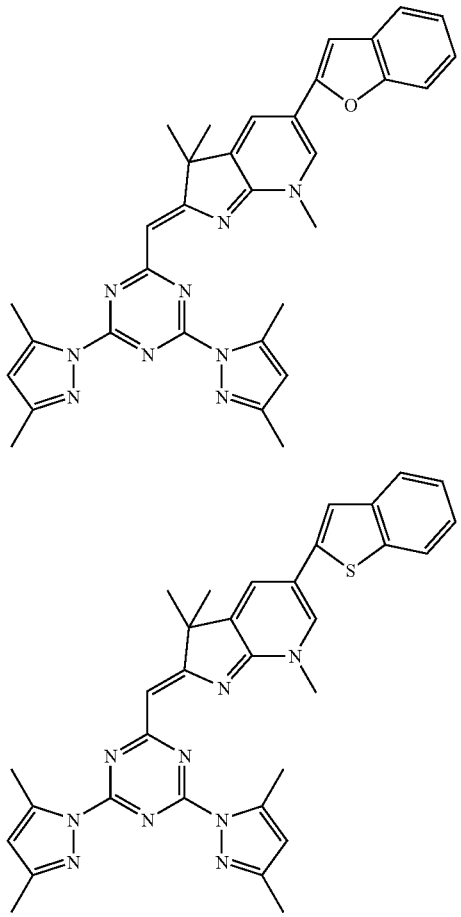

31

32

The exemplary compounds above may be synthesized utilizing known compounds and known reaction conditions. The compound represented by Formula (L-I) may be synthesized preferably by a nucleophilic substitution reaction of the atomic groups $A^{21}$-$A^{23}$ on cyanuric chloride.

For example, the exemplary compounds may be synthesized by reacting a compound represented by Formula (LP-I) and a compound represented by Formula (LP-III).

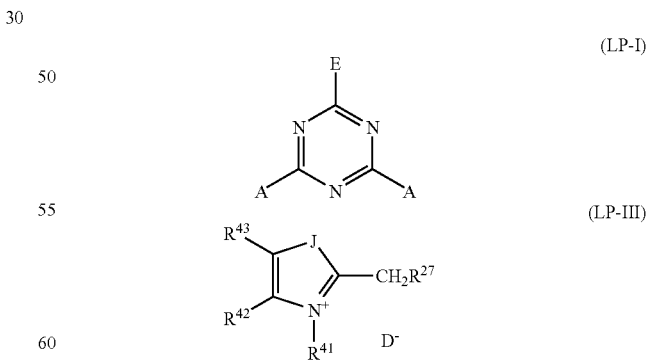

In Formula (LP-I), A is the same as described above for $A^{21}$, $A^{22}$ and $A^{23}$, and E represents a releasable group or A. In Formula (LP-III), $R^{27}$ is the same as described above, and $R^{41}$ represents an alkyl group that may be substituted or an aryl group (including heteroaryl group) that may be substituted, and that preferably has 1 to 30 carbon atoms, more preferably 1 to 20 carbon atoms and further preferably 1 to 12 carbon atoms.

$R^{42}$ and $R^{43}$ each represents a hydrogen atom or a substituent, provided that the pair of $R^{41}$ and $R^{42}$ or the pair of $R^{42}$ and $R^{43}$ may be bonded each other if possible to form a ring. In the case where $R^{42}$ and $R^{43}$ each represents a substituent, preferable examples thereof include an alkyl group, an aryl group, an amino group, a heterocyclic group, an alkylthio group, an arylthio group, an alkoxy group, an aryloxy group, an amide group, an ureido group and a halogen atom (fluorine, chlorine, bromine, or iodine). The substituent, in the examples cited above, preferably includes, excluding hydrogen atoms, 1 to 60 atoms, more preferably 1 to 45 atoms and most preferably 1 to 35 atoms.

D represents a counter ion for the ammonium ion in Formula (LP-III). J represents an oxygen atom, $-CR^{44}R^{45}-$, $NR^{46}$ or a sulfur atom, and, may be bonded with $R^{38}$, when possible, to form a ring. $R^{44}$, $R^{45}$ and $R^{46}$ each represents an alkyl group that may be substituted or an aryl group, and such alkyl group preferably have 1 to 30 carbon atoms, more preferably 1 to 20 carbon atoms and most preferably 1 to 10 carbon atoms, also may be of a cyclic structure or a chain-like structure which can be straight or branched, and may be saturated or may include an unsaturated bond.

Preferable examples of the releasable group as E in Formula (LP-1) include a halogen atom (fluorine, chloride, bromine or iodine), an aryloxy group (such as a phenoxy group or a 4-nitrophenoxy group), an arylthio group (such as a phenylthio group or a 4-bromophenylthio group), a sulfonyloxy group (such as a p-toluenesulfonyloxy group or a trifluoromethanesulfonyloxy group), a carbamoyloxy group (such as a dimethylcarbamoyloxy group or a morpholinocarbonyloxy group), among which a halogen atom is most preferable.

Examples of the counter ion as D in Formula (LP-III) include a halide ion (a fluorine ion, a chlorine ion, a bromine ion or an iodine ion), a sulfate ion, a perchlorate ion, a nitrate ion, a hydrosulfate ion, a sulfonate ion (such as a p-toluenesulfonate ion or a p-chlorobenzenesulfonate ion), a sulfate ester ion (such as a monomethyl sulfate ion), a tetrafluoroborate ion, and a hexafluorophosphate ion.

The nitrogen-containing heterocyclic ligand of the invention may be obtained by mixing a compound represented by Formula (LP-I) and a compound represented by Formula (LP-III), preferably in the presence of a solvent, and reacting these compounds preferably in the presence of a base at an appropriate temperature.

While most bases employed commonly in the organic syntheses are usable in the invention as the base in this operation, preferable examples thereof include pyridines (such as pyridine, or 2,6-lutidine), tertiary amines (such as triethylamine, N-ethyldiisopropylamine, N-methylmorpholine or tributylamine), guanidines (such as triphenylguanidine or 1,1,3,3-tetramethylguanidine), amidines (such as 1,8-diazabicyclo[5.4.0]-7-undecene, or 1,5-diazabicyclo[4,3,0]-5-nonene), anilines (such as N,N-diethylaniline), potassium carbonate, sodium carbonate, sodium hydrogencarbonate, sodium hydride, sodium methoxide, sodium ethoxide, sodium t-butoxide, potassium t-butoxide, potassium acetate, and sodium acetate, and more preferable examples thereof include pyridines, tertiary amines, guanidines and amidines.

While the solvent to be employed may be either a protonic solvent or a non-protonic solvent, a non-protonic solvent is preferable. Preferable examples thereof include acetonitrile, N,N-dimethylformamide, dimethyl sulfoxide, tetrahydrofuran, diethyl ether, N,N-dimethylacetamide, N-methylpyrrolidone, and 1,3-dimethyl-2-imidazolidinone.

While the reaction temperature should be suitably selected according to the respective reaction, in the present invention, it is generally within a preferable range of from −20° to 150° C., more preferably from 0° to 120° C. and most preferably from 0° and 100° C.

While in the reaction, the materials may be charged in any order, it is preferable to dissolve or suspend the compound represented by Formula (LP-I) and the compound represented by Formula (LP-III) in the solvent, and the base is further added thereto under agitation.

SYNTHESIS EXAMPLES

Synthesis of Exemplary Compound 4

For example, the Exemplary compound 4 may be synthesized by a following process.

18.4 g of cyanuric chloride are dissolved in 100 mL of dimethylacetamide, and 69.2 g of 3,5-dimethylpyrazole are added at the room temperature. Then the materials are reacted for 2 hours at a reaction temperature of 80° C.

After cooling, the reaction liquid is poured into water, and the deposited crystals are collected by filtration and recrystallized from dimethylformamide to obtain (LP-1-1) shown below. Obtained amount: 21.0 g, yield: 57.9%.

NMR spectral data (in deuterized chloroform): 6.11 (3H, s), 2.81 (9H, s), 2.33 (9H, s).

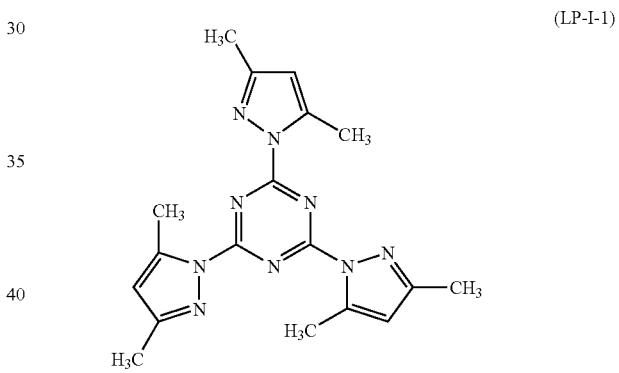

(LP-I-1)

419 mg of 6-chloro-5-cyano-1,3-diethyl-2-methyl-1H-benzimidazolium p-toluenesulfonate and 363 mg of the aforementioned compound (LP-1-1) are suspended in 8 mL of dimethylsulfoxide, and, with an addition of 0.5 mL of tetramethylguanidine, are reacted for 30 minutes at 80° C.

After cooling, crystals deposited by addition of water are subjected to a filtration under a reduced pressure, and the obtained crystals are purified by a silica gel chromatography. The product is recrystallized from a mixture of methanol and ethyl acetate to obtain an object substance. Obtained amount: 287 mg, yield: 55.7%.

NMR spectral data (in deuterized chloroform): 7.34 (1H, s), 7.21 (1H, s), 6.04 (2H, s), 5.31 (1H, s), 4.53 (2H, q), 4.39 (2H, q), 2.70 (6H, s), 2.33 (6H, s), 1.31 (3H, t), 1.28 (3H, t).

Other Exemplary compounds can be synthesized in a similar manner as the Exemplary compound 4, by changing the portions corresponding to $A^{21}$-$A^{23}$ to those of the desired compound.

The nitrogen-containing heterocyclic ligand of the present invention may be employed in a range of 0.1 to 10 time equivalents with respect to the equivalent of the lanthanoid cation, and it may be employed more preferably in a range of 1 to 5 time equivalents.

Examples of the lanthanoid cation include cations of bivalent to tetravalent, and specific examples include $Ce^{3+}$, $Pr^{3+}$, $Nd^{3+}$, $Nd^{4+}$, $Sm^{2+}$, $Sm^{3+}$, $Eu^{2+}$, $Eu^{3+}$, $Tb^{3+}$, $Dy^{3+}$, $Dy^{4+}$, $Ho^{3+}$, $Er^{3+}$, $Tm^{2+}$, $Tm^{3+}$, $Yb^{2+}$ and $Yb^{3+}$. Among these, trivalent cations such as $Pr^{3+}$, $Nd^{3+}$, $Sm^{3+}$, $Eu^{3+}$, $Tb^{3+}$, $Dy^{3+}$, $Ho^{3+}$, $Er^{3+}$, $Tm^{3+}$, and $Yb^{3+}$ are preferable as they emit fluorescence with features of a region from ultraviolet to near infrared, a long lifetime, a narrow wavelength width and the like, particularly $Nd^{3+}$, $Sm^{3+}$, $Eu^{3+}$, $Tb^{3+}$, $Dy^{3+}$ and $Tm^{3+}$ are more preferable, and $Eu^{3+}$ and $Tb^{3+}$ are most preferable in terms of the fluorescence intensity.

In addition to the ligand of Formula (L-I), another known organic ligand for lanthanoid cation may be used in combination, in view of the fluorescence intensity and the easiness in synthesis of lanthanold dye.

Examples of other organic ligand include aromatic amines (Helv. Chim. Acta., Vol. 79, P. 789, 1966), β-diketones (Anal. Chem., Vol. 70, P. 596-601, 1998), and aromatic group-containing carboxylic acids (Chem. Mater., Vol. 10, 286-296, JP-A-2000-345052). Specific examples include 4,4,4-trifluoro-1-(2-thienyl)-1,3-butanedione, 4,4,4-trifluoro-1-phenyl-1,3-butanedione, and 4,4,4-trifluoro-1-(2-naphthyl)-1,3-butanedione. Examples of aromatic carboxylic acid include dendrone having a carboxylate group in a focal point and including an aromatic ring in a repeating unit.

In combination with such ligands, there may be employed, for the purpose of suppressing a loss in the fluorescence intensity of the lanthanoid dye, phosphineoxides, phosphate esters, sulfoxides, phisphite esters, phosphines, sulfides, amines and aromatic nitrogen-containing heterocyclic compounds.

A fluorescent lanthanoid complex, namely the fluorescent lanthanoid dye of the invention, may be easily synthesized by adding a ligand solution, containing at least the ligand of the invention, to a solution containing a lanthanoid element. When the fluorescent lanthanoid complex is deposited from the solution, it can be separated by filtration. When the fluorescent lanthanoid complex is not deposited from the solution, crystals may be obtained by distilling off the solvent, and purified if necessary for use.

While a concentration of the fluorescent lanthanoid complex in the polymer fine particle of the invention is not restricted, it is normally in a range of 0.01 to 50 mass % with respect to the mass of the polymer fine particle, preferably in a range of 0.05 to 20 mass % in consideration of the light intensity, and more preferably in a range of 0.1 to 10 mass %.

Method for Forming Fluorescent Polymer Fine Particle

The fluorescent polymer fine particle of the present invention can be produced by introducing (integrating) a lanthanoid fluorescent dye in the fine particle prepared by various known methods explained above.

The introduction of the dye can be executed in the following manner. The fine particles and the fluorescent lanthanoid dye are immersed in a solution, which contains a predetermined proportion of an organic solvent which is capable of swelling the water-insoluble polymer compound which constitutes the hydrophobic portion of the fine particle (organic solvent being for example acetone, toluene, methanol or dichloromethane). Otherwise, a solution in which the lanthanoid dye is dissolved may be added to a dispersion of the fine particles. Thus the water-insoluble polymer compound causes a swelling, along which the fluorescent lanthanoid dye is incorporated into the fine particle. Then the organic solvent is removed from the mixture, whereby the water-insoluble polymer compound causes a shrinkage but the fluorescent lanthanoid dye of hydrophobic property is unable to come out of the fine particle and is sealed thereon. If desired, the fluorescent lanthanoid dye that has not been incorporated in the fine particle is removed, whereby the fluorescent fine particle of the invention can be obtained.

In the producing method above, the method of removing the organic solvent from the mixture is not particularly limited, and is for example a method of evaporating the organic solvent to dry by an evaporator or the like, or a method of causing a shrinkage in a non-solvent (for example a method of replacing the organic solvent-containing solution with a solution not containing the organic solvent).

While the proportion of the organic solvent, in the organic solvent-containing solution to be used for swelling the fine particle, is not particularly limited as long as the water-insoluble polymer compound can be swelled to an extent that the fluorescent lanthanoid dye is incorporated in the water-insoluble polymer compound, in view of suppressing the agglomeration of the fine particles, it may be in a range of 40 to 60 (vol/vol) %.

In addition to the foregoing, there may also be adopted a method of dissolving the fluorescent lanthanoid dye in the liquid containing the polymerizable monomer and the macromonomer, followed by a polymerization thereby incorporating the fluorescent lanthanoid dye simultaneously with the formation of the fine particle.

In the case where the hydrophilic polymer contains a reactive functional group, the producing method for the fluorescent polymer fine particle of the invention may further include activating a unit of a reactive functional group precursor so as to generate a reactive functional group which can be comprised in the hydrophilic polymer such reactive functional group. The method of such activation may be suitably selected according to the type of the reactive functional group unit.

For example, when the reactive functional group unit contains an amino group precursor structure as the reactive functional group precursor unit, a treatment with an acid or an alkali is applied to the polymer fine particle so as to convert the amino group precursor structure into an amino group. The acid may be an inorganic acid such as hydrochloric acid, sulfuric acid or nitric acid, or an organic acid such as p-toluenesulfonic acid or acetic acid. A pH of the acid is preferably 5 or less, and more preferably 3 or less. The alkali may be an aqueous sodium hydroxide solution or an aqueous potassium hydroxide solution, and a pH of the alkali is preferably 9 or higher, and more preferably 11 or higher. A reaction temperature for the treatment is preferably from 25 to 100° C., more preferably from 40 to 90° C.

Such activating treatment may be conducted before or after introducing (integrating) the fluorescent lanthanoid dye considering the specific treatment to be applied.

Complex for Detecting Fluorescence

A complex for detecting fluorescence of the invention is constituted of a fluorescent polymer fine particle of the invention and a combination substance capable of combining the fluorescent polymer fine particle and a target substance to be detected. Thus the target substance can be detected efficiently and with a high sensitivity, based on a fluorescence emission from the fluorescent polymer fine particle combined through the combination substance.

Examples of the combination substance include an antigen and an antibody. Examples of such antibody include IgG and IgM of a polyclonal antibodies of a rabbit or a goat, or of monoclonal antibodies of a mouse, and $F(ab')_2$, Fab and Fab' fractions obtained by an enzyme treatment or a reducing treatment thereof. Also examples of the antigen include various materials such as proteins, polypeptides, steroids, polysaccharides, lipids, drugs and pollens.

Preparation of Complex for Detecting Fluorescence

Examples of the method of bonding such antibody or antigen to the fluorescent polymer fine particle include: a method of bonding a sugar chain of the antibody or the antigen to an amino group of the polymer fine particle by periodic acid; a method of bonding an amino group of the antibody or the antigen to an amino group of the polymer fine particle by glutaraldehyde; and a method of introducing a maleimide group to an amino group of the polymer fine particle by a reaction with Sulfo-SMCC (sulfosuccinimidyl 4-(N-maleimidemethyl)cyclohexane-1-carboxylate) and bonding it with a mercapto group of the antibody. A bonding amount (mass) of the antibody or antigen relative to 1 milligram of the polymer fine particles is normally in a range of 50 nanograms to 500 micrograms, and preferably in a range of 500 nanograms to 200 micrograms. Thus the complex member is usable as an immunoanalysis reagent having a fluorescent property (fluorescent immunoanalysis reagent).

Examples of the combination substance further include, in addition to the antigen and the antibody, allergens, enzymes, enzyme substrates, coenzymes, enzyme inhibitors, host compounds, hormones, hormone receptors, proteins, blood proteins, tissue proteins, cells, cell fragments, karyoplasms, viruses, virus particles, metabolites, neurotransmitters, haptens, drugs, nucleic acids, metals, metal complexes, microorganisms, parasites, bacteria, biotins, avidins, lectins, sugars, physiologically active substances, physiologically active substance receptors, environmental substances, chemical species and modified compounds thereof, according to the target substance of detection. For example, in the case where the target substance of detection can be treated with avidin in advance, biotin may be selected as the combination substance. Also in the case where the target substance of detection is a certain ligand, a receptor or a fragment thereof, which specifically bond to such ligand, may be selected. Also in the case where the target substance of detection is a nucleic acid, a protein or a peptide (aptamer) bonding specifically to the nucleic acid may be selected.

The bonding with such combination substance may be executed as described above or by other known bonding methods.

Such combination substance may be the target substance to be detected, or may be rendered detectable by the complex for detecting fluorescence, by a bonding treatment to the target substance of detection in a similar manner to the fluorescent polymer fine particle.

Method of Detecting Fluorescence

The method of detecting fluorescence provided by the invention includes detecting a target substance to be detected by utilizing the fluorescent polymer fine particle and the combination substance capable of combining the fluorescent polymer fine particle and the target substance to be detected, namely the complex for detecting fluorescence. Thus the target substance to be detected can be detected with a high sensitivity, utilizing the fluorescent polymer fine particle having a high fluorescence intensity and capable of a highly sensitive detection.

The explanations described above are also applicable to the complex for detecting fluorescence used in the method of detecting fluorescence.

In the method of detecting fluorescence, the procedure and conditions of conventionally-known method of detecting fluorescence utilizing a fluorescent substance may be applicable, and the detecting method includes preparing a specimen for detection by contacting the target substance to be detected with the complex for detecting fluorescence, irradiating an excitation light for exciting the complex for detecting fluorescence, and measuring the fluorescence emission caused by the irradiation.

Since the method of detecting fluorescence of the invention utilizes a lanthanoid complex (particularly of europium, terbium or ruthenium) having a long emission lifetime, the method is preferably a delayed fluorescence analysis in which a target fluorescence is detected after the extinction of a background fluorescence. For example, an europium complex has an emission lifetime in the order of several hundred microseconds to a millisecond, which is 100,000 to 1,000,000 times of that of the ordinary organic dyes. Besides, it has features of a large Stokes shift equal to or larger than 250 nm and a sharp fluorescent peak. The analysis therewith is executed by exciting the ligand of the lanthanoid ion, and measuring a generated delayed fluorescence by a time-resolved fluorescence measuring apparatus.

Since the fluorescent polymer fine particle of the invention integrates the lanthanoid dye, the fluorescent polymer fine particle can be excited with a visible light such as a light having a wavelength of about 400 nm. It is therefore unnecessary to use an excitation light having a high energy such as that in the ultraviolet region. Accordingly, the selection of the excitation light source has a larger freedom.

Thus a fluorescence detection of a high sensitivity can be realized with an excitation light source of a low energy.

The method of detecting fluorescence of the invention is more preferably executed by a time-resolved fluorescence measurement, in consideration of precision and sensitivity of the measurement. Conditions of the time-resolved fluorescence measurement may be suitably selected according to the selected metal ion.

Kit for Detecting Fluorescence

A kit for detecting fluorescence of the invention contains the fluorescent polymer fine particle of the present invention.

Thus the target substance can be detected efficiently and with a high sensitivity, based on a fluorescence emission from the fluorescent polymer fine particle combined through the combination substance.

In the kit for detecting fluorescence, fluorescent polymer fine particle may be contained together with the combination substance, or may be contained as the complex for detecting fluorescence.

The kit may further contain a reagent for rendering the target substance of detection detectable by the complex for detecting fluorescence, according to the kind of the combination substance. Examples of such reagent include, in case of selecting a biotin as the combination substance in the complex for detecting fluorescence, a reagent for avitinizing the target substance to be detected.

EXAMPLES

While the present invention will be further explained by examples, the present invention is not limited by the examples.

Example 1

Synthesis of Fluorescent Polymer Fine Particles

A radical-polymerizable macromonomer, represented by a following formula and having an amino group at a terminal end, was synthesized according to the method described in Anal. Chem., 2003, 75, pp. 6124-6132. A number-average molecular weight based on a GPC measurement was 7,000.

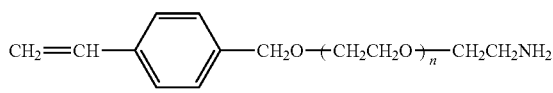

Styrene, the macromonomer (5 mol % relative to 1 mol % of styrene) and 1,4-divinylbenzene (2 mol % relative to 1 mol % of styrene) were heated, in the presence of a radical generator V-65 (trade name, manufactured by Wako Pure Chemical Co.) (2 mol % relative to 1 mol % of styrene), in ethanol/distilled water=4/1 (volume ratio) for 6 hours at 70° C. to execute a radical polymerization. The polymer solid in the reacted substance was separated by filtration, and the filtrate was purified by a dialysis with distilled water for one day (fractionated molecular weight=12,000-14,600) so as to obtain a dispersion of fine particles having amino groups on the surface. An average particle size, measured with a particle size distribution measuring apparatus (trade name: COULTER N4PLUS, manufactured by Beckman-Coulter Inc.), was 120 nm. It was diluted with distilled water so that a particle concentration thereof become 50 mg/mL.

Further, equivalent mole amounts of tris(4,4,4-trifluoro-1-(2-thienoyl)-1,3-butanediono)europium (III) and a ligand of the Exemplary compound 4 of the invention were mixed and were dissolved in methanol to obtain a 0.2 mass % solution of europium dye.

380 mg of the europium dye solution were added to 50 mL of the dispersion of the fine particles having amino groups on the surface, synthesized as described above, and the mixture was agitated at the room temperature for 3 hours. Thereafter, methanol in the dispersion was distilled off under a reduced pressure, utilizing an aspirator. The insoluble substance was separated by filtration, and purified by gel filtration to obtain a dispersion of fluorescent polymer fine particles dyed with the europium dye.

Synthesis of Antibody-combined Fine Particle

Then an antibody Fab' was introduced into the fluorescent polymer fine particles synthesized above by an ordinary hinge method (Eiji Ishikawa et al., "Enzyme Immunomeasurement, 3rd ed.", Igaku Shoin).

The thus-synthesized fluorescent polymer fine particles dyed with the europium dye, having amino groups on the surface thereof, were dispersed in a 0.1M HEPES buffer (pH 8.0) so that a concentration thereof became 14 mg/mL. 0.6 mg of Sulfo-GMBS (available from Dojin Chemical Co.) were added to 1 mL of the fine particle dispersion and were reacted at the room temperature for 1 hour, and the reaction product was purified by a column (trade name: PD-10, manufactured by Pharmacia Bioscience Inc.) to obtain a dispersion of fluorescent polymer fine particles having maleimide groups on the surface.

Then 3.9 mg of an Fab' fraction, which was obtained from 7.2 mg of anti-theophylline antibody through a treatment with pepsin and a reduction with mercaptoethylamine, were dissolved in a 0.1M HEPES buffer (pH 7.4) so that a concentration thereof became 1 mg/mL. It was then mixed in an equal amount of the dispersion of fluorescent polymer fine particles having maleimide groups on the surface (1 mg/mL 0.1M HEPES buffer (pH 7.4)), and the mixture was agitated overnight at 4° C. and purified by a gel filtration to obtain fluorescent polymer fine particles combined with the antibody (complex for detecting fluorescence).

Preparation of Theophylline-bonded Poly-L-lysine, Bonding thereof to a Quartz Substrate and Detection thereof 40 mL of 0.1% poly-L-lysine (available from Sigma Co.) and 10 mL of 1M MES (pH 6.0) were mixed, and 35 mg of theophylline-8-butanoic acid (available from Sigma Co.), 30 mg of WSC (available from Dojin Chemical Co.) and 34 mg of Sulfo-NHS (available from Pierce Co.) were added and reacted at the room temperature for 6 hours. The reaction liquid was subjected to a gel filtration utilizing a gel filtration column (trade name: SEPHADEX® G-25, manufactured by Pharmacia Bioscience Inc.) to purify theophylline-bonded poly-L-lysine. A synthetic quartz substrate, subjected to an alkaline surface treatment, was sufficiently rinsed with purified water, and was immersed in the solution of theophylline-bonded poly-L-lysine at the room temperature for 2 hours. It was then rinsed with purified water and air dried for use in the following experiments.

1 μl of each of the dispersion of the fluorescent polymer fine particles combined with the antibody (fine particle concentration: $3.0 \times 10^{-6}$ M) and diluted solutions thereof ($\times 10$ and $\times 100$) was spotted on the quartz substrate, which was let to stand at the room temperature for 2 hours and then rinsed with purified water. After water drops on the surface were removed, the substrate was subjected to a time-resolved fluorescence measurement by a time-resolved fluorescence meter (manufactured by Wallach Inc.) (excitation light: 420 nm, fluorescence emission: 615 nm). As a result, there were observed delayed fluorescence, each of which was dependent on the concentration of the fluorescent polymer fine particles. Also, the dispersion of the fluorescent polymer fine particles, after standing for 1 week in an environment of 35° C., was spotted again on the quartz substrate and subjected to the fluorescence measurement in the same manner as described above. The fluorescence intensity on the quartz substrate remained unchanged, thus it was confirmed that the dispersion of the fluorescent polymer fine particles combined with the antibody of Example 1 is a fluorescence detecting reagent having an excellent storability.

Examples 2 to 5

Fluorescent polymer fine particles used in Examples 2 to 5 were prepared in the same manner as in Example 1, except that the ligand of the Exemplary compound 4 was replaced respectively by ligands of the Exemplary compounds 2, 6, 11 and 17. Antibody-combined particles of Examples 2 to 5 using each of these fluorescent polymer fine particles were then prepared in the same manner as in Example 1 and subjected to a fluorescence measurement for each compound. As a result, there were observed delayed fluorescence, each of which was dependent on the concentration of the fluorescent polymer fine particles., and, when the fluorescence measurement was repeated after a standing for 1 week in an environment of 35° C., the fluorescence intensity remained unchanged, thus it was confirmed that the dispersions of the fluorescent polymer fine particles combined with the antibody of Examples 2 to 5 are a fluorescence detecting reagent having an excellent storability.

Example 6

2.5 g of the Exemplary compound P-1 (a hydrophilic macromonomer) was dissolved in 100 g of distilled water and heated to 70° C. under a nitrogen flow of 40 mL per minute. In this liquid, a solution formed of 10 g of methyl methacrylate, 0.5 g of ethylene glycol dimethacrylate, 0.2 g of 2,2'-azobis(2,4-dimethylvaleronitrile) and 10 g of ethanol was dropwise added over 1 hour. After the completion of the dropwise addition, the thus-obtained mixture was agitated at 70° C. for 2 hours, further at 85° C. for 1 hour and cooled to the room temperature. The dispersion was purified by a dialysis (fractionated molecular weight: 12,000-14,000) with distilled water for one day. The particles were separated by a centrifuge, and diluted and re-dispersed in distilled water so that a particle concentration thereof became 5 mass %. An average particle size, measured with a particle size distribution measuring apparatus (trade name: COULTER N4PLUS, manufactured by Beckman-Coulter Inc.), was 150 nm.

After hydrochloric acid was added to the particle dispersion so as to adjust a pH of the dispersion became 1, the mixture was agitated at 80° C. for 24 hours so as to hydrolyze acetamide groups which reside in the hydrophilic polymer bonded to the particle surface so as to convert the acetamide groups into amino groups. The dispersion was cooled to the room temperature, then adjusted to pH=7, further purified by a dialysis with distilled water for one day for removing the water-soluble substances, and was subjected to a concentration adjustment with distilled water so as to obtain a dispersion liquid of 4 mass %.

Further, equivalent mole amounts of tris(4,4,4-trifluoro-1-(2-thienoyl)-1,3-butanediono)europium (III) and a triazine ligand of the Exemplary compound 4 of the invention were mixed and were dissolved in methanol to obtain a 2 mass % solution of europium dye.

0.4 g of the europium dye solution were added to 10 g of the dispersion of the fine particles having amino groups on the surface, synthesized as described above, and the mixture was agitated at the room temperature for 3 hours. Thereafter, methanol in the dispersion was distilled off under a reduced pressure, utilizing an aspirator. Insoluble substance contained in the dispersion was separated by filtration so as to obtain a dispersion of fluorescent polymer fine particles dyed.

Then an antibody Fab' was introduced into the fluorescent polymer fine particles synthesized above by an ordinary hinge method (Eiji Ishikawa et al., "Enzyme Immunomeasurement, 3rd ed.", Igaku Shoin).

The thus-synthesized fluorescent polymer fine particles dyed with the europium dye, having amino groups on the surface thereof, were dispersed in a 0.1M HEPES buffer (pH 8.0) so that a concentration thereof became 14 mg/mL. 0.6 mg of Sulfo-GMBS (available from Dojin Chemical Co.) were added to 1 mL of the fine particle dispersion and were reacted at the room temperature for 1 hour, and the reaction product was purified by a column (trade name: PD-10, manufactured by Pharmacia Bioscience Inc.) to obtain a dispersion of fluorescent polymer fine particles having maleimide groups on the surface.

Then 3.9 mg of an Fab' fraction, which was obtained from 7.2 mg of anti-theophylline antibody through a treatment with pepsin and a reduction with mercaptoethylamine, were dissolved in a 0.1M HEPES buffer (pH 7.4) so that a concentration thereof became 1 mg/mL. It was then mixed in an equal amount of the dispersion of fluorescent polymer fine particles having maleimide groups on the surface (1 mg/mL 0.1M HEPES buffer (pH 7.4)), and the mixture was agitated overnight at 4° C. and purified by a gel filtration to obtain fluorescent polymer fine particles combined with the antibody (complex for detecting fluorescence).

40 mL of 0.1% poly-L-lysine (available from Sigma Co.) and 10 mL of 1M MES (pH 6.0) were mixed, and 35 mg of theophylline-8-butanoic acid (available from Sigma Co.), 30 mg of WSC (available from Dojin Chemical Co.) and 34 mg of Sulfo-NHS (available from Pierce Co.) were added and reacted at the room temperature for 6 hours. The reaction liquid was subjected to a gel filtration utilizing a gel filtration column (trade name: SEPHADEX® G-25, manufactured by Pharmacia Bioscience Inc.) to purify theophylline-bonded poly-L-lysine. A synthetic quartz substrate, subjected to an alkaline surface treatment, was sufficiently rinsed with purified water, and was immersed in the solution of theophylline-bonded poly-L-lysine at the room temperature for 2 hours. It was then rinsed with purified water and air dried for use in the following experiments.

1 μl of each of the dispersion of the fluorescent polymer fine particles combined with the antibody (fine particle concentration: $3.0 \times 10^{-6}$ M) and diluted solutions thereof ($\times 10$ and $\times 100$) was spotted on the quartz substrate, which was let to stand at the room temperature for 2 hours and then rinsed with purified water. After water drops on the surface were removed, the substrate was subjected to a time-resolved fluorescence measurement by a time-resolved fluorescence meter (manufactured by Wallach Inc.) (excitation light: 420 nm, fluorescence emission: 615 nm). As a result, there were observed delayed fluorescence, each of which was dependent on the concentration of the fluorescent polymer fine particles. Also, the dispersion of the fluorescent polymer fine particles, after standing for 2 weeks in an environment of 40° C., was spotted again on the quartz substrate and subjected to the fluorescence measurement in the same manner as described above. The fluorescence intensity on the quartz substrate remained unchanged, thus it was confirmed that the dispersion of the fluorescent polymer fine particles combined with the antibody of Example 6 is a fluorescence detecting reagent having an excellent storability.

Examples 7 to 10

Fluorescent polymer fine particles were prepared in the same manner as in Example 6, except that the hydrophilic polymer P-1, the methyl methacrylate and the ethylene glycol dimethacrylate in Example 6 were replaced by hydrophilic polymer and the radical-polymerizable monomer shown in Table 1. The kinds, amounts and average particle sizes are also shown in Table 1. Average particle sizes of the fluorescent polymer fine particles are also shown in Table 1.

Further, antibody-combined particles were prepared by using these fluorescent polymer fine particles, and the thus-prepared antibody-combined particles were subjected to a fluorescence measurement in the same manner as for Example 6. As a result, there were observed delayed fluorescence, each of which was dependent on the concentration of the fluorescent polymer fine particles. When the fluorescence measurement was repeated after a standing for 2 weeks in an environment of 40° C., the fluorescence intensity of each of Examples 7 to 10 showed little change, thus it was confirmed that the dispersion of the fluorescent polymer fine particles combined with the antibody of each of Examples 7 to 10 is a fluorescence detecting reagent having an excellent storability.

In addition, comparing the result of Example 6 to that of Example 1, it was found that the intensity of fluorescence measured from Example 1 was 50% of that from Example 6. When the fluorescence measurement was repeated after a standing for 2 week in an environment of 40° C., the fluorescence intensity decreased to 50% of that before standing.

TABLE 1

| | Hydrophilic macromonomer (x/y, Mn) | Radical-polymerizable monomer | particle size (nm) |
|---|---|---|---|
| Example 6 | P-1 (6500) 2.5 g | Methyl methacrylate 10 g Ethylene glycol dimethacrylate 0.3 g | 150 |
| Example 7 | P-2 (7500) 2.0 g | Methyl methacrylate 10 g Ethylene glycol dimethacrylate 0.3 g | 120 |

TABLE 1-continued

| | Hydrophilic macromonomer (x/y, Mn) | Radical-polymerizable monomer | particle size (nm) |
|---|---|---|---|
| Example 8 | P-4 (7000) 2.5 g | Styrene 10 g Divinylbenzene 0.3 g | 140 |
| Example 9 | P-7 (6500) 3.5 g | Methyl methacrylate 10 g Ethylene glycol dimethacrylate 0.4 g | 100 |
| Example 10 | P-10 (8000) 3.0 g | Methyl methacrylate 10 g Ethylene glycol dimethacrylate 0.3 g | 150 |

Example 11

1.5 g of the Exemplary compound P-29 (a hydrophilic macromonomer, having a number-average molecular weight of 9,000) was dissolved in a mixture solution formed of 14 g of distilled water and 13 g of ethanol, and heated to 70° C. under a nitrogen flow of 50 mL per minute. In this liquid, a solution formed of 1.5 g of methyl methacrylate, 0.04 g of 2,2'-azobis(2,4-dimethylvaleronitrile) and 8 g of ethanol was dropwise added over 2 hours. After the completion of the dropwise addition, the thus-obtained mixture was agitated at 70° C. for 3 hours, further at 75° C. for 1 hour and cooled to the room temperature. The dispersion was purified by a dialysis (fractionated molecular weight: 12,000-14,000) with distilled water for one day. The particles were separated by a centrifuge, and diluted and re-dispersed in distilled water so that a particle concentration thereof became 5 mass %. An average particle size, measured with a particle size distribution measuring apparatus (trade name: COULTER N4PLUS, manufactured by Beckman-Coulter Inc.), was 150 nm.

After hydrochloric acid was added to the particle dispersion so as to adjust a pH of the dispersion became 1, the mixture was agitated at 25° C. for 14 hours so as to hydrolyze acetamide groups which reside in the hydrophilic polymer bonded to the particle surface so as to convert the acetamide groups into amino groups. The dispersion was cooled to the room temperature, then adjusted to pH=7, and further purified by a dialysis with distilled water for one day for removing the water-soluble substances. After being subjected to centrifuge so as to separate the particles, the particles were subjected to a concentration adjustment with distilled water so as to obtain a dispersion liquid of 4 mass %.

Further, 7.0 mg of tris(4,4,4-trifluoro-1-(2-thienoyl)-1,3-butanediono)europium (III) and 4.5 mg of a triazine ligand of the Exemplary compound 12 of the invention were mixed and were dissolved in 0.5 g of methanol. The resultant was added to 10 g of the dispersion of the fine particles which was synthesized as described above having amino groups on the surface, and the mixture was agitated at the room temperature for 3 hours. Thereafter, methanol in the dispersion was distilled off under a reduced pressure, utilizing an aspirator. Insoluble substance contained in the resultant was separated by filtration. Further, the resultant was left at 45° C. for 3 days and the cooled down to room temperature so as to obtain a dispersion of fluorescent polymer fine particles. The dispersion of fluorescent polymer fine particles exhibited a strong fluorescence upon irradiation excitation light (excitation light: 420 nm, fluorescence emission: 615 nm).

Then, an antibody-combined fine particles of Example 11 was prepared in the same manner as Example 6 except that the thus-obtained dispersion of the fluorescent polymer fine particles was used in place of the dispersion of the fluorescent polymer fine particles of Example 6.

40 mL of 0.1% poly-L-lysine (available from Sigma Co.) and 10 mL of 1M MES (pH 6.0) were mixed, and 35 mg of theophylline-8-butanoic acid (available from Sigma Co.), 30 mg of WSC (available from Dojin Chemical Co.) and 34 mg of Sulfo-NHS (available from Pierce Co.) were added and reacted at the room temperature for 6 hours. The reaction liquid was subjected to a gel filtration utilizing a gel filtration column (trade name: SEPHADEX® G-25, manufactured by Pharmacia Bioscience Inc.) to purify theophylline-bonded poly-L-lysine. A synthetic quartz substrate, subjected to an alkaline surface treatment, was sufficiently rinsed with purified water, and was immersed in the solution of theophylline-bonded poly-L-lysine at the room temperature for 2 hours. It was then rinsed with purified water and air dried for use in the following experiments.

1 μl of each of the dispersion of the fluorescent polymer fine particles combined with the antibody (fine particle concentration: $3.0 \times 10^{-6}$M) and diluted solutions thereof (×10 and ×100) was spotted on the quartz substrate, which was let to stand at the room temperature for 2 hours and then rinsed with purified water. After water drops on the surface were removed, the substrate was subjected to a time-resolved fluorescence measurement by a time-resolved fluorescence meter (manufactured by Wallach Inc.) (excitation light: 420 nm, fluorescence emission: 615 nm). As a result, there were observed delayed fluorescence, each of which was dependent on the concentration of the fluorescent polymer fine particles. Also, the dispersion of the fluorescent polymer fine particles, after standing for 1 week in an environment of 35° C., was spotted again on the quartz substrate and subjected to the fluorescence measurement in the same manner as described above. The fluorescence intensity on the quartz substrate remained unchanged, thus it was confirmed that the dispersion of the fluorescent polymer fine particles combined with the antibody of Example 11 is a fluorescence detecting reagent having an excellent storability.

Example 12

2.5 g of the Exemplary compound MM-I (a hydrophilic macromonomer) was dissolved in 80 g of distilled water and heated to 60° C. under a nitrogen flow of 40 mL per minute. In this liquid, a solution formed of 5 g of methyl methacrylate, 0.2 g of ethylene glycol dimethacrylate, 0.1 g of 2,2'-azobis (2,4-dimethylvaleronitrile) and 5 g of ethanol was dropwise added over 2 hours. After the completion of the dropwise addition, the thus-obtained mixture was agitated at 70° C. for 2 hours, further at 85° C. for 1 hour and cooled to the room temperature. The dispersion was purified by a dialysis (fractionated molecular weight: 12,000-14,000) with distilled water for one day. The particles were separated by a centrifuge, and diluted and re-dispersed in distilled water so that a particle concentration thereof became 5 mass %. An average particle size, measured with a particle size distribution measuring apparatus (trade name: COULTER N4PLUS, manufactured by Beckman-Coulter Inc.), was 120 nm.

After hydrochloric acid was added to the particle dispersion so as to adjust a pH of the dispersion became 1, the mixture was agitated at 80° C. for 24 hours so as to hydrolyze acetamide groups which reside in the hydrophilic polymer bonded to the particle surface so as to convert the acetamide groups into amino groups. The dispersion was cooled to the room temperature, then adjusted to pH=7, further purified by a dialysis with distilled water for one day for removing the water-soluble substances, and was subjected to a concentration adjustment with distilled water so as to obtain a dispersion liquid of 4 mass %.

Further, equivalent mole amounts of tris(4,4,4-trifluoro-1-(2-thienoyl)-1,3-butanediono)europium (III) and a triazine ligand of the Exemplary compound 4 of the invention were mixed and were dissolved in methanol to obtain a 2 mass % solution of europium dye.

0.4 g of the europium dye solution were added to 10 g of the dispersion of the fine particles having amino groups on the surface, synthesized as described above, and the mixture was agitated at the room temperature for 3 hours. Thereafter, methanol in the dispersion was distilled off under a reduced pressure, utilizing an aspirator. The insoluble substance was separated by filtration to obtain a dispersion of fluorescent polymer fine particles dyed with the europium dye.

Then, using the thus-obtained fluorescent polymer fine particles, an antibody-combined fine particles of Example 12 was prepared in the same manner as Example 6.

Then, using the thus-obtained antibody-combined fine particles, a detection of fluorescence was conducted in the same manner as for Example 6. As a result, there were observed delayed fluorescence, each of which was dependent on the concentration of the fluorescent polymer fine particles. Further, when the fluorescence measurement was repeated after a standing for 2 week in an environment of 40° C., the fluorescence intensity remained unchanged, thus it was confirmed that the dispersion of the fluorescent polymer fine particles combined with the antibody of Example 12 is a fluorescence detecting reagent having an excellent storability.

Examples 13 to 16

Fluorescent polymer fine particles were prepared in the same manner as in Example 12, except that the hydrophilic macromonomer and the radical-polymerizable monomer in Example 12 were respectively replaced by the hydrophilic macromonomer and the radical-polymerizable monomer shown in Table 2. The kinds, amounts and average particle sizes are also shown in Table 2. Average particle sizes of the fluorescent polymer fine particles are also shown in Table 2.

Further, antibody-combined particles were prepared by using these fluorescent polymer fine particles, and the thus-prepared antibody-combined particles were subjected to a fluorescence measurement in the same manner as for Example 12. As a result, there were observed delayed fluorescence, each of which was dependent on the concentration of the fluorescent polymer fine particles. When the fluorescence measurement was repeated after a standing for 2 weeks in an environment of 40° C., the fluorescence intensity of each of Examples 13 to 16 showed little change, thus it was confirmed that the dispersion of the fluorescent polymer fine particles combined with the antibody of each of Examples 13 to 16 is a fluorescence detecting reagent having an excellent storability.

TABLE 2

|  | Hydrophilic macromonomer (x/y, Mn) | Radical-polymerizable monomer | particle size (nm) |
|---|---|---|---|
| Example 12 | MM-1 (90/10, 2500) 5 g | Methyl methacrylate 5 g ethylene glycol dimethacrylate 0.2 g | 110 |
| Example 13 | MM-5 (95/5, 2300) 4 g | Methyl methacrylate 5 g ethylene glycol dimethacrylate 0.2 g | 110 |
| Example 14 | MM-8 (90/10, 3000) 2 g | Methyl methacrylate 5 g ethylene glycol dimethacrylate 0.2 g | 100 |
| Example 15 | MM-12 (95/5, 2400) 6 g | Ethyl methacrylate 5 g Ethylene glycol dimethacrylate 0.1 g | 120 |
| Example 16 | MM-16 (90/10, 4000) 3 g | Styrene 5 g Divinylbenzene 0.1 g | 200 |

Example 17

3.1 g of the Exemplary compound MM-32 (a hydrophilic macromonomer, having a number-average molecular weight of 3,100) was dissolved in a mixture solution formed of 32 g of distilled water and 10 g of ethanol, and heated to 60° C. under a nitrogen flow of 50 mL per minute. In this liquid, a solution formed of 1 g of methyl methacrylate, 0.03 g of ethylene glycol dimethacrylate and 10 g of ethanol was dropwise added over 4 hours. After the completion of the dropwise addition, the thus-obtained mixture was agitated at 70° C. for 3 hours, further at 75° C. for 2 hour and cooled to the room temperature. The dispersion was purified by a dialysis (fractionated molecular weight: 12,000-14,000) with distilled water for one day. The particles were separated by a centrifuge, and diluted and re-dispersed in distilled water so that a particle concentration thereof became 5 mass %. An average particle size, measured with a particle size distribution measuring apparatus (trade name: COULTER N4PLUS, manufactured by Beckman-Coulter Inc.), was 350 nm.

After hydrochloric acid was added to the particle dispersion so as to adjust a pH of the dispersion became 1, the mixture was agitated at 25° C. for 14 hours so as to hydrolyze acetamide groups which reside in the hydrophilic polymer bonded to the particle surface so as to convert the acetamide groups into amino groups. The dispersion was cooled to the room temperature, then adjusted to pH=7, and further purified by a dialysis with distilled water for one day for removing the water-soluble substances. After being subjected to centrifuge so as to separate the particles, the particles were subjected to a concentration adjustment with distilled water so as to obtain a dispersion liquid of 4 mass %.

Further, 7.0 mg of tris(4,4,4-trifluoro-1-(2-thienoyl)-1,3-butanediono)europium (III) and 4.5 mg of a triazine ligand of the Exemplary compound 12 of the invention were mixed and were dissolved in 0.5 g of methanol. The resultant was added to 10 g of the dispersion of the fine particles which was synthesized as described above having amino groups on the surface, and the mixture was agitated at the room temperature for 3 hours. Thereafter, methanol in the dispersion was distilled off under a reduced pressure, utilizing an aspirator. Insoluble substance contained in the resultant was separated by filtration. Further, the resultant was left at 45° C. for 3 days and the cooled down to room temperature so as to obtain a dispersion of fluorescent polymer fine particles. The dispersion of fluorescent polymer fine particles exhibited a strong fluorescence upon irradiation excitation light (excitation light: 420 nm, fluorescence emission: 615 nm).

Then, an antibody-combined fine particles of Example 17 was prepared in the same manner as Example 12 except that the thus-obtained dispersion of the fluorescent polymer fine particles was used in place of the dispersion of the fluorescent polymer fine particles of Example 12.

Preparation of Theophylline-bonded Poly-L-lysine, Bonding thereof to a Quartz Substrate and Detection thereof 40 mL of 0.1% poly-L-lysine (available from Sigma Co.) and 10 mL of 1M MES (pH 6.0) were mixed, and 35 mg of theophylline-8-butanoic acid (available from Sigma Co.), 30 mg of WSC (available from Dojin Chemical Co.) and 34 mg of Sulfo-NHS (available from Pierce Co.) were added and reacted at the room temperature for 6 hours. The reaction liquid was subjected to a gel filtration utilizing a gel filtration column (trade name: SEPHADEX® G-25, manufactured by Pharmacia Bioscience Inc.) to purify theophylline-bonded poly-L-lysine. A synthetic quartz substrate, subjected to an alkaline surface treatment, was sufficiently rinsed with purified water, and was immersed in the solution of theophylline-bonded poly-L-lysine at the room temperature for 2 hours. It was then rinsed with purified water and air dried for use in the following experiments.

1 µl of each of the dispersion of the fluorescent polymer fine particles combined with the antibody (fine particle concentration: $3.0\times10^{-6}$ M) and diluted solutions thereof (×10 and ×100) was spotted on the quartz substrate, which was let to stand at the room temperature for 2 hours and then rinsed with purified water. After water drops on the surface were removed, the substrate was subjected to a time-resolved fluorescence measurement by a time-resolved fluorescence meter (manufactured by Wallach Inc.) (excitation light: 420 nm, fluorescence emission: 615 nm). As a result, there were observed delayed fluorescence, each of which was dependent on the concentration of the fluorescent polymer fine particles. Also, the dispersion of the fluorescent polymer fine particles, after standing for 1 week in an environment of 35° C., was spotted again on the quartz substrate and subjected to the fluorescence measurement in the same manner as described above. The fluorescence intensity on the quartz substrate remained unchanged, thus it was confirmed that the dispersion of the fluorescent polymer fine particles combined with the antibody of Example 1 is a fluorescence detecting reagent having an excellent combined with the antibody of Example 1 is a fluorescence detecting reagent having an excellent storability.

Comparative Example 1

Fluorescent polymer fine particles of Comparative example 1 were prepared in the same manner as in Example 1, except that the Exemplary compound 4 was replaced by trioctylphosphine oxide. Antibody-combined particles of Comparative example 1 using the fluorescent polymer fine particles was then prepared and subjected to a fluorescence measurement in the same manner as in Example 1 (excitation light: 420 nm, fluorescence emission: 615 nm). As a result, although there were observed delayed fluorescence, each of which was dependent on the concentration of the fluorescent polymer fine particles, the fluorescence intensity thereof were 10% or less in comparison with those in Examples 1 to 1. When the fluorescence measurement was repeated after a standing for 1 week in an environment of 35° C., the fluorescence intensity decreased to 50% of that before standing, thus it was shown that the antibody-combined particles of Comparative example 1 is inferior in storability in comparison with the fluorescent polymer fine particles of the invention.

CROSS-REFERENCE TO RELATED APPLICATION

This application claims priority under 35 USC 119 from Japanese Patent Applications Nos. 2005-320176, 2005-320177, 2005-320178 and 2006-293875, the disclosures of which are incorporated by reference herein.

What is claimed is:

1. A fluorescent polymer fine particle comprising:
a polymer particle having a core-shell configuration comprising a hydrophobic core and a hydrophilic shell; and
a fluorescent lanthanoid dye that is integrated with the polymer particle and comprises a fluorescent lanthanoid cation, wherein:
a hydrophilic polymer which forms the hydrophilic shell comprises a polymerizable unit and at least one hydrophilic unit selected from the group consisting of a hydrophilic (meth)acrylamide unit and a hydrophilic vinyl amine unit,
a volume-average particle size of the fluorescent polymer particle is in a range of 0.01 to 20 µm, and
the fluorescent lanthanoid dye comprises a nitrogen-containing heterocyclic ligand represented by the following Formula (L-I):

Formula (L-I)

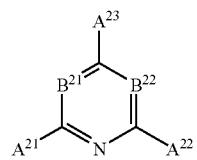

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or $=C(-R^{30})-$; and $R^{30}$ represents a hydrogen atom or a substituent:

Formula (L-II)

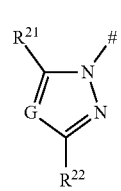

Formula (L-III)

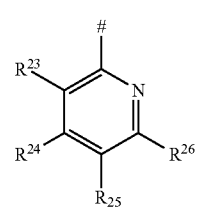

Formula (L-IV)

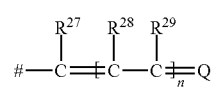

Formula (L-V)

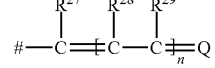

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

2. The fluorescent polymer fine particle of claim 1, wherein the hydrophilic polymer comprises a unit represented by one of the following Formulae (I) or (II):

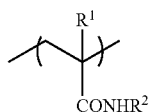

Formula (I)

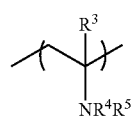

Formula (II)

wherein each of $R^1$ and $R^3$ independently represents a hydrogen atom, an alkyl group having 1 to 6 carbon atoms or a halogen atom; $R^2$ represents a hydrogen atom or an alkyl group having 1 to 4 carbon atoms; each of $R^4$ and $R^5$ independently represents a hydrogen atom or an alkyl group having 1 to 6 carbon atoms, and $R^4$ and $R^5$ are optionally bonded with each other to form a nitrogen-containing ring.

3. The fluorescent polymer fine particle of claim 1, wherein the hydrophobic polymer forming the hydrophobic core is bonded to a side chain of the hydrophilic polymer.

4. The fluorescent polymer fine particle of claim 3, wherein the hydrophilic polymer is formed by using a hydrophilic polymer precursor having the hydrophilic unit and an ethylenic unsaturated bond group-containing unit having an ethylenic unsaturated bond on a side chain of the ethylenic unsaturated bond group-containing unit.

5. The fluorescent polymer fine particle of claim 4, wherein the hydrophilic polymer precursor comprises the hydrophilic unit and an ethylenic unsaturated bond group-containing unit represented by the following Formula (III):

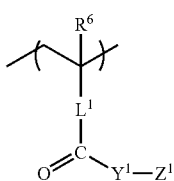

Formula (III)

wherein $R^6$ represents a hydrogen atom or a methyl group; $Y^1$ represents an oxygen atom or $-NR^7-$; $R^7$ represents a hydrogen atom or an alkyl group having 1 to 6 carbon atoms; $L^1$ represents a bivalent connecting group; and $Z^1$ represents an allyl group, an allyloxyethyl group, or an atomic group represented by any one of the following Formulae (IIIA) and (IIIB):

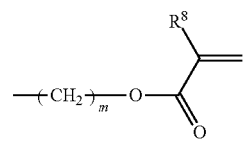

Formula (IIIA)

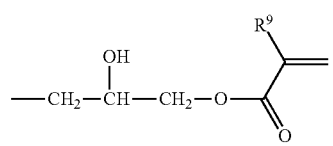

Formula (IIIB)

wherein each of $R^8$ and $R^9$ independently represents a hydrogen atom or a methyl group;

and m represents an integer of 1 to 12.

6. A fluorescent polymer fine particle comprising:

a polymer particle having a core-shell configuration comprising a hydrophobic core and a hydrophilic shell; and a fluorescent lanthanoid dye that is integrated with the polymer particle and comprises a fluorescent lanthanoid cation, wherein:

a hydrophilic polymer which forms the hydrophilic shell comprises at least one hydrophilic macromonomer selected from the group consisting of a hydrophilic (meth)acryl macromonomer and a hydrophilic vinylamine macromonomer, and a hydrophobic polymer which forms the hydrophobic core is bonded to one terminal of a main chain of the hydrophilic macromonomer, a volume-average particle size of the fluorescent polymer particle is in a range of 0.01 to 20 μm, and the fluorescent lanthanoid dye comprises a nitrogen-containing heterocyclic ligand represented by the following Formula (L-I):

Formula (L-I)

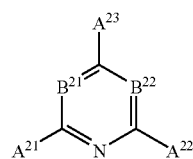

Formula (L-I)

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or $=C(-R^{30})-$; and $R^{30}$ represents a hydrogen atom or a substituent:

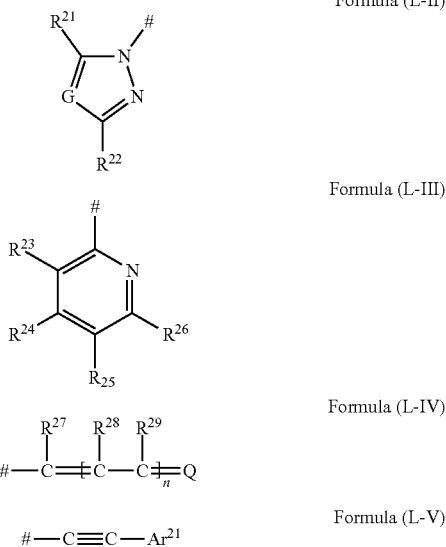

Formula (L-II)

Formula (L-III)

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

7. The fluorescent polymer fine particle of claim 6, wherein the hydrophilic (meth)acryl macromonomer is represented by the following Formula (IV), and the hydrophilic vinylamine macromonomer is represented by the following Formula (V):

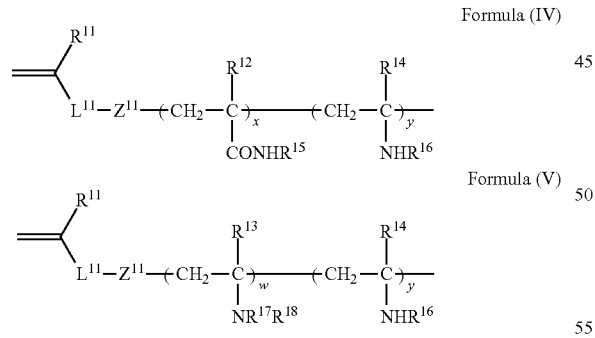

Formula (IV)

Formula (V)

$R^{11}$, $R^{12}$, $R^{13}$ and $R^{14}$ each independently represents a hydrogen atom, an alkyl group having 1 to 6 carbon atoms, or a halogen atom; $R^{15}$ represents a hydrogen atom or an alkyl group having 1 to 4 carbon atoms; $R^{16}$ represents a hydrogen atom or an acyl group; $R^{17}$ and $R^{18}$ each independently represents a hydrogen atom or an alkyl group having 1 to 6 carbon atoms; $R^{17}$ and $R^{18}$ are optionally bonded with each other to form a nitrogen-containing ring; $L^{11}$ represents a bivalent linking group; $Z^{11}$ represents an atomic group which is linked to a terminal end of the polymer main chain; x and y each independently represents an integer of 1 or more; and w represents an integer of 0 or more.

8. The fluorescent polymer fine particle of claim 1, wherein the hydrophobic polymer comprises a reactive functional group unit.

9. The fluorescent polymer fine particle of claim 8, wherein the reactive functional group unit is represented by the following Formula (VI):

Formula (VI)

wherein $R^{10}$ represents a hydrogen atom or a methyl group.

10. The fluorescent polymer fine particle of claim 1, wherein the fluorescent lanthanoid dye comprises a triazine ring-containing ligand represented by the following Formula (L-VI):

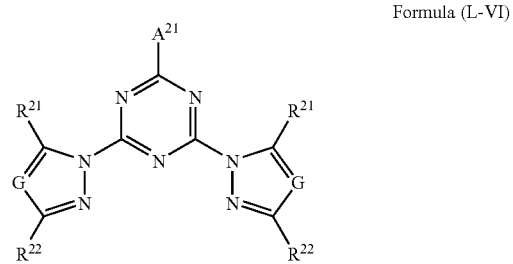

Formula (L-VI)

wherein $A^{21}$ represents an atomic group represented by any one of the following Formulae (L-II) to (L-V), a hydroxyl group, an alkoxy group, an aryloxy group, an alkylamino group, a dialkylamino group, an arylamino group, or a diarylamino group; and $R^{21}$, $R^{22}$ and G are respectively the same as $R^{11}$, $R^{12}$ and G in the following Formulae (L-II) to (L-V):

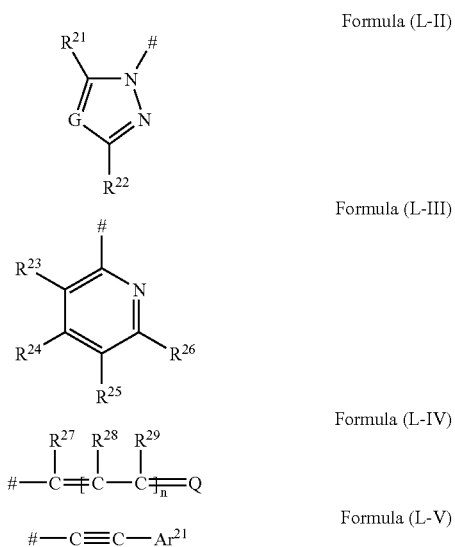

Formula (L-II)

Formula (L-III)

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the triazine ring in the ligand represented by Formula (L-VI).

11. The fluorescent polymer fine particle of claim 1, wherein the fluorescent lanthanoid dye comprises a triazine ring-containing ligand represented by the following Formula (L-VII):

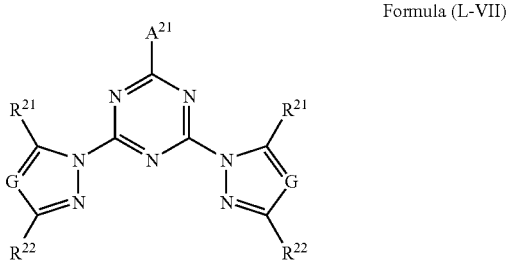

Formula (L-VII)

wherein each of $R^{21}$, $R^{22}$ and $R^{27}$ independently represents a hydrogen atom or a substituent; G represents a substituted or unsubstituted carbon atom or a nitrogen atom; and Q represents an atomic group which is used to form a 5-membered or 6-membered nitrogen-containing heterocyclic ring which optionally forms a condensed ring.

12. A method for forming a fluorescent polymer fine particle having a core-shell configuration comprising a hydrophobic core and a hydrophilic shell and a fluorescent lanthanoid dye that is integrated with the polymer particle and comprises a fluorescent lanthanoid cation, wherein a volume-average particle size of the fluorescent polymer particle is in the range of 0.01 to 20 μm, comprising:

dispersing and polymerizing a hydrophobic radical polymerizable monomer in an aqueous solvent in the presence of a radical generator and the presence of a hydrophilic polymer precursor comprising a polymerizable unit and at least one hydrophilic unit selected from the group consisting of a hydrophilic (meth)acrylamide unit and a hydrophilic vinyl amine unit so that the polymer fine particle have the core-shell configuration in which a hydrophobic polymer which forms the hydrophobic core is bonded to a hydrophilic polymer which forms the hydrophilic shell; and introducing the fluorescent lanthanoid dye with the polymer particle, wherein the fluorescent lanthanoid dye comprises a nitrogen-containing heterocyclic ligand represented by the following Formula (L-I):

Formula (L-I)

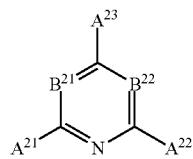

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or $=C(-R^{30})-$; and $R^{30}$ represents a hydrogen atom or a substituent:

Formula (L-II)

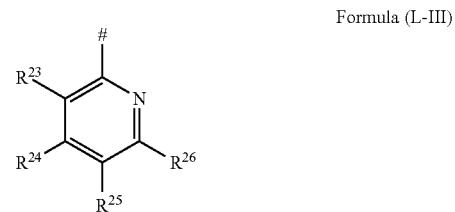

Formula (L-III)

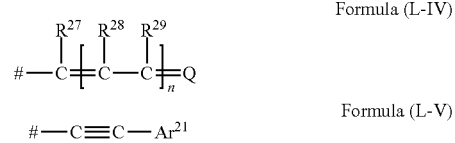

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

13. The method for forming a fluorescent polymer fine particle of claim 12, wherein the hydrophilic polymer comprises a unit represented by one of the following Formulae (I) or (II):

Formula (I)

Formula (II)

wherein each of $R^1$ and $R^3$ independently represents a hydrogen atom, an alkyl group having 1 to 6 carbon atoms or a halogen atom; $R^2$ represents a hydrogen atom or an alkyl group having 1 to 4 carbon atoms; each of $R^4$ and $R^5$ independently represents a hydrogen atom or an alkyl group having 1 to 6 carbon atoms, and $R^4$ and $R^5$ may be bonded with each other to form a nitrogen-containing ring.

14. The method for forming a fluorescent polymer fine particle of claim 12, wherein the polymerizable unit is an ethylenic unsaturated bond group-containing unit having an ethylenic unsaturated bond on a side chain of the ethylenic unsaturated bond group-containing unit.

15. A method for forming a fluorescent polymer fine particle having a core-shell configuration comprising a hydrophobic core and a hydrophilic shell and a fluorescent lanthanoid dye that is integrated with the polymer particle and comprises a fluorescent lanthanoid cation, wherein a volume-average particle size of the fluorescent polymer particle is in a range of 0.01 to 20 μm, comprising:

dispersing and polymerizing a hydrophobic radical polymerizable monomer in an aqueous solvent in the presence of a radical generator and the presence of at least one hydrophilic macromonomer selected from the group consisting of a hydrophilic (meth)acryl macromonomer having a polymerizable double bond at one terminal end of the main chain thereof and a hydrophilic vinylamine macromonomer having a polymerizable double bond at one terminal end of the main chain thereof so that the polymer fine particle have the core-shell configuration in which a hydrophobic polymer which forms the hydrophobic core is bonded to a hydrophilic polymer which forms the hydrophilic shell; and introducing the fluorescent lanthanoid dye with the polymer particle, wherein the fluorescent lanthanoid dye comprises a nitrogen-containing heterocyclic ligand represented by the following Formula (L-I):

Formula (L-I)

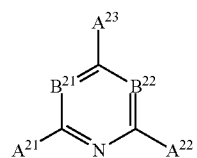

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or =C(—$R^{30}$)—; and $R^{30}$ represents a hydrogen atom or a substituent:

Formula (L-II)

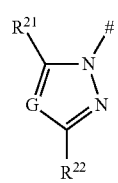

Formula (L-III)

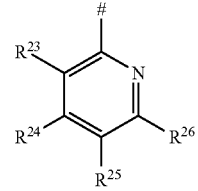

Formula (L-IV)

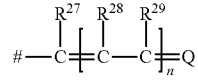

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

16. The method for forming a fluorescent polymer fine particle of claim 15, wherein the hydrophilic (meth)acryl macromonomer is represented by the following Formula (IV), and the hydrophilic vinylamine macromonomer is represented by the following Formula (V):

Formula (IV)

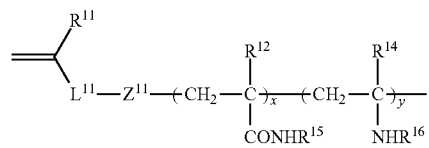

Formula (V)

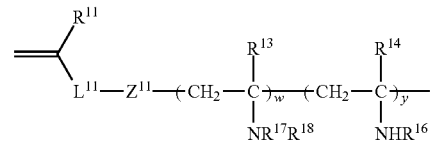

wherein $R^{11}$, $R^{12}$, $R^{13}$ and $R^{14}$ each independently represents a hydrogen atom, an alkyl group having 1 to 6 carbon atoms, or a halogen atom; $R^{15}$ represents a hydrogen atom or an alkyl group having 1 to 4 carbon atoms; $R^{16}$ represents a hydrogen atom or an acyl group; $R^{17}$ and $R^{18}$ each independently represents a hydrogen atom or an alkyl group having 1 to 6 carbon atoms; $R^{17}$ and $R^{18}$ may be bonded with each other to form a nitrogen-containing ring; $L^{11}$ represents a bivalent linking group; $Z^{11}$ represents an atomic group which is linked to a terminal end of the polymer main chain; x and y each independently represents an integer of 1 or more; and w represents an integer of 0 or more.

17. The method for forming a fluorescent polymer fine particle of claim 12, further comprising activating a reactive functional group precursor unit so as to generate a reactive functional group, wherein the reactive functional group precursor unit is comprised in the hydrophilic polymer.

18. A complex for detecting fluorescence comprising a fluorescent polymer fine particle and a combination substance capable of being combined with a target substance to be detected, wherein the fluorescent polymer fine particle comprises:

a polymer particle having a core-shell configuration comprising a hydrophobic core and a hydrophilic shell; and
a fluorescent lanthanoid dye that is integrated with the polymer particle and comprises a fluorescent lanthanoid cation, wherein:
a hydrophilic polymer which forms the hydrophilic shell comprises a polymerizable unit and at least one hydrophilic unit selected from the group consisting of a hydrophilic (meth)acrylamide unit and a hydrophilic vinyl amine unit,
a volume-average particle size of the fluorescent polymer particle is in a range of 0.01 to 20 μm, and
the fluorescent lanthanoid dye comprises a nitrogen-containing heterocyclic ligand represented by the following Formula (L-I):
Formula (L-I)

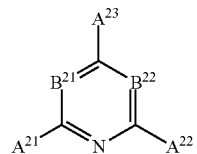

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or =C(—$R^{30}$)—; and $R^{30}$ represents a hydrogen atom or a substituent:

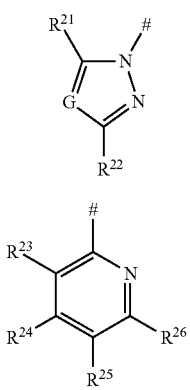

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic hydrocarbon ring or an aromatic heterocyclic ring; and # represents a site to be bonded with the nitrogen-containing heterocycle in the ligand represented by Formula (L-I).

19. A method for detecting fluorescence comprising detecting a detection target substance by using a fluorescent polymer fine particle and a combination substance capable of being combined with the target, wherein the fluorescent polymer fine particle comprises:

a polymer particle having a core-shell configuration comprising a hydrophobic core and a hydrophilic shell; and
a fluorescent lanthanoid dye that is integrated with the polymer particle and comprises a fluorescent lanthanoid cation, wherein:
a hydrophilic polymer which forms the hydrophilic shell comprises a polymerizable unit and at least one hydrophilic unit selected from the group consisting of a hydrophilic (meth)acrylamide unit and a hydrophilic vinyl amine unit,
a volume-average particle size of the fluorescent polymer particle is in a range of 0.01 to 20 μm, and
the fluorescent lanthanoid dye comprises a nitrogen-containing heterocyclic ligand represented by the following Formula (L-I):

Formula (L-I)

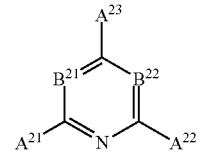

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or =C(—$R^{30}$)—; and $R^{30}$ represents a hydrogen atom or a substituent:

Formula (L-II)

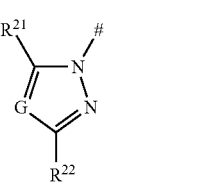

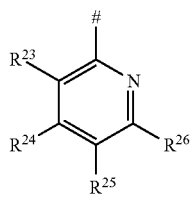

Formula (L-III)

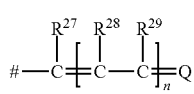

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

20. A kit for detecting fluorescence comprising a fluorescent polymer fine particle, wherein the fluorescent polymer fine particle comprises:
a polymer particle having a core-shell configuration comprising a hydrophobic core and a hydrophilic shell; and
a fluorescent lanthanoid dye that is integrated with the polymer particle and comprises a fluorescent lanthanoid cation,
wherein:
a hydrophilic polymer which forms the hydrophilic shell comprises a polymerizable unit and at least one hydrophilic unit selected from the group consisting of a hydrophilic (meth)acrylamide unit and a hydrophilic vinyl amine unit,
a volume-average particle size of the fluorescent polymer particle is in a range of 0.01 to 20 μm, and
the fluorescent lanthanoid dye comprises a nitrogen-containing heterocyclic ligand represented by the following Formula (L-I):

Formula (L-I)

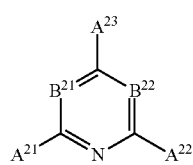

wherein each of $A^{21}$, $A^{22}$, and $A^{23}$ is the same as or different from each other and represents an atomic group represented by any one of the following Formulae (L-II) to (L-V), a hydroxyl group, an alkoxy group, an aryloxy group, an alkylamino group, a dialkylamino group, an arylamino group, or a diarylamino group; each of $B^{21}$ and $B^{22}$ independently represents a nitrogen atom or $=C(-R^{30})-$; and $R^{30}$ represents a hydrogen atom or a substituent:

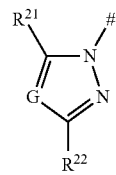

Formula (L-II)

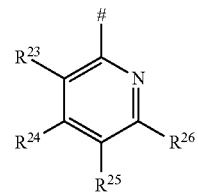

Formula (L-III)

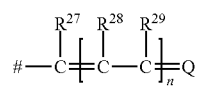

Formula (L-IV)

Formula (L-V)

wherein each of $R^{21}$ to $R^{29}$ independently represents a hydrogen atom or a substituent; $R^{27}$ and $R^{28}$, $R^{28}$ and $R^{29}$ and/or $R^{27}$ and $R^{29}$ are optionally bonded with each other to form a ring; n represents an integer of 0, 1 or 2; G represents a substituted or unsubstituted carbon atom or a nitrogen atom; Q represents an atomic group which is used to form a 5-membered or 6-membered nitrogen-containing heterocyclic ring which optionally forms a condensed ring; $Ar^{21}$ represents an aromatic hydrocarbon ring or an aromatic heterocyclic ring; and # represents a site to be bonded with the nitrogen-containing heterocycle in the ligand represented by Formula (L-I).

* * * * *